(12) United States Patent
Sun et al.

(10) Patent No.: US 12,175,657 B2
(45) Date of Patent: Dec. 24, 2024

(54) IMAGE PROCESSING DEVICE

(71) Applicant: Keyence Corporation, Osaka (JP)

(72) Inventors: Zhuoli Sun, Osaka (JP); Yuma Shimada, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 31 days.

(21) Appl. No.: 18/137,465

(22) Filed: Apr. 21, 2023

(65) Prior Publication Data

US 2023/0386018 A1    Nov. 30, 2023

(30) Foreign Application Priority Data

May 26, 2022  (JP) .................. 2022-085671

(51) Int. Cl.
*G06T 7/00* (2017.01)
*G06T 3/40* (2024.01)
(Continued)

(52) U.S. Cl.
CPC ............. *G06T 7/001* (2013.01); *G06T 3/40* (2013.01); *G06T 3/60* (2013.01); *G06T 7/74* (2017.01);
(Continued)

(58) Field of Classification Search
CPC ...... H04N 5/2628; H04N 23/67; H04N 23/73; G06T 7/001; G06T 7/74; G06T 3/40;
(Continued)

(56) References Cited

U.S. PATENT DOCUMENTS

| | | | | |
|---|---|---|---|---|
| 6,584,237 B1* | 6/2003 | Abe | ..................... | H04N 5/2628 |
| | | | | 382/184 |
| 2002/0080257 A1* | 6/2002 | Blank | .................... | H04N 23/62 |
| | | | | 348/E5.045 |

(Continued)

FOREIGN PATENT DOCUMENTS

JP          2020169958 A       10/2020

OTHER PUBLICATIONS

U.S. Appl. No. 18/137,457, filed Apr. 21, 2023 (83 pages).
U.S. Appl. No. 18/137,461, filed Apr. 21, 2023 (79 pages).
U.S. Appl. No. 18/137,468, filed Apr. 21, 2023 (90 pages).

*Primary Examiner* — Brian P Yenke
(74) *Attorney, Agent, or Firm* — Kilyk & Bowersox, P.L.L.C.

(57) ABSTRACT

An image processing device includes an imaging unit generating an inspection target image, a storage unit storing a reference image obtained by capturing an inspection object in advance, and a calculation unit specifying a positional relationship between an inspection object included in the inspection target image generated during operation and the inspection object included in the reference image, and calculates a generation condition of the inspection target image during operation such that the inspection object included in the inspection target image generated during operation and the inspection object included in the reference image are at substantially the same position. The generation condition includes positional information of an output region in which the inspection object is able to be output at substantially the same position as the reference image. The imaging unit generates an inspection target image corresponding to the output region of the positional information during operation.

11 Claims, 39 Drawing Sheets

(51) Int. Cl.
    *G06T 3/60*       (2024.01)
    *G06T 7/73*       (2017.01)
    *H04N 5/262*     (2006.01)
    *H04N 23/67*     (2023.01)
    *H04N 23/73*     (2023.01)

(52) U.S. Cl.
    CPC ....... *H04N 5/2628* (2013.01); *G06T 2200/24* (2013.01); *G06T 2207/20104* (2013.01); *G06T 2207/30164* (2013.01); *G06T 2207/30244* (2013.01); *H04N 23/67* (2023.01); *H04N 23/73* (2023.01)

(58) Field of Classification Search
    CPC .................. G06T 3/60; G06T 2200/24; G06T 2207/20104; G06T 2207/30164; G06T 2207/30244
    See application file for complete search history.

(56) References Cited

U.S. PATENT DOCUMENTS

| | | | |
|---|---|---|---|
| 2010/0283847 A1* | 11/2010 | Aikawa | G21C 17/003 348/135 |
| 2011/0157373 A1* | 6/2011 | Ye | G06T 7/85 348/187 |
| 2014/0185910 A1* | 7/2014 | Bryll | G06V 10/752 382/141 |
| 2016/0065912 A1* | 3/2016 | Peterson | G06T 7/70 348/86 |
| 2017/0109607 A1* | 4/2017 | Nagatomo | G06T 7/74 |
| 2020/0211175 A1* | 7/2020 | Kunik | G01N 21/95 |
| 2022/0392096 A1* | 12/2022 | Komatsu | G06T 3/40 |
| 2023/0388621 A1* | 11/2023 | Sun | G06T 7/0004 |
| 2023/0388635 A1* | 11/2023 | Sun | H04N 25/443 |
| 2023/0388636 A1* | 11/2023 | Sun | H04N 23/54 |

* cited by examiner

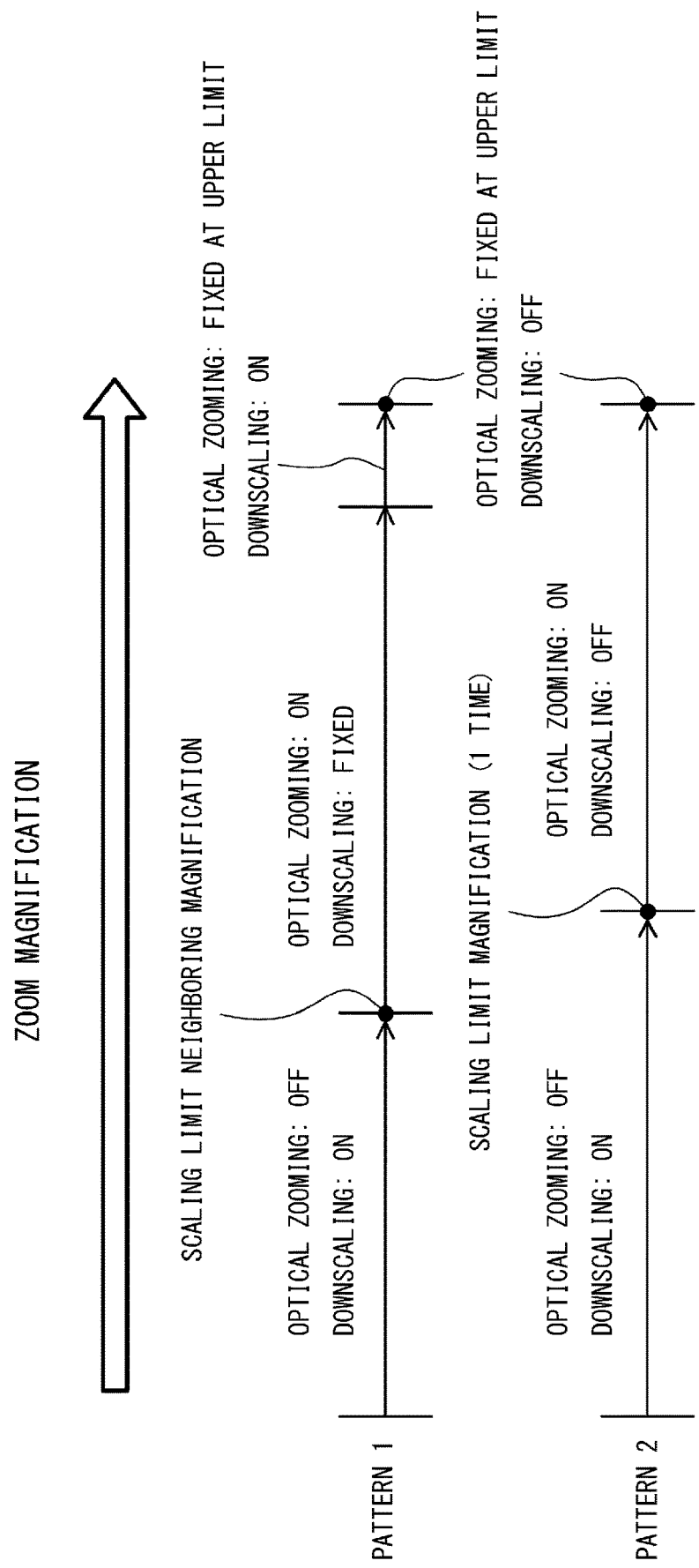

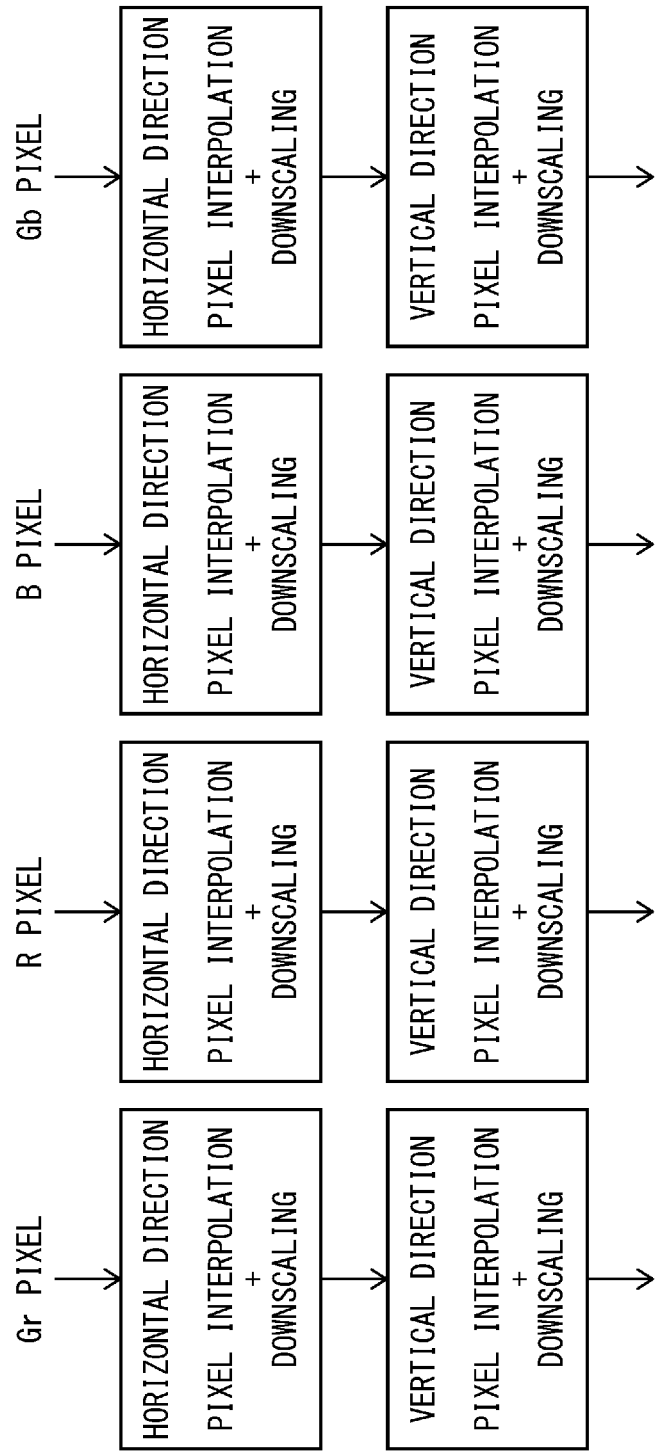

FIG. 27 SETTING FLOW

IMAGE PROCESSING DEVICE

CROSS-REFERENCE TO RELATED APPLICATIONS

The present application claims foreign priority based on Japanese Patent Application No. 2022-085671, filed May 26, 2022, the contents of which are incorporated herein by reference.

BACKGROUND OF THE INVENTION

1. Field of the Invention

The disclosure relates to an image processing device that generates an inspection target image obtained by capturing an inspection object such as a workpiece.

2. Description of Related Art

In related art, for example, as disclosed in JP2020-169958, an image inspection device configured to determine quality of an inspection object based on an inspection target image obtained by capturing the inspection object is known.

The image inspection device disclosed in JP2020-169958 causes an imaging device conforming to a standardization standard to perform multi-stage processing in order, and achieves both improvement in a degree of freedom in selecting a model of the imaging device and improvement in accuracy of image inspection.

Incidentally, in an image processing device, a desk test for testing whether or not an inspection object desired to be inspected by a user can be inspected may be performed under various optical conditions and installation conditions of a camera. When it is determined that the inspection can be performed, the camera is installed in a factory line or the like to have the same conditions as optical conditions and installation conditions calculated by the desk test, and an operation phase is executed.

However, since a desk test environment and an actual operation environment are strictly different, even though the same optical conditions and installation conditions as the conditions in the desk test are reproduced in the operation environment, the same inspection target image as the image obtained in the desk test may not be obtained. In addition, even though the same inspection target image is obtained during installation, the optical condition may change for some reason in the operation phase, and image quality may change. In such a case, it is necessary to search again the installation condition and the optical condition for generating an ideal inspection target image obtained in the desk test in the operation phase, and time and effort are required.

SUMMARY OF THE INVENTION

The disclosure has been made in view of such a point, and an object of the disclosure is to generate an inspection target image similar to an inspection target image during setting even though an optical condition changes during operation.

In order to achieve the above object, one aspect of the disclosure can be based on an industrial camera that generates an inspection target image obtained by capturing an inspection object. An image processing device includes an imaging unit that captures the inspection object to generate the inspection target image, a storage unit that stores a reference image obtained by capturing the inspection object in advance, and a calculation unit that specifies a positional relationship between the inspection object included in the inspection target image generated by the imaging unit during operation and the inspection target image included in the reference image, and calculates a generation condition of the inspection target image during operation such that the inspection object included in the inspection target image generated by the imaging unit during operation and the inspection target image included in the reference image are at substantially the same position. The generation condition includes positional information of an output region in which the inspection object is able to be output at substantially the same position as the reference image within a field of view range of the imaging unit, and the imaging unit generates an inspection target image corresponding to the output region of the positional information during operation.

According to this configuration, it is possible to specify the positional relationship between the inspection object included in the inspection target image generated during operation and the inspection object included in the reference image. The generation condition of the inspection target image is calculated such that the inspection object of the inspection target image is at substantially the same position as the inspection object included in the reference image based on the specified result. Since the generation condition includes the positional information of the output region in which the inspection object can be output at substantially the same position as the reference image, even though the optical condition changes during operation, the inspection target image having the inspection object at substantially the same position as the reference image can be generated by corresponding to the output region based on the positional information.

In addition, an interface unit that receives selection of the reference image stored in the storage unit may be further included. In this case, the storage unit can store the inspection target image generated by the imaging unit as the reference image, and can store an optical condition file in which an optical condition when the reference image is generated is defined in association with the reference image. An initial condition of an optical condition of the imaging unit can be set to the optical condition of the optical condition file associated with the selected reference image In addition, the interface unit can receive designation of a feature region for corresponding point search for specifying a positional relationship between the inspection object included in the inspection target image and the inspection object included in the reference image on the inspection target image or the reference image.

In addition, the information regarding a rotation direction and an angle for rotating the inspection target image to have the same posture as the inspection object included in the reference image may be included in the generation condition of the inspection target image in addition to the positional information of the output region.

In addition, a zoom magnification calculated such that the inspection object included in the reference image and the inspection object in the inspection target image have substantially the same size may be included in the generation condition of the inspection target image. In this case, the calculation unit can set the inspection objects included in the reference image and the inspection target image to have substantially the same size by zooming according to the calculated zoom magnification.

In addition, a condition related to brightness of an image may be included in the generation condition of the inspection target image. In this case, brightness of the reference image is analyzed, and the condition related to the brightness of the image is calculated as an imaging condition in which the inspection target image have substantially the same brightness as the reference image based on the analysis result.

In addition, a display unit that displays information regarding the posture of the imaging unit when the reference image is captured, and compares and displays a current posture of the imaging unit and the posture of the imaging unit when the reference image is captured may be provided. After the reference image is designated via the interface unit, a posture of the imaging unit when the reference image is captured and a current posture of the imaging unit can be compared and displayed. After the postures of the imaging units are compared and displayed, the calculation unit can calculate the generation condition of the inspection target image, and the imaging unit can generate the inspection target image corresponding to the output region of the positional information.

In addition, the calculation unit can adjust an exposure time of the imaging unit based on a luminance value of the reference image before the corresponding point search. In addition, autofocus adjustment of the imaging unit may be executed before the corresponding point search. As a result, accuracy of the corresponding point search is improved.

In addition, the calculation unit can generate an inspection target image after rotation by applying rotation conversion processing of the angle on the inspection target image.

As described above, the generation condition of the inspection target image during operation is calculated such that the inspection object included in the inspection target image generated during operation is at the substantially same position as the inspection object included in the reference image, and the generation condition includes the positional information of the output region in which the inspection object can be output at the substantially same position as the reference image within the field of view range of the imaging unit. Therefore, even though the optical condition changes during operation, the inspection target image similar to the inspection target image during setting can be generated.

BRIEF DESCRIPTION OF THE DRAWINGS

FIG. 11 is a diagram illustrating an example of a user interface screen that receives a zoom instruction and the like;

FIG. 18 is a diagram for describing an example of a case where optical zooming and downscaling are combined;

FIGS. 24A-D are diagrams illustrating a procedure in a case where the color captured image is downscaled;

DETAILED DESCRIPTION OF PREFERRED EMBODIMENTS

Hereinafter, an embodiment of the invention will be described in detail with reference to the drawings. Note that, the following description of a preferred embodiment is merely exemplary in nature and is not intended to limit the invention, an application thereof, or an intended use thereof.

Figure 1:
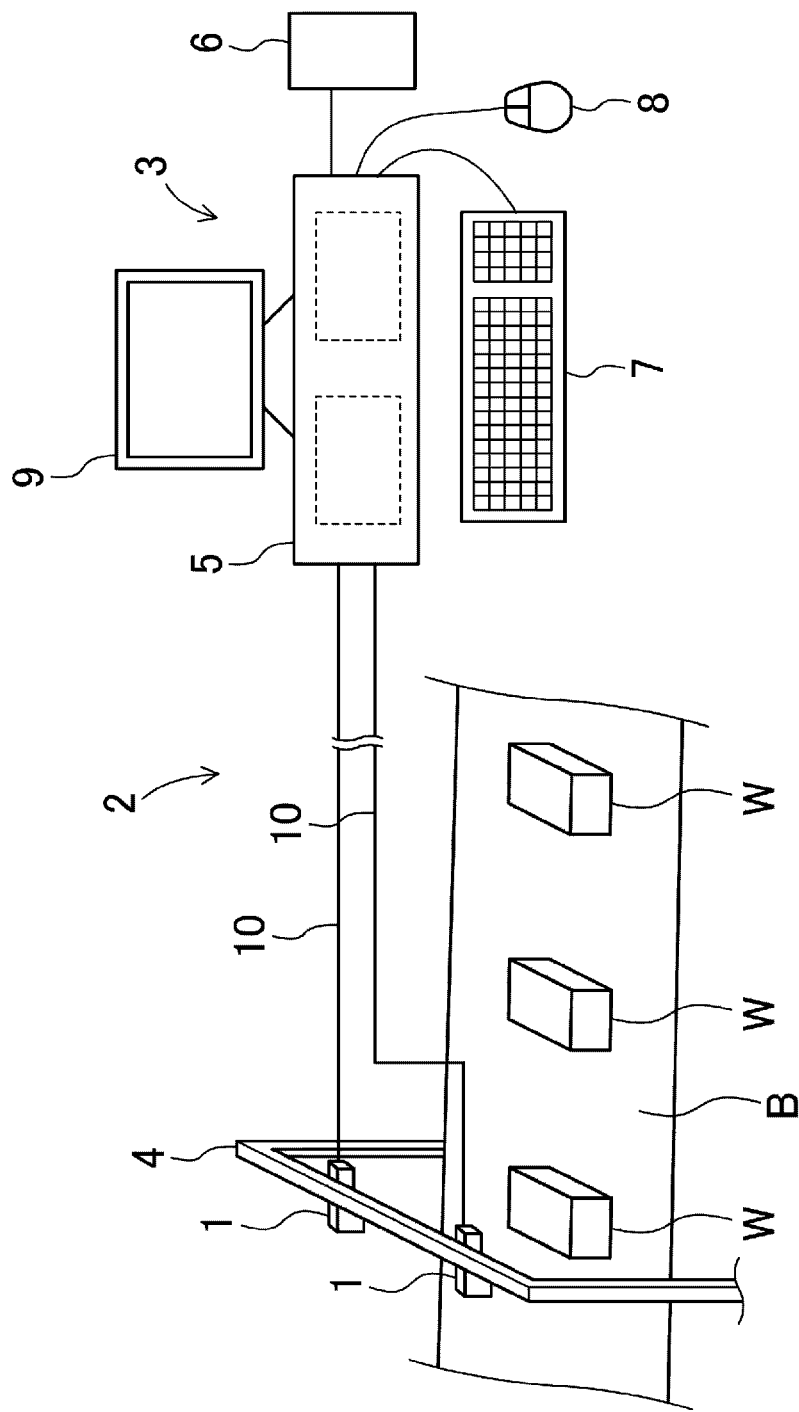
FIG. 1 is an overall view illustrating a use state of an image inspection system including an industrial camera according to an embodiment.

FIG. 1 is an overall view illustrating a use state of an image inspection system 2 including industrial cameras 1 according to an embodiment of the invention. The image inspection system 2 illustrated in FIG. 1 includes two industrial cameras 1 and a control personal computer (hereinafter, referred to as a controller) 3. The number of industrial cameras 1 is not limited to two, and may be one or three or more. Although details will be described later, the industrial camera 1 has a shape as illustrated in FIGS. 2 to 5 and the like, and has an internal structure illustrated in FIG. 6. The industrial camera 1 corresponds to an imaging unit that generates an inspection target image obtained by capturing a workpiece W which is an inspection object. The image inspection system 2 including the industrial cameras 1 that generate such inspection target images can also be referred to as an image processing apparatus.

Although not illustrated, for example, the industrial camera 1 can receive a trigger signal output from a programmable logic controller, a sensor that detects the arrival of the workpiece W, or the like. The industrial camera 1 that receives the trigger signal generates the inspection target image by executing imaging processing. In addition, the industrial camera 1 may generate the inspection target image by repeatedly executing imaging processing inside without receiving the trigger signal from an outside. Although not illustrated, the image inspection system 2 may include an illumination unit that illuminates the workpiece W, and the illumination unit is controlled to illuminate the workpiece W in synchronization with the imaging processing of the industrial camera 1.

In the present example, as illustrated in FIG. 1, a case where a site where a plurality of workpieces W are sequentially conveyed by a conveying device such as a belt conveyor B will be described as a site where the industrial camera 1 is used, but the site may be a site where a stationary workpiece W is inspected. The industrial camera 1 is attached to a camera attachment member 4, and is installed at a predetermined position in a predetermined posture.

The controller 3 performs various settings and the like of the industrial camera 1, and can be, for example, a desktop personal computer, a notebook personal computer, or the like, or can be a calculation device dedicated to image inspection, and a form thereof is not particularly limited. The controller 3 includes a body 5, a storage unit 6, a keyboard 7, a mouse 8, and a monitor 9. The body 5 is connected to the industrial cameras 1 to be able to communicate via a cable 10. A control unit 5a including a central processing unit, a ROM, a RAM, and the like are provided in the body 5. In addition, the storage unit 6 is a hard disk drive, a solid state drive, or the like, and stores a program for operating the control unit 5a, setting information, various images, and the like of the industrial cameras 1. A part of the storage unit 6 may be provided in the industrial cameras 1, and in this case, setting information, various images, and the like of the industrial cameras 1 can be retained in the industrial cameras 1.

The keyboard 7 and the mouse 8 are used as an operation unit for operating the controller 3, and operation states of the keyboard 7 and the mouse 8 are detected by the control unit 5a. The operation unit is not limited to the keyboard 7 and the mouse 8, and may be a so-called touch panel type operation unit. The monitor 9 is, for example, a liquid crystal display device, and can display various user interfaces for setting the industrial cameras 1 under the control of the control unit 5a, various images, and the like.

(Configuration of Industrial Camera)

Figure 6:
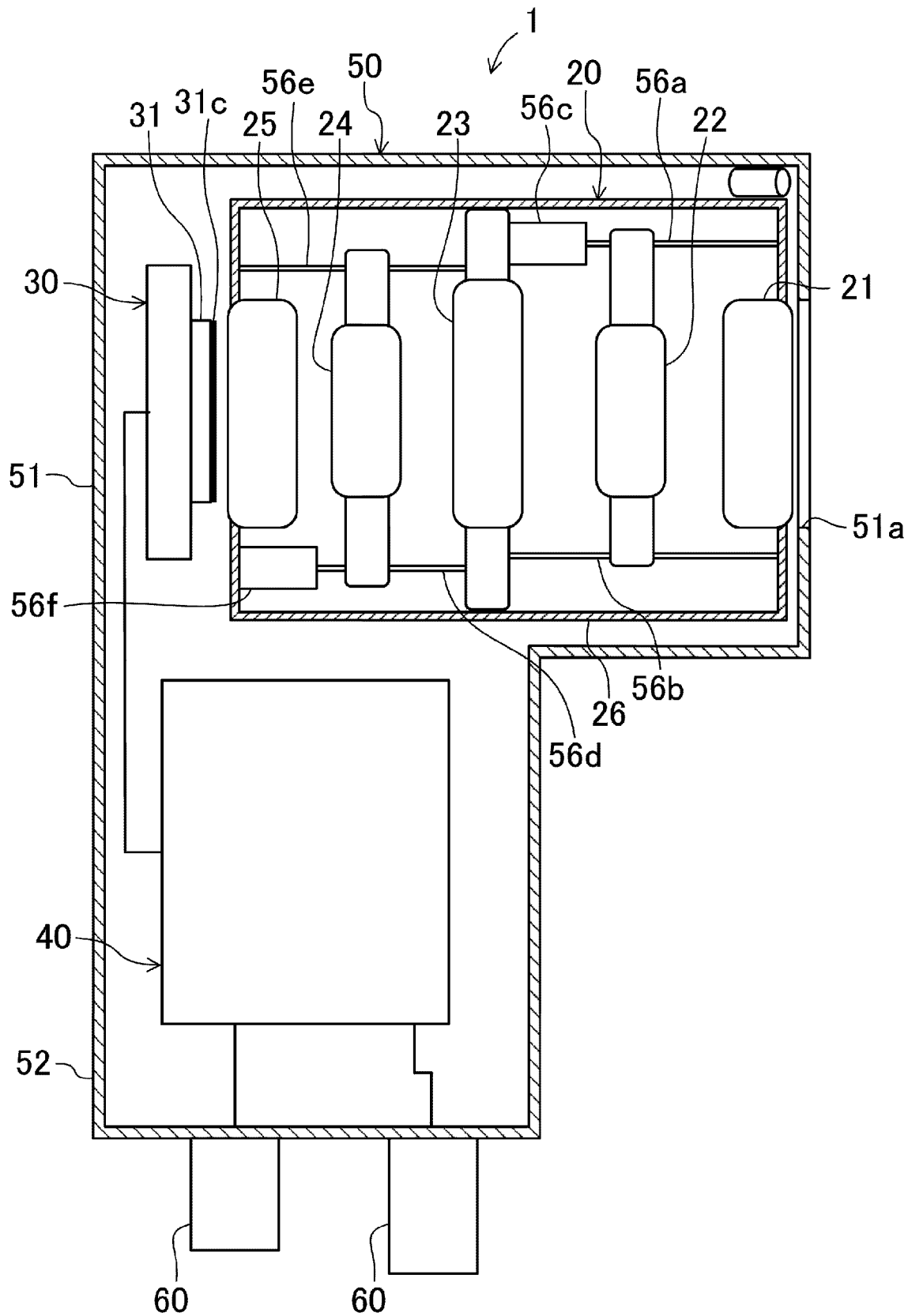
FIG. 6 is a cross-sectional view illustrating an internal structure of the industrial camera.

As illustrated in FIG. 6, the industrial camera 1 includes a lens unit 20, a sensor board 30, a main board 40, a housing 50, and a storage unit 39. The storage unit 39 stores setting information, various images, and the like of the industrial camera 1.

The housing 50 is made of a highly rigid member such as an aluminum alloy. Note that, for the sake of convenience in description, an upper-lower direction, a left-right direction, and a front-rear direction are defined as illustrated in FIGS. 2 to 5, but the directions do not limit the posture during use, and the industrial camera 1 can be used in any posture.

Figure 7:
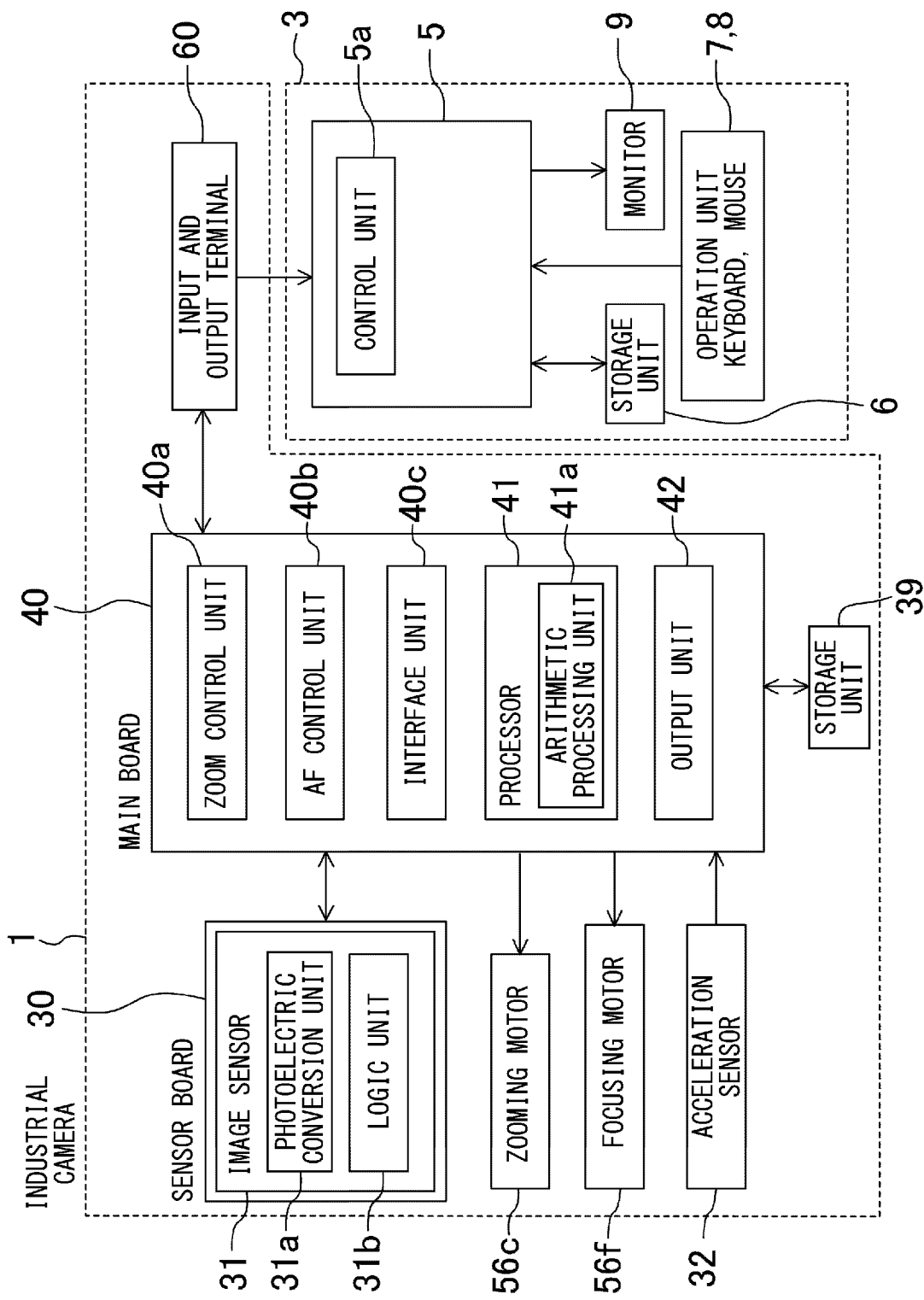
FIG. 7 is a block diagram of an image inspection system.

As illustrated in FIG. 7, an acceleration sensor 32 is attached to the industrial camera 1. The acceleration sensor 32 is a sensor for acquiring information regarding the posture of the industrial camera 1, and can measure, for example, an inclination with respect to a vertical direction, an inclination with respect to a horizontal direction, and the like. Specifically, due to the use of the acceleration sensor 32, each angle such as a pitch, a tilt, and a roll is calculated based on a difference from a reference, and the information regarding the posture of the industrial camera 1 is acquired from the calculation result.

Figure 2:
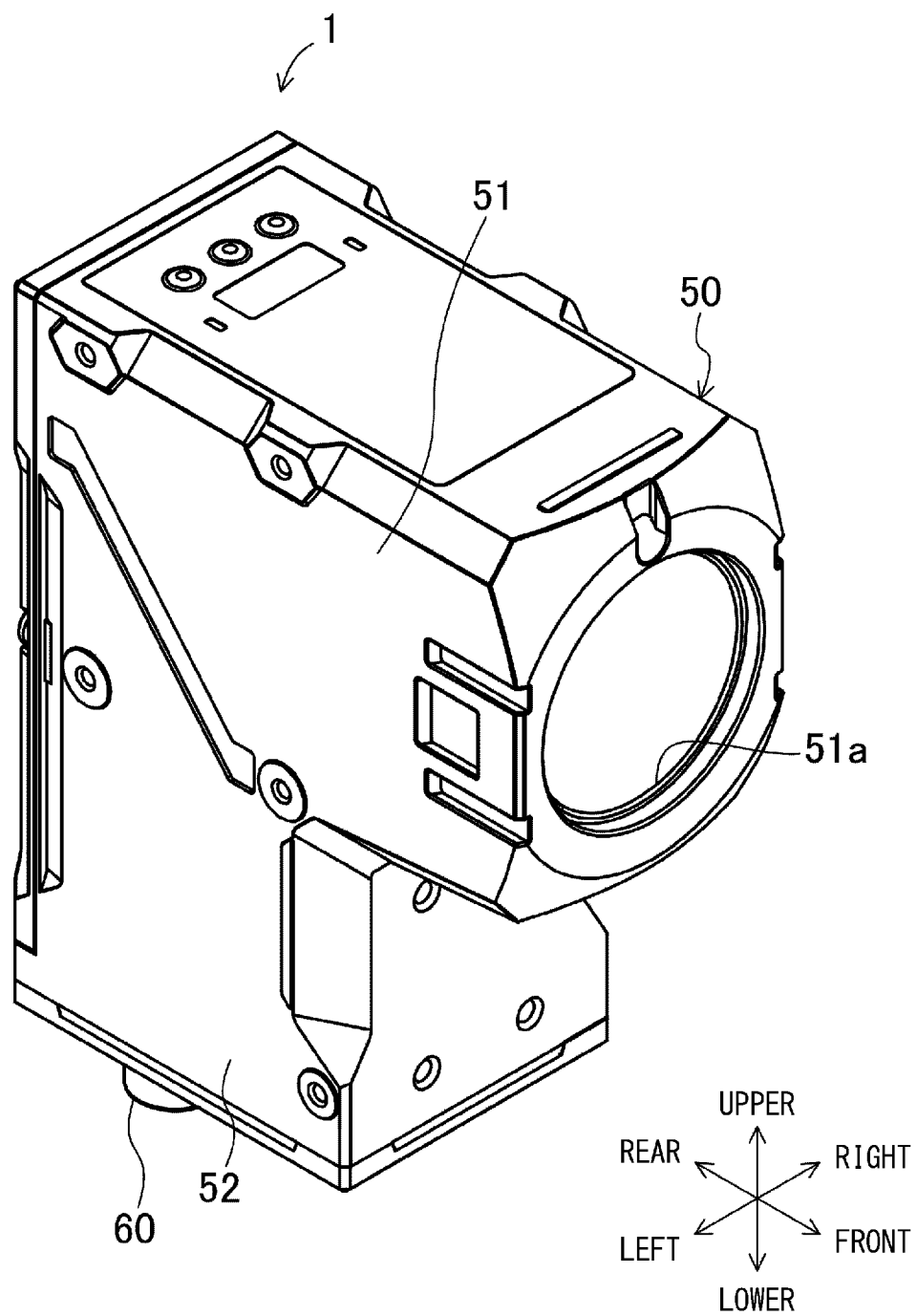
FIG. 2 is a perspective view of the industrial camera as viewed from above.
Figure 3:
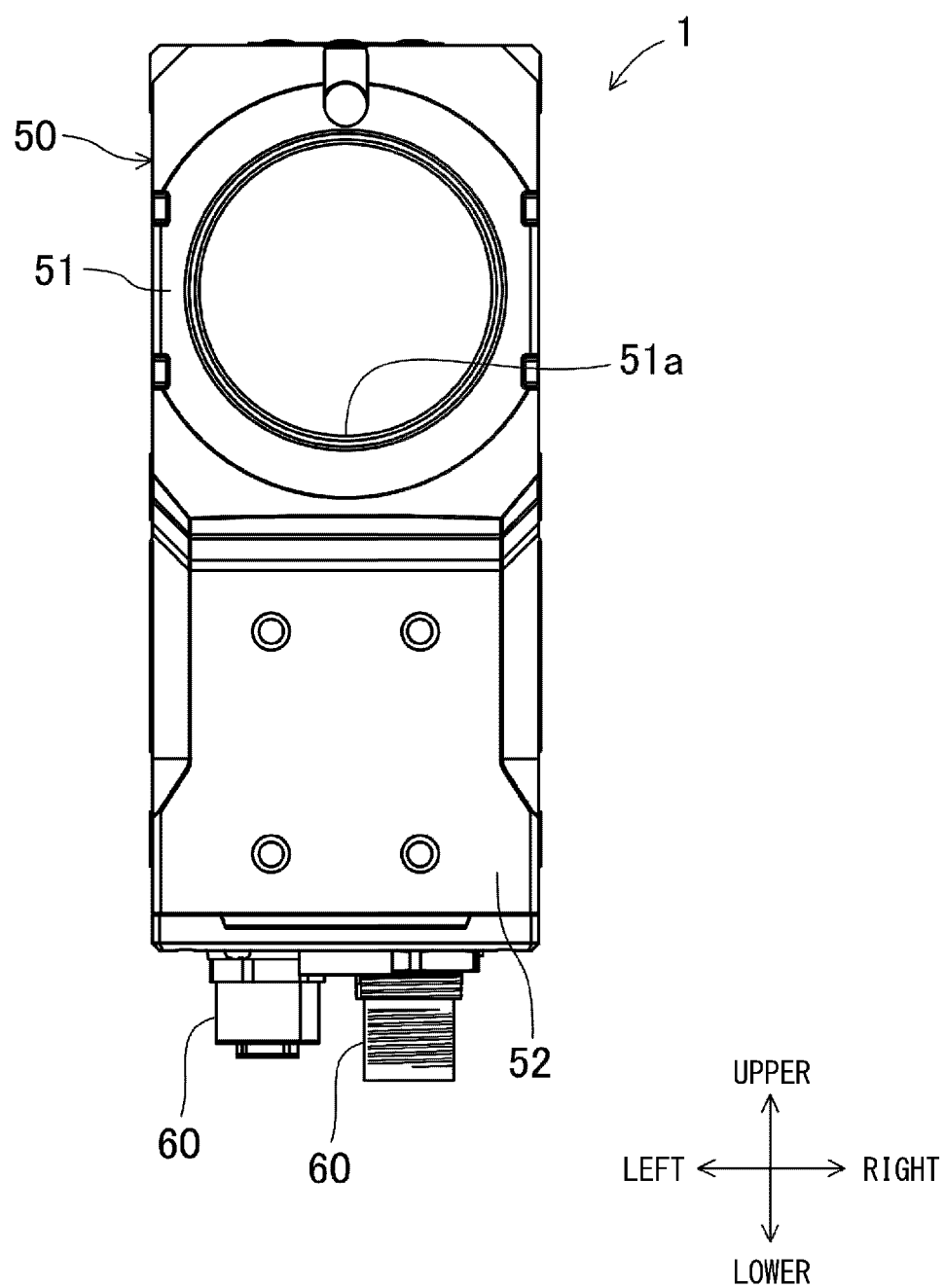
FIG. 3 is a front view of the industrial camera.
Figure 4:
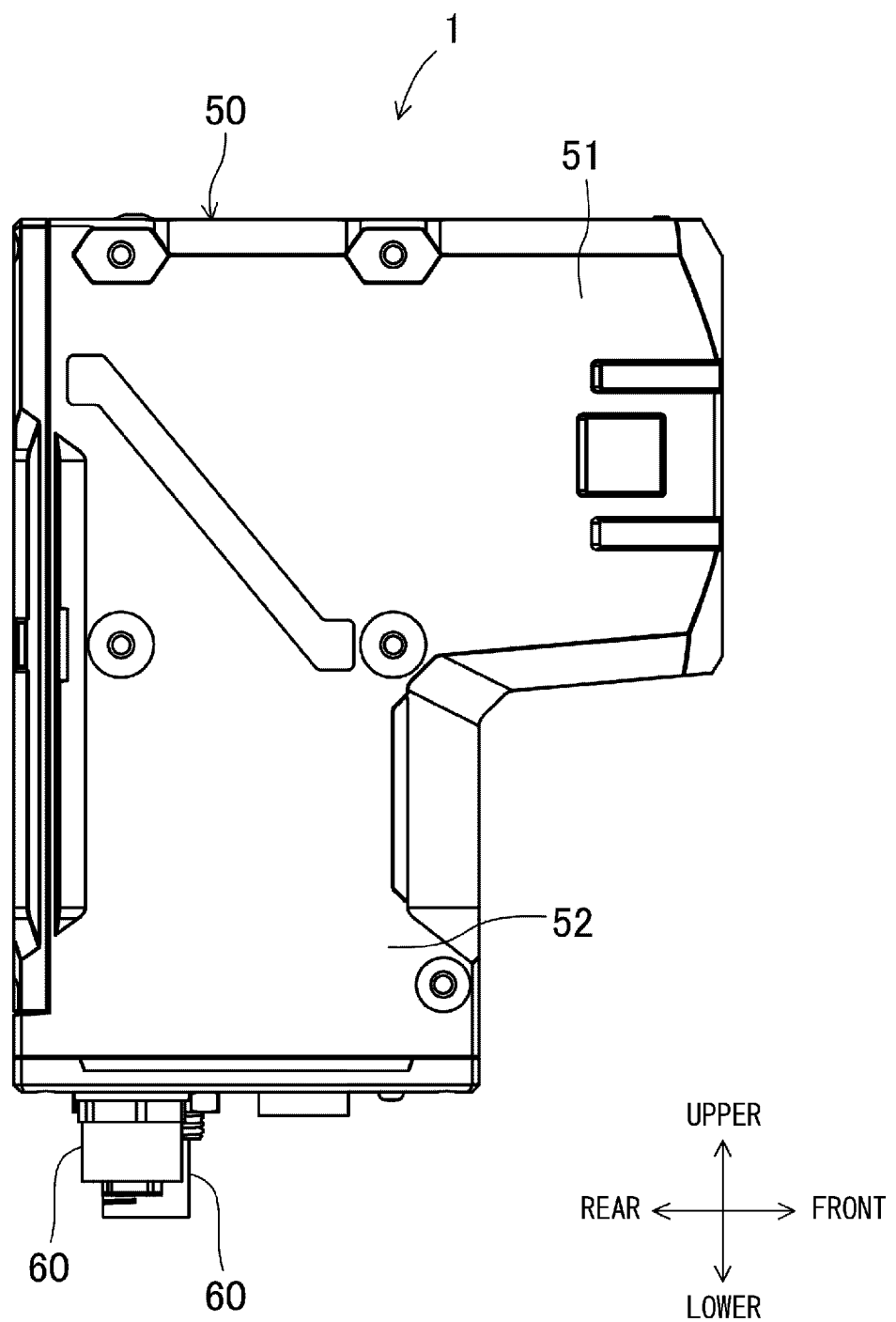
FIG. 4 is a side view of the industrial camera.
Figure 5:
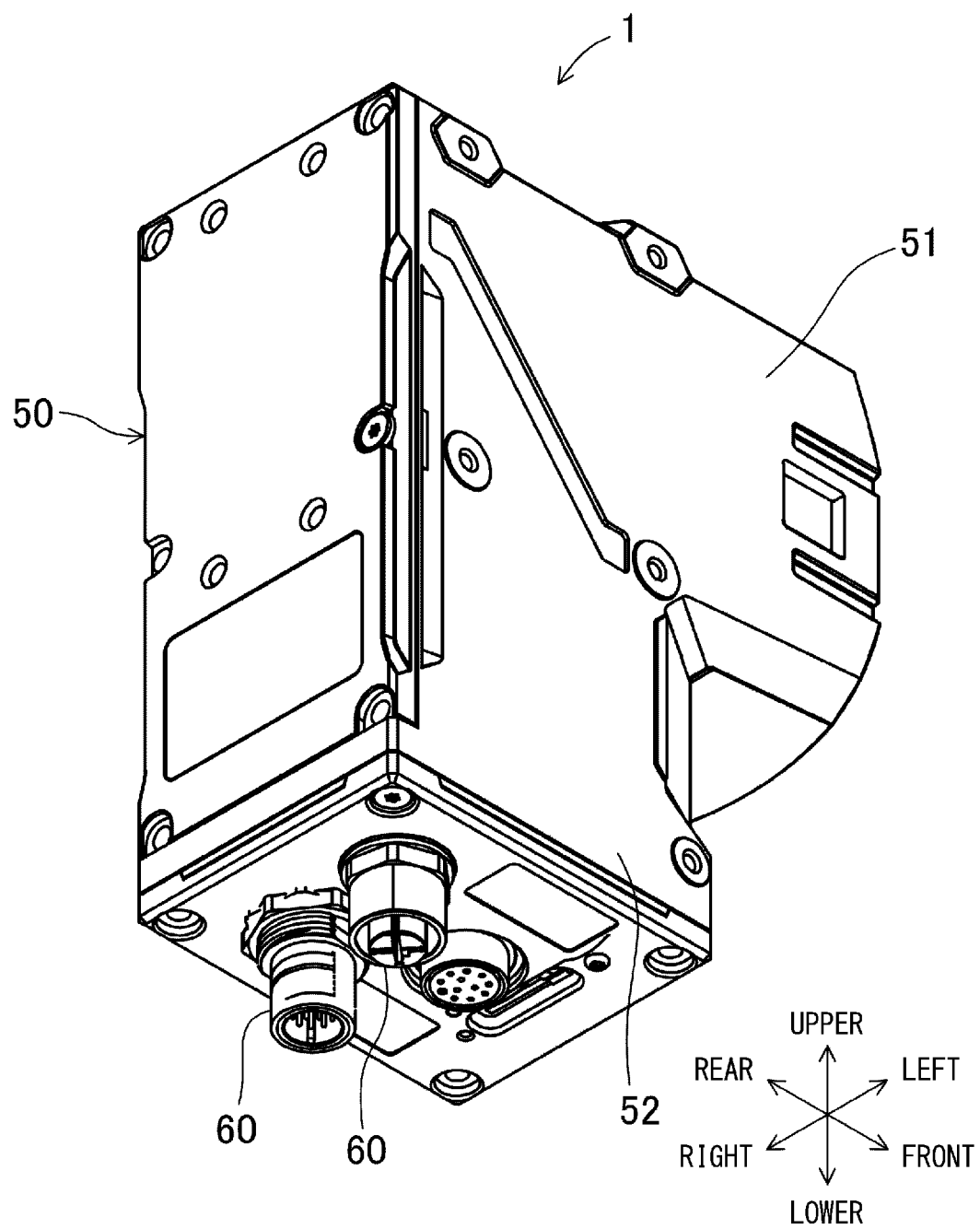
FIG. 5 is a perspective view of the industrial camera as viewed from below.

The housing 50 has an upper portion 51 and a lower portion 52. The upper portion 51 is formed to be longer in the front-rear direction than the lower portion 52. The lower portion 52 is formed to protrude downward from a rear side of the upper portion 51. As illustrated in FIGS. 2 and 3, a light receiving window 51a is formed on a front surface of the upper portion 51. In addition, as illustrated in FIG. 6, the lens unit 20 and the sensor board 30 are accommodated in the upper portion 51, and the main board 40 is accommodated in the lower portion 52. That is, the housing 50 incorporates an image sensor 31, a processor 41, and an output unit 42 to be described later.

The lens unit 20 is a zoom lens including a zoom optical system capable of electrically performing optical zooming, and can switch an optical zoom magnification to an any magnification as long as the optical zoom magnification is within a predetermined range. The lens unit 20 is fixed to the housing 50 and is integrated with the housing 50.

That is, an optical axis of the lens unit 20 coincides with the front-rear direction of the housing 50. The lens unit 20 includes a first lens group 21, a second lens group 22, a third lens group 23, a fourth lens group 24, a fifth lens group 25, and a lens barrel 26 that holds the first to fifth lens groups 21 to 25. The first to fifth lens groups 21 to 25 constitute condensing lenses that concentrate light incident from the light receiving window 51a. In addition, the number of lenses constituting each lens group of the first to fifth lens groups 21 to 25 is not particularly limited, and may be any number, and the number of lens groups may be 4 or less, or 6 or more. In addition, the lens unit 20 may be a zoom optical system capable of manually performing optical zooming.

The first lens group 21 is a fixed lens group disposed on a front surface of housing 50, and receives reflected light from the workpiece W. The first lens group 21 faces an outside of the housing 50 from the light receiving window 51a. The second lens group 22 is a zooming movable lens group disposed behind the first lens group 21, and receives light emitted from the first lens group 21. The third lens group 23 is a fixed lens group disposed behind the second lens group 22, and receives light emitted from the second lens group 22. The fourth lens group 24 is a focusing movable lens group disposed behind the third lens group 23, and receives light emitted from the third lens group 23. The fifth lens group 25 is a fixed lens group disposed behind the fourth lens group 24, and receives light emitted from the fourth lens group 24.

A zooming ball screw 56a, a zooming guide shaft 56b, and a zooming motor 56c that rotates the zooming ball screw 56a in a forward-reverse direction are provided in the lens barrel 26. The second lens group 22 is supported by the zooming ball screw 56a and the zooming guide shaft 56b, and when the zooming ball screw 56a is rotated by the zooming motor 56c, the second lens group 22 moves in an optical axis direction. As a result, a desired zoom magnification is obtained. The zooming ball screw 56a, the zooming guide shaft 56b, and the zooming motor 56c are zooming lens drive mechanisms that drive the second lens group 22 in the optical axis direction and adjust an optical magnification.

In addition, a focusing ball screw 56d, a focusing guide shaft 56e, and a focusing motor 56f that rotates the focusing ball screw 56d in the forward-reverse direction are provided in the lens barrel 26. The fourth lens group 24 is supported by the focusing ball screw 56d and the focusing guide shaft 56e, and when the focusing ball screw 56d is rotated by the focusing motor 56f, the fourth lens group 24 moves in the optical axis direction. As a result, focus adjustment is performed. The focusing ball screw 56d, the focusing guide shaft 56e, and the focusing motor 56f are zooming lens drive mechanisms that drive the fourth lens group 24 in the optical axis direction and adjust a focal position.

As illustrated in FIG. 7, a zoom control unit 40a, an AF control unit 40b, and an interface unit 40c are provided in the main board 40. The interface unit 40c is, for example, a portion that receives a zoom instruction or the like from the outside. In a case where the interface unit 40c receives a zoom instruction for optical zooming, the zoom control unit 40a controls the zooming motor 56c to move the second lens group 22 in the optical axis direction such that the zoom magnification received by the interface unit 40c is obtained.

The AF control unit 40b is a portion that executes autofocus control of a known contrast type or a phase difference type of the related art. The AF control unit 40b controls the focusing motor 56f to move the fourth lens group 24 in the optical axis direction such that the focal position matches the workpiece W.

As illustrated in FIG. 6, the sensor board 30 is disposed behind the fifth lens group 25. The image sensor 31 as an imaging unit is mounted on the sensor board 30. As illustrated in FIG. 7, the image sensor 31 includes a photoelectric conversion unit 31a that receives the light concentrated by the condensing lens, a logic unit 31b that generates an inspection target image from a captured image acquired by the photoelectric conversion unit 31a, and a color filter 31c (illustrated in FIG. 6), and can generate a color inspection target image obtained by capturing an inspection object. The photoelectric conversion unit 31a and the color filter 31c can generate the color captured image in which colors are formed in a predetermined array pattern. In addition, a monochrome captured image can be generated by the photoelectric conversion unit 31a. The following description is applicable to both the monochrome captured image and the color captured image.

The photoelectric conversion unit 31a can generate a captured image having a larger number of pixels than the inspection target image. In addition, the logic unit 31b is mounted on the same chip as the photoelectric conversion unit 31a, and is a portion constituting an image generation unit. Specifically, the photoelectric conversion unit 31a is a CMOS imaging element, is formed by stacking a plurality of wafers, and the logic unit 31b is formed by a part of the wafer. A part of the wafer may include a memory or the like.

In addition, the photoelectric conversion unit 31a is a global shutter type or rolling shutter type CMOS imaging element. In the case of the global shutter type, it is possible to capture an image without distortion even for a moving object. In the case of the rolling shutter type, since it is possible to realize a high pixel with a pixel pitch about half of a pixel pitch in the case of the global shutter type, it is possible to downsize each lens size of the lens unit 20. Eventually, it is possible to downsize the housing 50, and a degree of freedom during installation is improved. A field of view range of the image sensor 31 is formed by a pixel group of the photoelectric conversion unit 31a. The field of view range of the image sensor 31 is also referred to as a field of view range of the photoelectric conversion unit 31a.

The logic unit 31b is a portion that generates an inspection target image having a smaller number of pixels than the captured image by executing downscaling on the captured image corresponding to an output region that is a region of the pixel group (field of view range of the image sensor 31) of the photoelectric conversion unit 31a in whole or part and outputs the inspection target image. Here, the downscaling refers to processing of lowering a pixel resolution of a target image.

Figure 8:
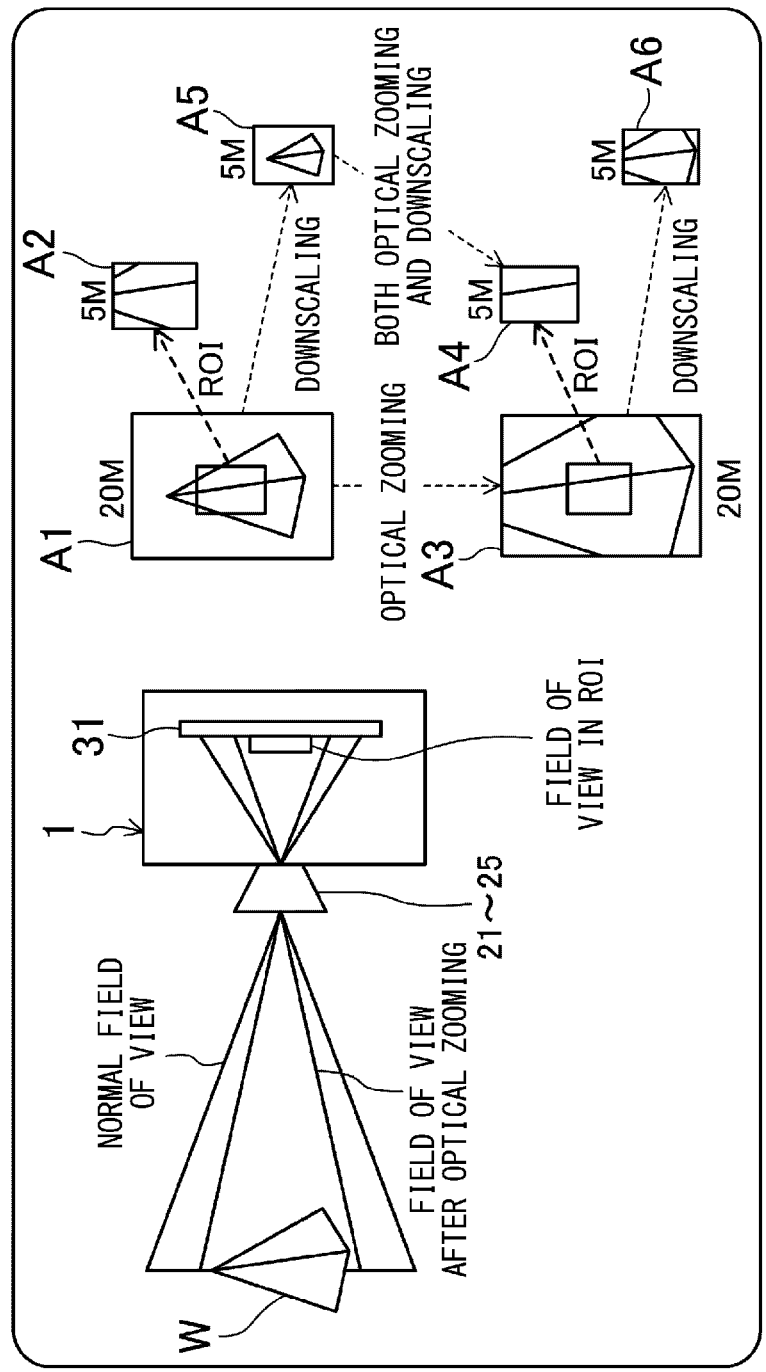
FIG. 8 is a diagram for describing a concept of downscaling.

The concept of the downscaling will be described with reference to FIG. 8. FIG. 8 schematically illustrates a case where an image of the workpiece W is captured by the industrial camera 1. For example, the number of pixels of the photoelectric conversion unit 31a is 20 megapixels (MP) (simply denoted as 20 M or the like in the drawings). As illustrated on a left side of FIG. 8, a field of view becomes narrower than a normal field of view by performing the optical zooming, and a region of interest (ROI) becomes a region narrower than the field of view after the optical zooming. As illustrated on a right side of FIG. 8, in a case where a region of interest is cut out from a captured image A1 captured with the number of pixels of 20 MP, for example, the region of interest is a region of interest A2 with 5 MP with the pixel resolution unchanged. Similarly, in a case where a region of interest is cut out from a captured image A3 after the optical zooming, the region of interest is a region of interest A4 with the number of pixels of 5 MP with the pixel resolution unchanged.

When downscaling is performed from the captured image A1, a scaling magnification (also referred to as a downscaling magnification) can be randomly set. The scaling magnification can be obtained by dividing the number of imaging pixels by the number of output pixels, and for example, in a case where an image having the same field of view as an image captured with 20 MP is output with 10 MP, the scaling magnification becomes 2 times.

The downscaling can be performed while an aspect ratio of the image remains constant, or can be performed while the aspect ratio of the image is changed. In a case where the aspect ratio of the image remains constant, as described above, for example, in a case where the image having the same field of view as the image captured with 20 MP is output with 10 MP, the scaling magnification becomes 2 times. On the other hand, in a case where the aspect ratio of the image is changed, for example, when the image captured with the number of pixels of 20 MP of 5000×4000 is output with the number of pixels of 5 MP of 2500×2000 with the same field of view, the scaling magnification becomes 4 times. In addition, in a case where a region of interest of 3200×4000 is downscaled to 2000×2500, the scaling magnification becomes 2.56 times.

In a case where the scaling magnification is set to, for example, 4 times while the aspect ratio of the image remains constant, an entire workpiece image A5 having the number of pixels of 5 MP is obtained. Both the optical zooming and the downscaling are performed for the image A5, and thus, the region of interest A4 having a higher pixel resolution than a pixel resolution of the image A5 is obtained. In addition, a workpiece image A6 with a pixel resolution lower than a pixel resolution of the image A3 is obtained by downscaling the captured image A3 after the optical zooming.

Figure 9:
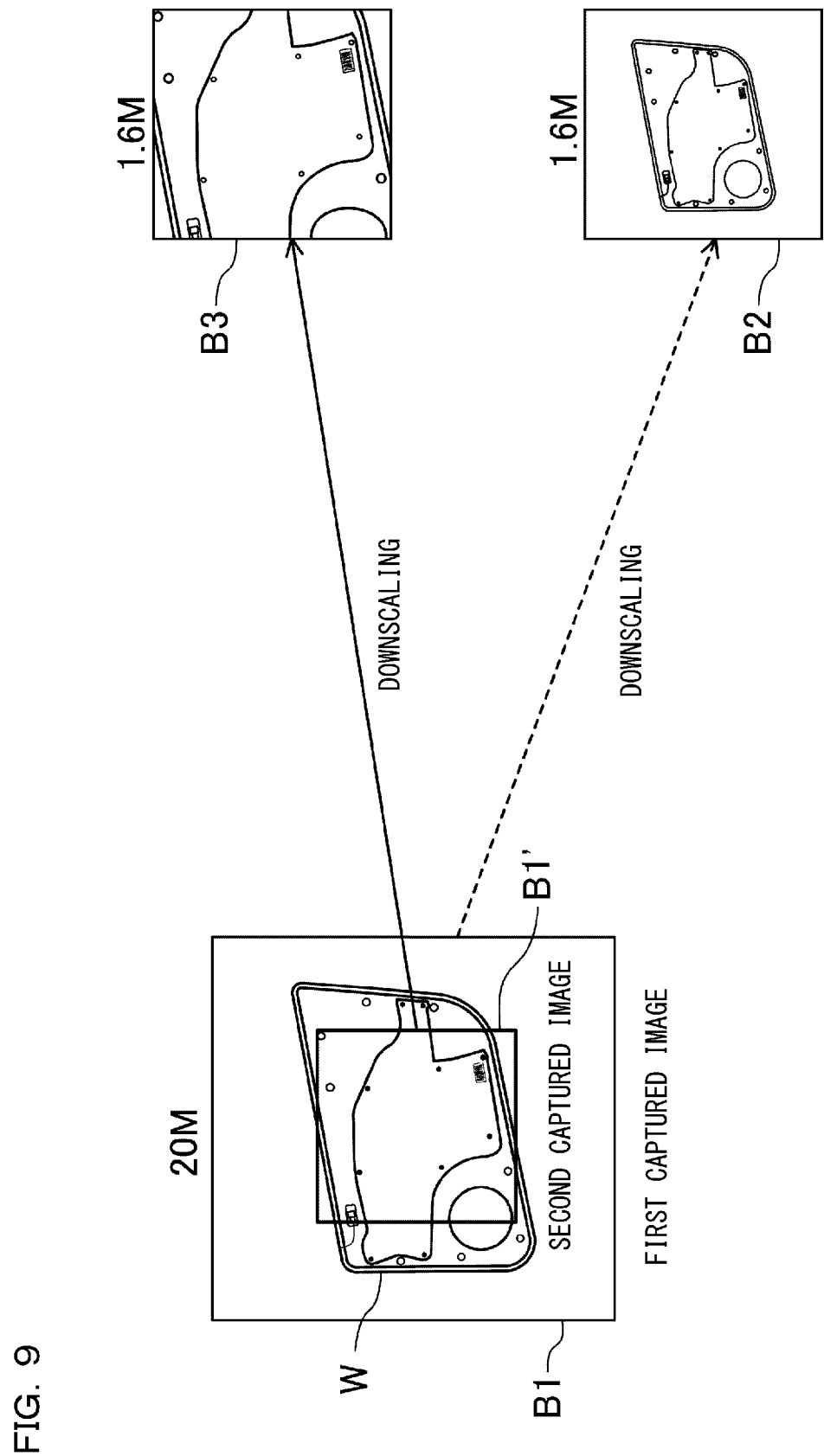
FIG. 9 is a diagram for describing a case where downscaling is performed based on a specific image obtained by capturing a workpiece.

FIG. 9 is a diagram for describing downscaling based on a specific image obtained by capturing the image of the workpiece W. A captured image corresponding to an output region that is a region of the entire pixel group of the photoelectric conversion unit 31a, that is, the entire field of view range of the imaging unit is set as a first captured image B1. The logic unit 31b downscales the first captured image B1 at any first scaling magnification to generate an inspection target image B2 with a first number of pixels (for example, 1.6 MP) smaller than the number of pixels (for example, 20 MP) of the first captured image B1.

The interface unit 40c can receive designation of an output region that is a region to be output as the inspection target image in the field of view range of the photoelectric conversion unit 31a, that is, the imaging unit. This output region may be, for example, a region corresponding to the region of interest described with reference to FIG. 8. The interface unit 40c can also receive an instruction to change at least one of a position, a size, and a shape of the output region.

For example, the interface unit 40c is configured to be able to receive a first zoom instruction to change the output region of the photoelectric conversion unit 31a to a relatively small region from a user. Specifically, in response to the first zoom instruction, the output region is changed to a part of the pixel group of the photoelectric conversion unit 31a, that is, a part of the field of view range of the imaging unit. A second captured image B1' is a captured image corresponding to an output region changed in response to the first zoom instruction. The second captured image B1' is captured at a timing different from a timing of the first captured image B1, and is independent of the first captured image B1. The logic unit 31b downscales the second captured image B1' at a second scaling magnification to generate an inspection target image B3 with the first number of pixels (for example, 1.6 MP) smaller than the number of pixels (for example, 5 MP) of the second captured image B1'. In addition, the second captured image B1' may be generated based on the first captured image B1, and may be generated by cutting out, for example, a part of the first captured image B1. In addition, the interface unit 40c is configured to be able to receive an instruction to adjust the first zoom magnification not only with an integer but also with accuracy after a decimal point.

As illustrated in FIG. 7, the processor 41 that executes various kinds of arithmetic processing and controls the image sensor 31 are provided in the main board 40. The processor 41 includes a calculation unit 41a, and the processor 41 controls the logic unit 31b of the image sensor 31 based on a result arithmetic-processed by the calculation unit 41a and causes the logic unit 31b to generate a desired inspection target image.

The calculation unit 41a calculates the second scaling magnification necessary for setting the second captured image B1' corresponding to the output region after the change in the field of view range of the photoelectric conversion unit 31a to have the first number of pixels. The calculation unit 41a outputs the calculated second scaling magnification to the logic unit 31b. The logic unit 31b generates the inspection target image B3 having the first number of pixels by downscaling the second captured image B1' at the second scaling magnification calculated by the calculation unit 41a. The inspection target image B3 having the first number of pixels has a lower resolution than the first captured image B1 corresponding to the output region of the photoelectric conversion unit 31a, but has a resolution enough to ensure necessary inspection accuracy. Thus, there is no problem in inspection accuracy.

The calculation unit 41a performs arithmetic processing such that the second scaling magnification decreases as the first zoom magnification received by the interface unit 40c increases. The logic unit 31b decreases a downscaling amount for the second captured image B1' as the second scaling magnification arithmetic-processed by the calculation unit 41a decreases. As a result, the logic unit 31b generates an inspection target image with high pixel resolution.

The calculation unit 41a calculates a ratio of which pixel of the second captured image B1' one pixel of the inspection target image B3 having the first number of pixels corresponds to, based on the first zoom magnification received by the interface unit 40c. The calculation unit 41a calculates the second scaling magnification by using this ratio.

In a case where the interface unit 40c receives an instruction to adjust the first zoom magnification with accuracy after a decimal point, the calculation unit 41a calculates a ratio of which pixel of the second captured image B1' one pixel of the inspection target image B3 corresponds to, up to the decimal point with accuracy after the decimal point, based on the zoom magnification for which the adjustment instruction is received. As a result, the calculation unit 41a calculates the second scaling magnification with accuracy after the decimal point. The logic unit 31b generates the inspection target image based on the second scaling magnification calculated with accuracy after the decimal point.

Figure 10:
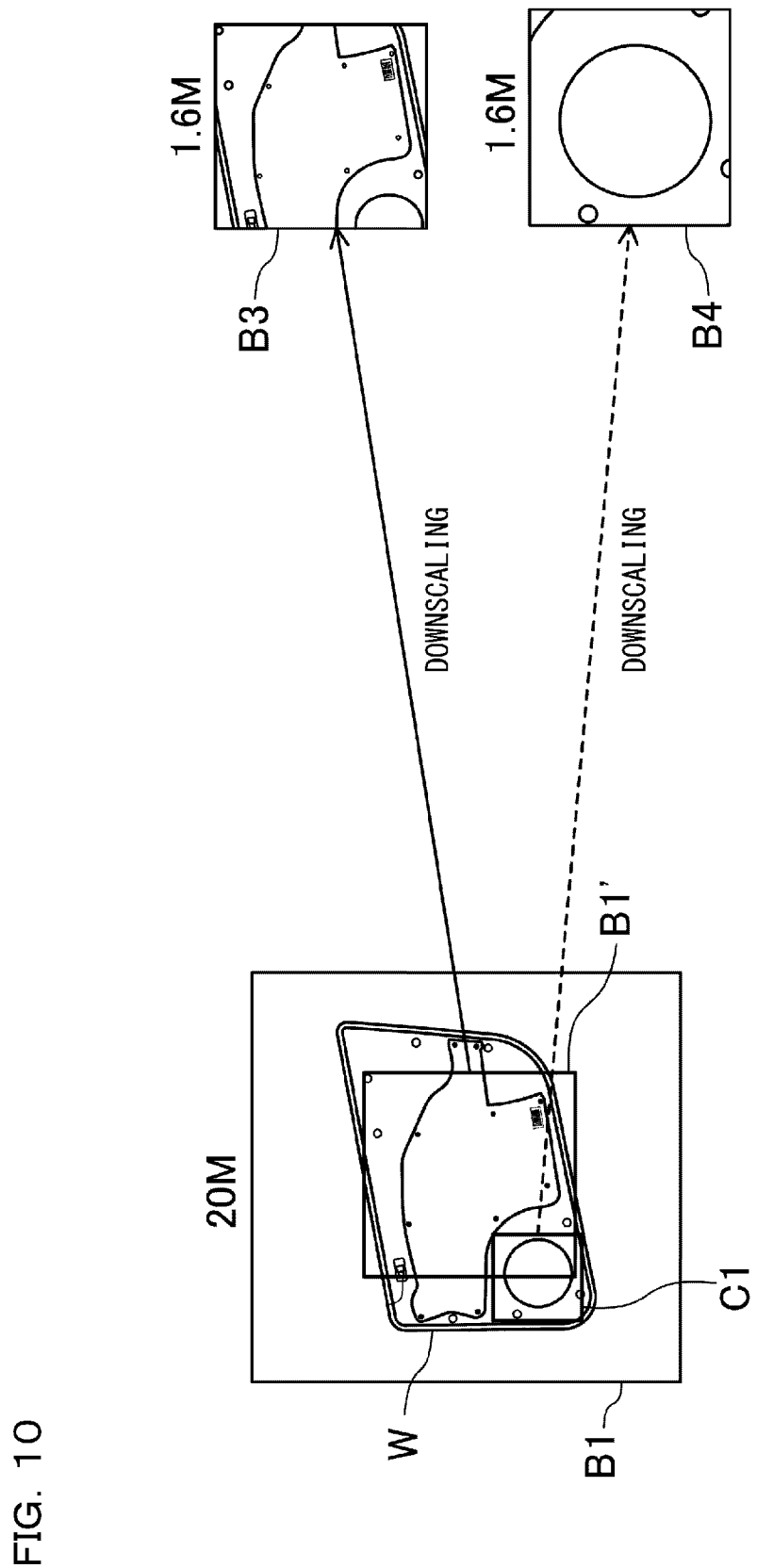
FIG. 10 is a diagram for describing a case where downscaling is performed based on a zoom instruction at any position.

FIG. 10 is a diagram for describing a case where downscaling is performed based on a zoom instruction at any position. The interface unit 40c is configured to be able to receive, as the zoom instruction at any position of the inspection target image, the first zoom instruction to change the output region of the photoelectric conversion unit 31a to the relatively small region. Specifically, for the sake of convenience in description, a frame C1 in the captured image B1 in FIG. 10 indicates a position and a region where the zoom instruction is received within the field of view range of the imaging unit, and the user may designate the frame C1 for the inspection target image B2 via the mouse 8 or the like while the monitor 9 on which the inspection target image B2 obtained by downscaling the entire captured image B1 in FIG. 9 is displayed is confirmed. The position of the frame C1 may be disposed at any position in the inspection target image B2 (that is, the field of view range of the imaging unit), and the interface unit 40c detects the disposed position. In addition, a size and a shape of the frame C1 can also be randomly set by the user.

When the zoom instruction in which the frame C1 is designated as any position by the interface unit 40c is received, the logic unit 31b performs downscaling at the scaling magnification necessary for setting the region (that is, the captured image corresponding to the frame C1, and has the number of pixels larger than 1.6 MP) corresponding to the output region including any position to 1.6 MP within the field of view range of the imaging unit. As a result, the logic unit 31b generates an inspection target image B4 including any position. The position of the frame C1 may be shifted in an X direction (horizontal direction of the image) or a Y direction (vertical direction of the image) from a center of the field of view range of the imaging unit, and a region at a position shifted from the center of the field of view range of the imaging unit, that is, the optical axis can be downscaled. That is, zooming is performed along the center of the optical axis in general optical zooming, but in the downscaling of the present example, zooming can be performed in not only the center of the optical axis but also the region shifted from the center of the optical axis, and a degree of freedom in position setting of a region that can be downscaled is high.

Figure 11:
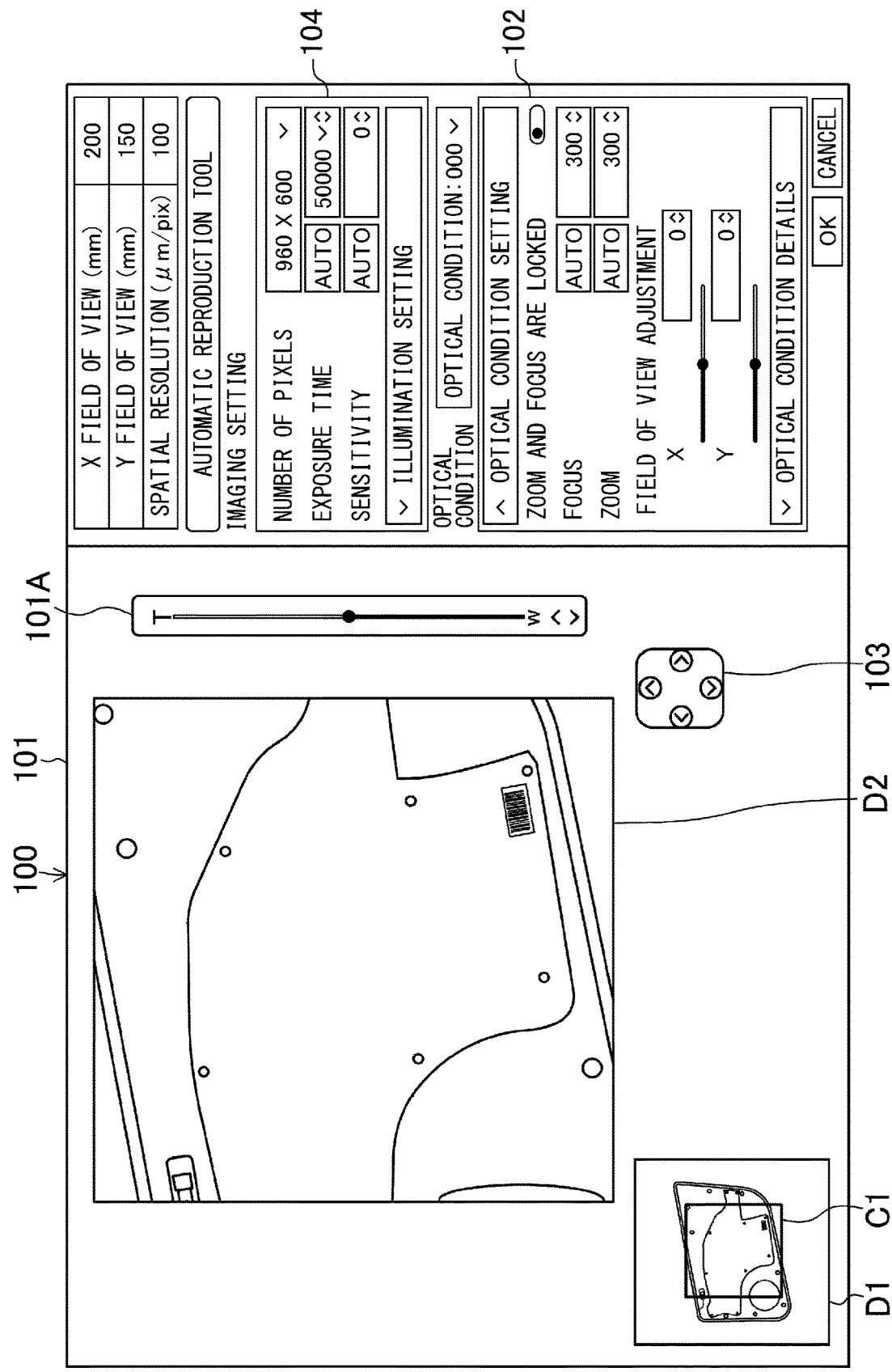

FIG. 11 illustrates a user interface screen 100 for setting in which the zoom instruction can be received. The user interface screen 100 is generated by the control unit 5a of the controller 3 and is displayed on the monitor 9. On the user interface screen 100, an operation using the keyboard 7 or the mouse 8 can be performed, and the control unit 5a detects and stores which operation is performed.

An image display region 101 is provided in the user interface screen 100. A bird's-eye view image D1 in which a position of the output region in the entire field of view range of the photoelectric conversion unit 31a and an inspection target image D2 corresponding to the output region is shown are displayed in the image display region 101. That is, the interface unit 40c of the industrial camera 1 illustrated in FIG. 7 is configured to be able to output, to the outside, the bird's-eye view image D1 in which the position of the output region in the entire field of view range of the photoelectric conversion unit 31a is shown and the inspection target image D2 corresponding to the output region. Specifically, the output unit 42 is provided in the main board 40. The output unit 42 is a portion that outputs the bird's-eye view image D1 and the inspection target image D2 output from the image sensor 31 to the outside. When the images are output, image data is transmitted from the industrial camera 1 to the controller 3 via, for example, an input and output terminal 60 and the cable 10.

A zoom adjustment region 101A in which the user adjusts the zoom magnification is provided on the user interface screen 100 illustrated in FIG. 11. The zoom adjustment region 101A is operated to a "T" side with the mouse 8, and thus, the field of view range is narrowed by zooming to a telephoto side. On the other hand, the zoom adjustment region is operated to a "W" side to conversely enlarge the field of view range. In addition, the zoom magnification can also be adjusted by operating a wheel of the mouse 8. The adjusted zoom magnification is temporarily stored on the controller 3 side, is transferred to the interface unit 40c of the industrial camera 1, and is received by the interface unit 40c.

The zoom magnification can be adjusted by a numerical value. That is, a numerical value input region 102 is provided on the user interface screen 100. The numerical value input region 102 is for the user to adjust the zoom magnification by inputting a numerical value, and a numerical value can be randomly input by the keyboard 7, the mouse 8, or the like.

Figure 12:
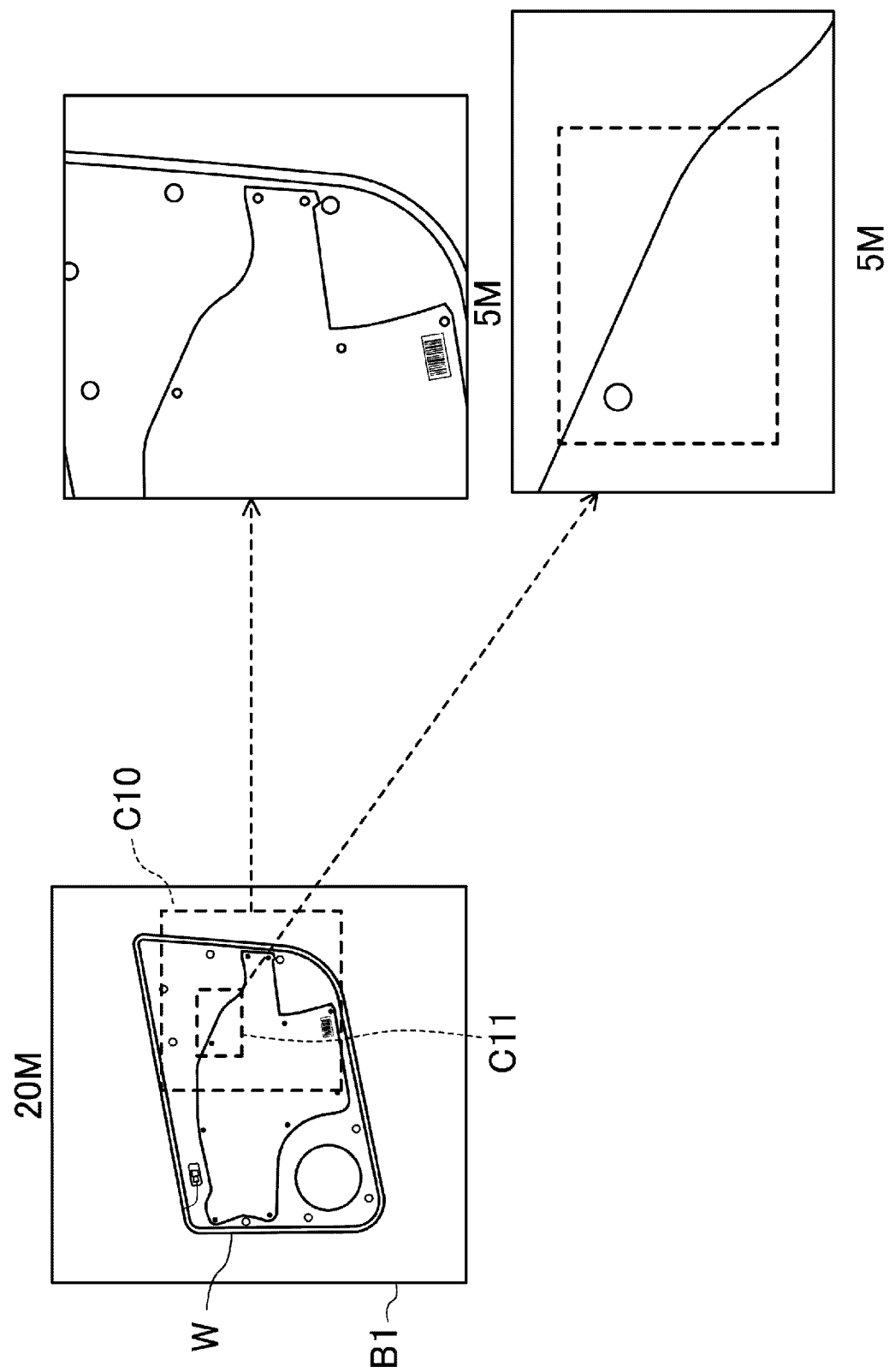
FIG. 12 is a diagram for describing a case where downscaling is performed based on a zoom instruction by region selection using a mouse.

FIG. 12 is a diagram for describing a case where downscaling is performed based on a zoom instruction by region selection using the mouse 8. A frame C10 is formed by an operation of the mouse 8, and can be formed, for example, by performing a dragging operation from an upper left to a lower right (or from an upper right to a lower left, or the like). The logic unit 31b generates the inspection target image with 5 MP by downscaling the captured image corresponding to the region surrounded by the frame C10. In addition, a frame C11 can be formed by the operation of the mouse 8, and the region in the frame C11 is enlarged. At this time, in a case where a region in the frame C11 in the captured image B1 is less than 5 MP and a size of the inspection target image to be output is 5 MP, since the region exceeds a maximum resolution (resolution of the captured image B1), the region with 5 MP including the frame C11 is downscaled (that is, is not substantially downscaled) at a scaling magnification of 1 time, and is output as the inspection target image.

Figure 13:
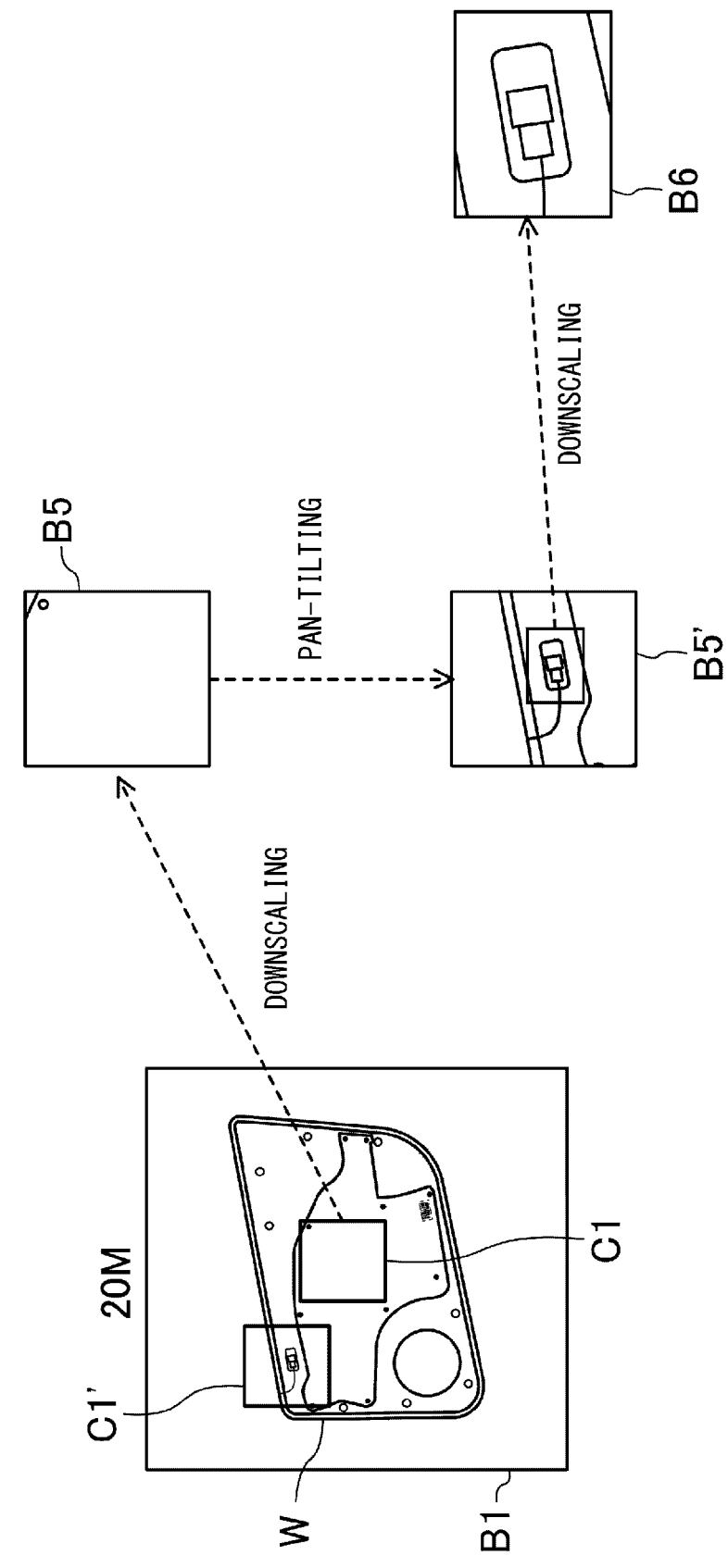
FIG. 13 is a diagram for describing a case where downscaling is performed after pan-tilting at any position.

FIG. 13 is a diagram for describing a case where downscaling is performed after any position is pan-tilted. The interface unit 40c is configured to be able to receive a first pan-tilt instruction for adjusting any position in the X direction and the Y direction. For example, after a center of the field of view range of the photoelectric conversion unit 31a is designated as the region of interest by the frame C1, the position of the frame C1 is moved in the X direction and the Y direction, and is disposed, for example, at a position indicated by reference numeral C1'. In a case where downscaling is performed in the frame C1, an inspection target image B5 is obtained. The logic unit 31b generates an inspection target image B5' of which a position in the X direction and the Y direction is adjusted by downscaling the captured image corresponding to any position (position of the frame C1') adjusted in the X direction and the Y direction. The logic unit 31b generates an inspection target image B6 by further downscaling a part of a region surrounded by the frame C1'.

The adjustment in the X direction and the Y direction can be performed by using the user interface screen 100 illustrated in FIG. 11. A field of view position adjustment region 103 is provided on the user interface screen 100. The field of view position adjustment region 103 is formed by combining arrows and the like directed in upper, lower, left, and right directions, and for example, when an upward arrow is operated, the position of the frame C1 moves upward. Similarly, the position of the frame C1 can be adjusted to any position in the lower, left, and right directions. The frame C1 may be directly dragged by the mouse 8.

Figure 14:
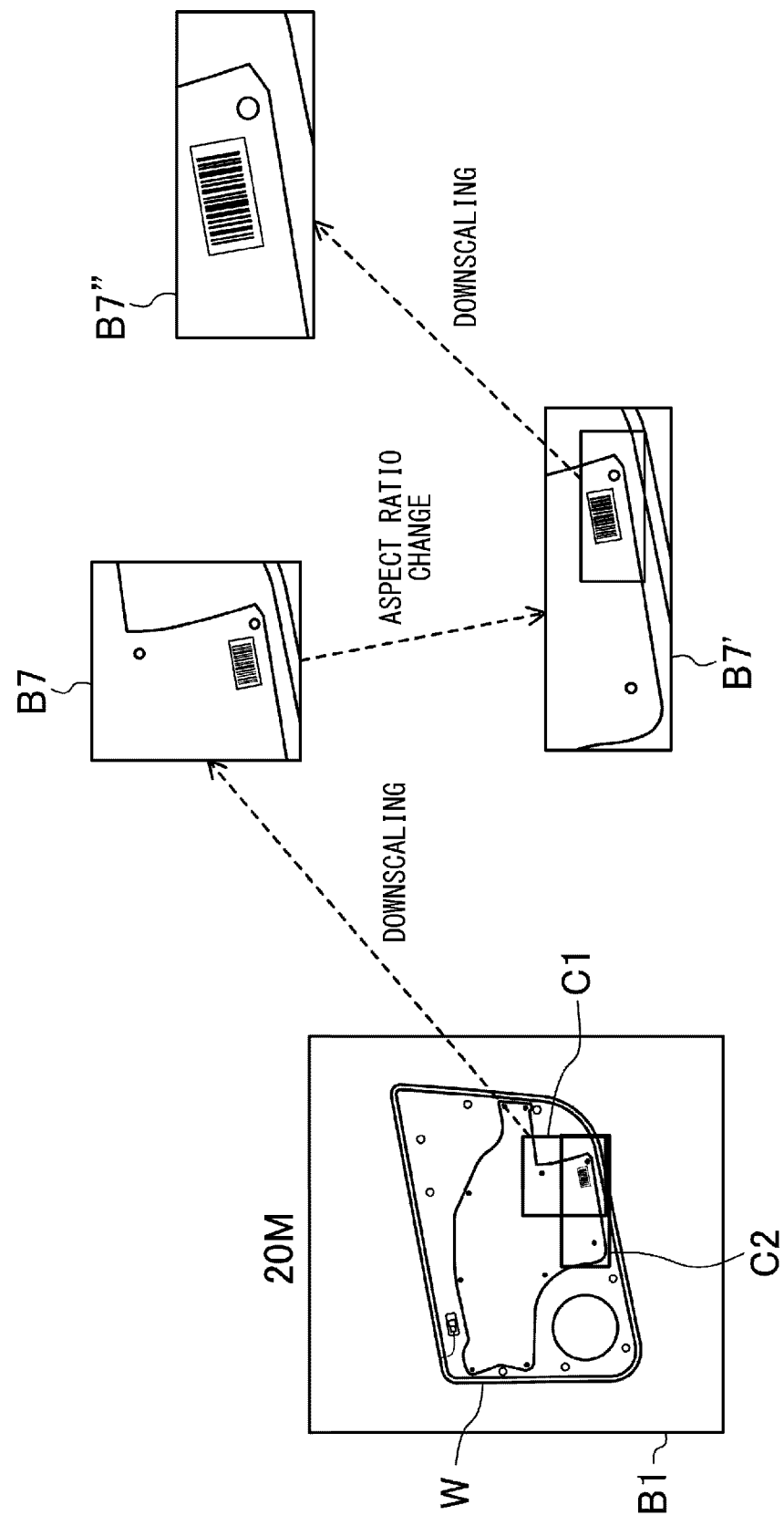
FIG. 14 is a diagram for describing a case where downscaling is performed in a state where an aspect ratio of an image is changed.

FIG. 14 is a diagram for describing a case where downscaling is performed in a state where the aspect ratio of the image is changed. The interface unit 40c is configured to be able to receive a change in the aspect ratio of the output region of the photoelectric conversion unit 31a. For example, as indicated by the frame C1, when the zoom instruction at any position within the field of view range of the imaging unit is received, the logic unit 31b generates an inspection target image B7 by downscaling the captured image corresponding to the frame C1. Thereafter, the user can freely designate the aspect ratio of the region specified by the frame C1. A region in which an aspect ratio is changed is indicated by a frame C2. The logic unit 31b generates an inspection target image B7' by downscaling the region corresponding to the output region (region surrounded by the frame C2) with the changed aspect ratio. An inspection target image B7" is generated by further downscaling a part of a region surrounded by the frame C2.

Figure 15:
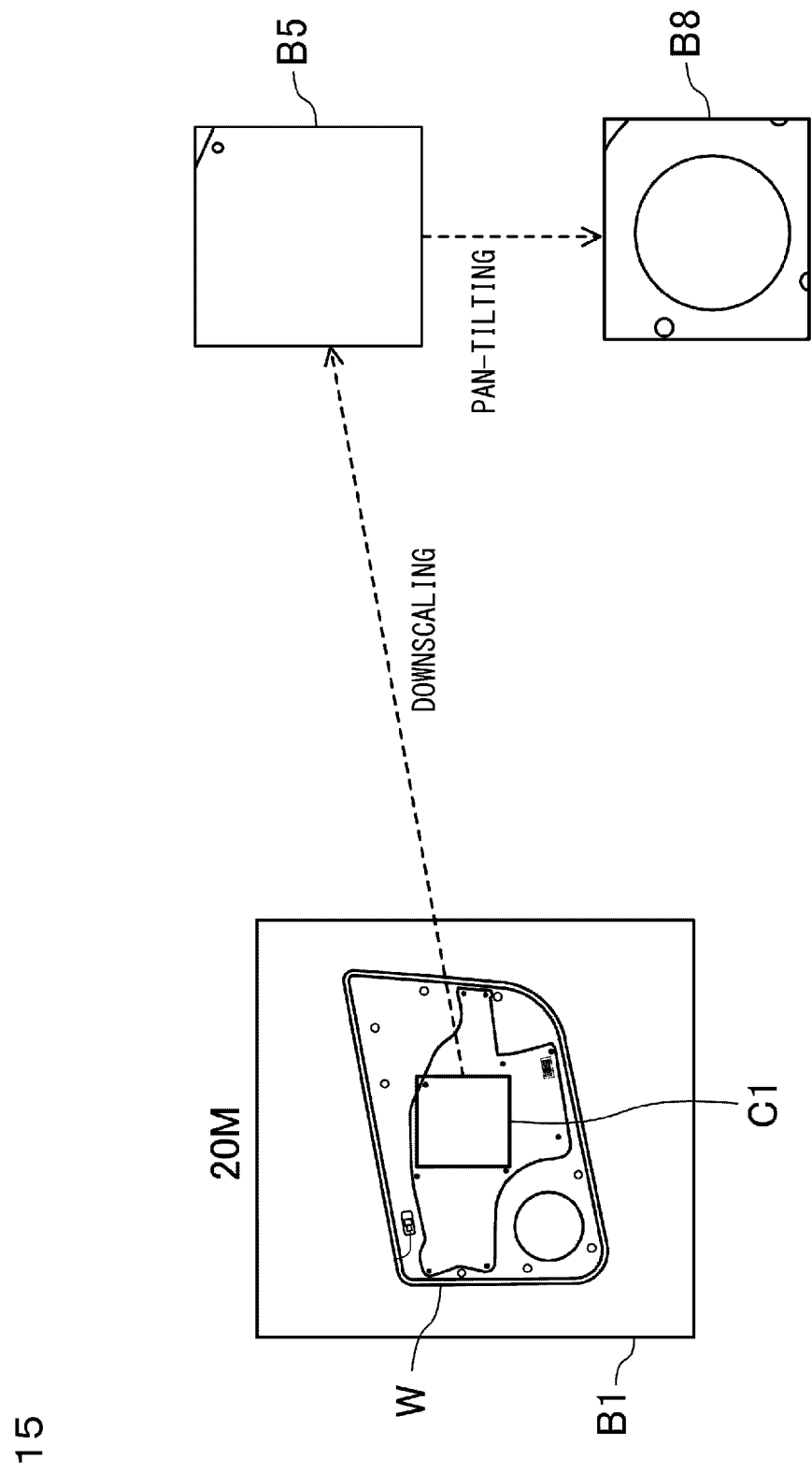
FIG. 15 is a diagram for describing a case where pan-tilting is performed after downscaling around a fixed point.

FIG. 15 is a diagram for describing a case where pan-tilting is performed after downscaling around a fixed point. For example, in a case where a center of a field of view of the photoelectric conversion unit 31a is set as a fixed point, the logic unit 31b generates the inspection target image B5 by downscaling the frame C1 including the center of the field of view range of the imaging unit, and then performs pan-tilting as illustrated in FIG. 13. Thus, the logic unit 31b generates an inspection target image B8 by downscaling the captured image corresponding to the pan-tilted region.

In addition, the interface unit 40c is configured to be able to receive a number-of-pixels change instruction to change the number of pixels of the inspection target image from the first number of pixels to the second number of pixels. The second number of pixels is the number of pixels larger than the first number of pixels. Specifically, a number-of-pixels setting region 104 is provided on the user interface screen 100 illustrated in FIG. 11. In the number-of-pixels setting region 104, the number of pixels of the inspection target image can be selected from among predetermined options in the form of a pull-down menu. The number of selectable pixels can be, for example, in a range of 1.6 MP or more and 5 MP or less, but is not limited thereto.

In addition, the interface unit 40c is configured to be able to receive a number-of-pixels change instruction to change the number of pixels of the inspection target image from the first number of pixels to the second number of pixels. The second number of pixels is the number of pixels larger than the first number of pixels. Specifically, a number-of-pixels setting region 104 is provided on the user interface screen 100 illustrated in FIG. 11. In the number-of-pixels setting region 104, the number of pixels of the inspection target image can be selected from among predetermined options in the form of a pull-down menu. The number of selectable pixels can be, for example, in a range of 1.6 M or more and 5 M or less, but is not limited thereto. an upper limit of the number of selectable pixels can be set by a contract with the user. For example, in a case where the contract with the user is a low price, the upper limit of the number of selectable pixels is decreased, and in a case where the contract with the user is a high price, the upper limit of the number of selectable pixels is increased. Accordingly, high-accuracy inspection can be performed.

In addition, in the number-of-pixels setting region 104, an aspect ratio can also be selected. That is, a plurality of options, each of which is a combination of the number of pixels and the aspect ratio of the inspection target image, are displayed in the pull-down menu of the number-of-pixels setting region 104. The user can select any one option among the options. Information regarding the number of selected pixels is received by the interface unit 40c and is transmitted, as the number-of-pixels change instruction, to the processor 41 of the industrial camera 1.

When the processor 41 receives the number-of-pixels change instruction, the calculation unit 41a calculates a scaling magnification necessary for setting the captured image corresponding to the same output region as the output region before the number-of-pixels change instruction to have the second number of pixels within the field of view range of the photoelectric conversion unit 31a. The scaling magnification calculated by the calculation unit 41a is sent to the logic unit 31b, and the logic unit 31b generates the inspection target image having the second number of pixels by downscaling the captured image at the scaling magnification. In a case where the aspect ratio is changed, the logic unit 31b generates the inspection target image with the changed aspect ratio by downscaling the region corresponding to the output region with the changed aspect ratio within the field of view range of the photoelectric conversion unit 31a. That is, the logic unit 31b generates the inspection target image according to the combination of the number of pixels and the aspect ratio of the inspection target image selected in the number-of-pixels setting region 104.

Figure 16:
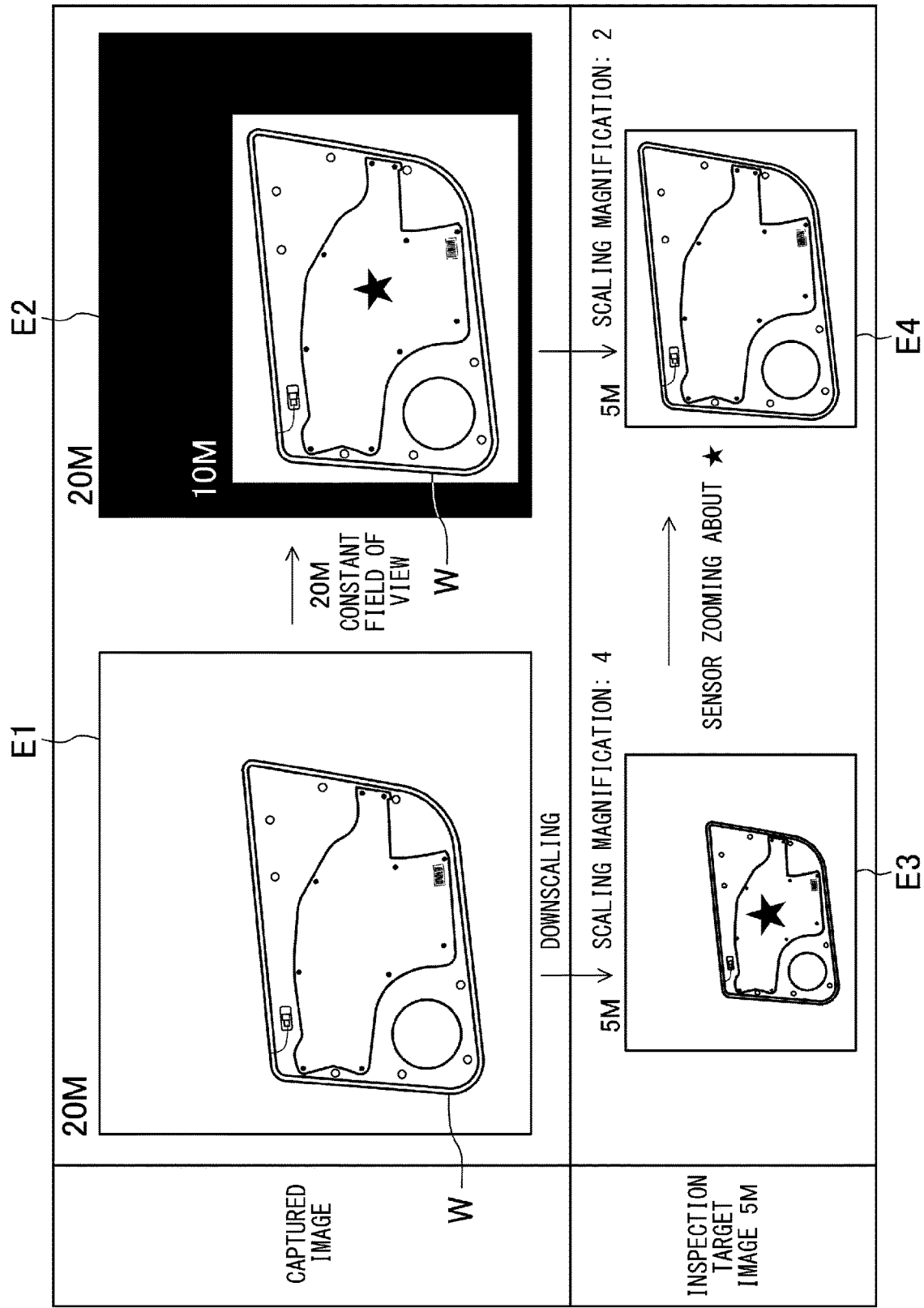
FIG. 16 is a diagram for describing a case of a zoom magnification capable of coping with only by downscaling.

FIG. 16 is a diagram for describing a case where the zoom magnification can cope with only by the downscaling, that is, a case where the optical zooming is unnecessary. An upper side of FIG. 16 shows captured images E1 and E2, and a lower side shows inspection target images E3 and E4. Since fields of view of the left captured image E1 and the right captured image E2 are constant and a signal of a black region where the workpiece W is not present is not read out in the right captured image E2, the number of pixels of the left captured image E1 is 20 MP, and the number of pixels of the right captured image E2 is 10 MP. When the left captured image E1 is downscaled at a scaling magnification of 4 times, the left inspection target image E3 is obtained. The left inspection target image E3 is an image obtained by outputting a region corresponding to the number of pixels of 20 MP pixels with the number of pixels of 5 MP. In addition, since the signal of the black region is not read out in the right captured image E2, it is possible to perform the downscaling at a scaling magnification of 2 times, and the right inspection target image E4 is obtained. The right inspection target image E4 is an image obtained by outputting a region corresponding to the number of pixels of 10 MP with the number of pixels of 5 MP. In addition, the right inspection target image E4 more finely divided is obtained by zooming a center of the left inspection target image E3.

That is, even though the optical zooming is not used, the inspection target image E4 in which the workpiece W is enlarged and displayed is obtained while a pixel resolution is higher than a pixel resolution of the inspection target image E3. In the present specification, this zoom processing may be referred to as "sensor zooming".

Figure 17:
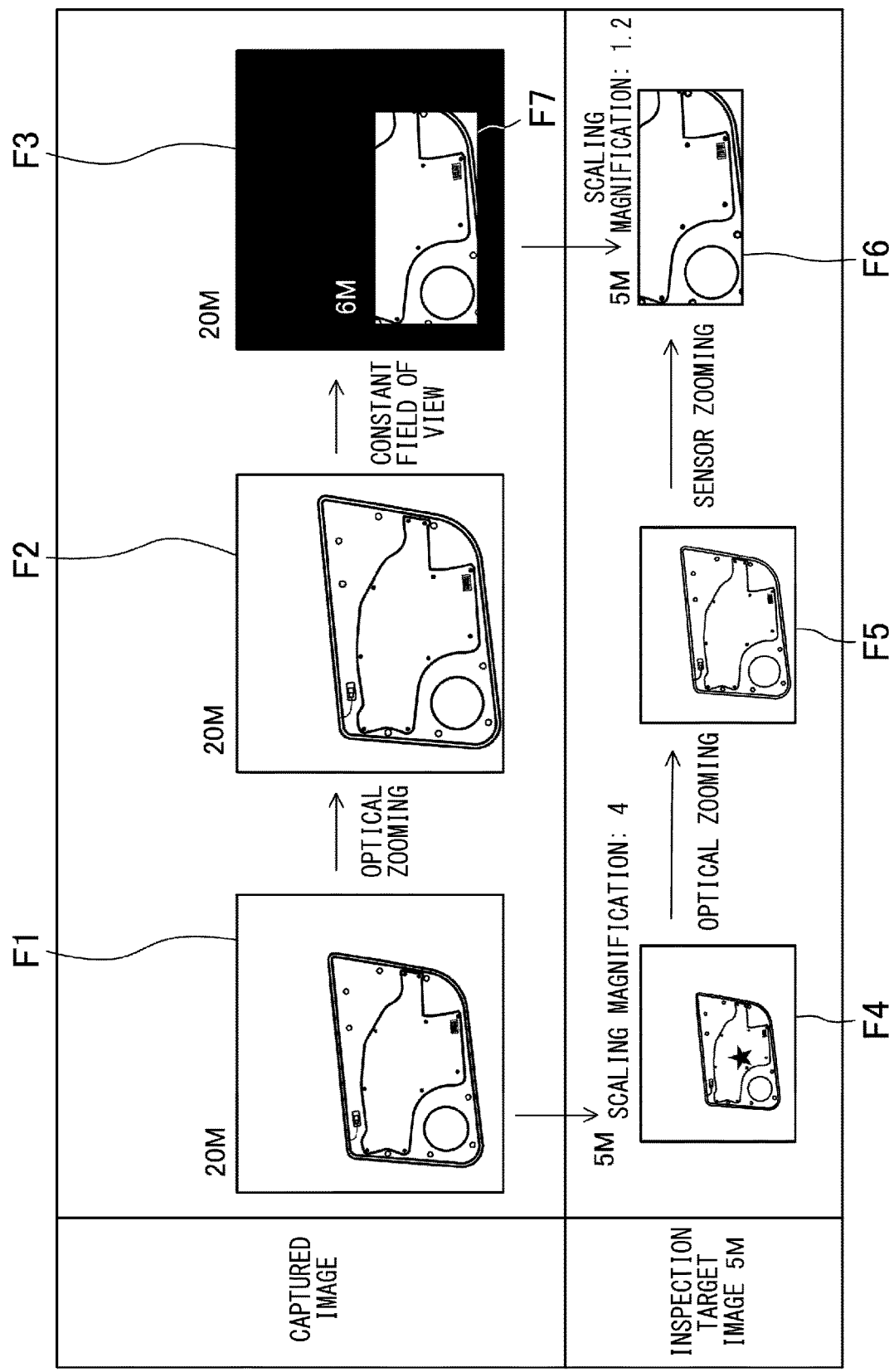
FIG. 17 is a diagram for describing a case of a zoom magnification capable of coping with downscaling and optical zooming.

FIG. 17 is a diagram for describing a case where the zoom magnification is equal to or more than a certain magnification and it is necessary to cope with both the downscaling and the optical zooming. An upper side of FIG. 17 shows a captured image F1, an optical zoom image F2, and a captured image F3, and a lower side shows inspection target images E4, E5, and E6. The optical zoom image F2 having a narrow field of view range is obtained by performing the optical zooming in a range in which the captured image F1 is generated. A signal of a black region where the workpiece W is not present is not read out in the right captured image F3. A portion surrounded by a frame F7 of the right captured image F3 is set as the region of interest. The number of pixels in the region of interest is 6 MP.

When the left captured image F1 is downscaled at a scaling magnification of 4 times, a left inspection target image F4 is obtained. Since a central inspection target image F5 is an image acquired by the optical zooming, the central inspection target image is zoomed along the center of the field of view of the photoelectric conversion unit 31a. Thus, when a center of the workpiece W is shifted from the center of the field of view of the photoelectric conversion unit 31a, the workpiece W is shifted from the center of the image in the image after the zooming. A pixel resolution of the central inspection target image F5 is improved. A right inspection target image F6 is an image obtained by downscaling the region of interest surrounded by the frame F7 of the right captured image F3 at a scaling magnification of 1.2 times, and the number of pixels is 5 MP.

FIG. 18 is a diagram for describing an example of a case where the optical zooming and the downscaling are combined, and illustrates pattern 1 and pattern 2. In pattern 1, the optical zooming is turned off and the zooming by the downscaling is performed without performing the optical zooming a region where the designated zoom magnification is low to a downscaling limit neighboring magnification. The downscaling is fixed at the downscaling limit neighboring magnification. When the magnification exceeds the downscaling limit neighboring magnification, the optical zooming is turned on, and the zooming is performed to a magnification upper limit of the optical zooming. At this time, as the designated zoom magnification increases, the optical magnification of the optical zooming also increases. When the magnification exceeds the magnification upper limit of the optical zooming, the optical zooming is fixed, and the sensor zooming by the downscaling is performed. According to this pattern 1, since the downscaling can be executed (that is, remaining power of the sensor zooming can be left) even after the optical zooming, fine adjustment when a region to be finally output as the inspection target image is determined can be executed by the sensor zooming instead of the optical zooming.

In pattern 2, the zooming by the downscaling is performed without performing the optical zooming from a region where the zoom magnification is low to a downscaling limit magnification (1 time). Since the downscaling is performed up to the downscaling limit magnification, the downscaling is not performed thereafter. When the magnification exceeds the downscaling limit magnification, the zooming is performed to the magnification upper limit of the optical zooming by using the optical zooming.

That is, as described with reference to FIGS. 16 to 18, in a case where the zoom magnification instructed by the user via the interface unit 40c is equal to or less than a predetermined magnification, the logic unit 31b is configured to generate the inspection target image by downscaling the second captured image at the second scaling magnification calculated based on the instructed zoom magnification. On the other hand, in a case where the zoom magnification instructed by the user via the interface unit 40c is more than the predetermined magnification, the logic unit 31b is configured to generate the inspection target image corresponding to the instructed zoom magnification by the optical zooming by the zoom optical system. The predetermined magnification can be a zoom magnification at which the second scaling magnification is a scaling limit neighboring magnification near 1 time of the lower limit.

In a case where the zoom magnification instructed by the user via the interface unit 40c is more than the predetermined magnification, the calculation unit 41a performs the optical zooming by the zoom optical system. In addition, the logic unit 31b generates the inspection target image with the instructed zoom magnification by performing downscaling at the scaling limit neighboring magnification.

In addition, the interface unit 40c is configured to be able to receive a larger zoom magnification even after the optical magnification of the optical zooming reaches the upper limit. When the magnification reaches the upper limit of the zoom magnification that can be received by the interface unit 40c, the calculation unit 41a executes driving of the optical zooming at the optical magnification of the upper limit. In addition, the logic unit 31b generates the inspection target image by downscaling the captured image corresponding to the output region captured at the optical magnification of the upper limit of the zoom magnification that can be received by the interface unit 40c at a scaling magnification of 1 time (substantially without downscaling). That is, when the designation of the zoom magnification is received from the user, the calculation unit 41a calculates the optical magnification of the optical zooming and the scaling magnification of the downscaling based on the received zoom magnification. The zoom optical system is driven based on the calculated optical magnification.

In addition, the calculation unit 41a can receive a change in the zoom magnification as a change instruction signal by the interface unit 40c. In a case where the zoom magnification instructed to be changed based on the change instruction signal is equal to or less than the predetermined magnification, a control signal is transmitted to the image sensor 31 such that the downscaling of the captured image is executed at the scaling magnification calculated by the calculation unit 41a, and the downscaling is executed. On the other hand, in a case where the zoom magnification instructed to be changed based on the change instruction signal is more than the predetermined magnification, a drive signal is transmitted to the zoom optical system, that is, the zooming motor 56c to perform the optical zooming. The zooming motor 56c is operated by the drive signal, and a desired zoom magnification is obtained.

Figure 19B:
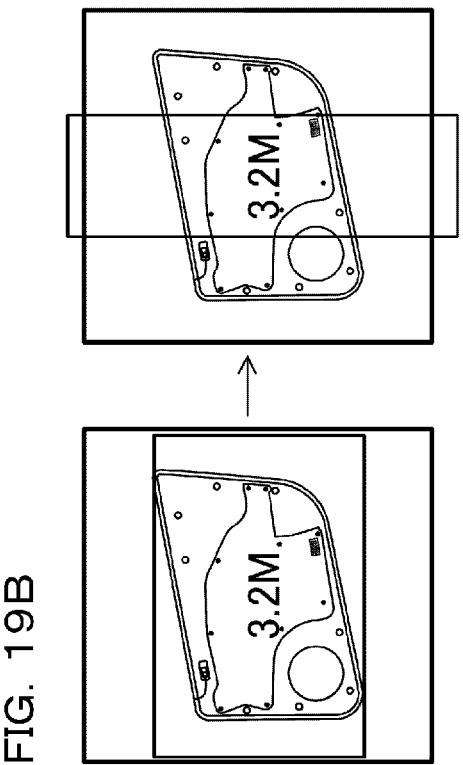
FIGS. 19A and 19B are diagrams for describing an example of a case where only an aspect ratio during downscaling is changed.
Figure 19A:
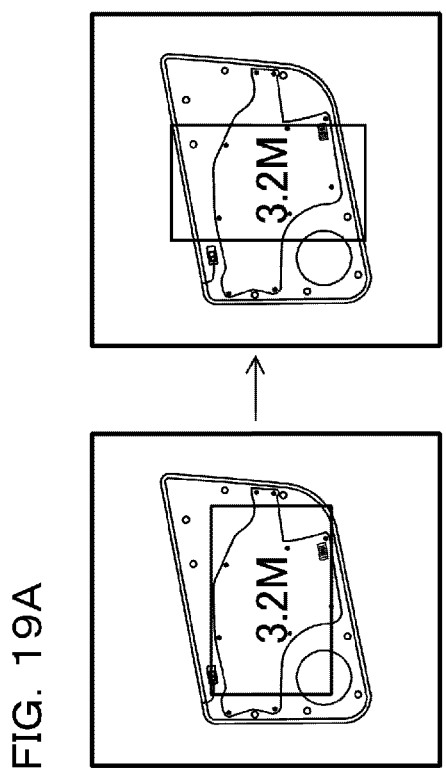

As illustrated in FIGS. 19A and 19B, the aspect ratio of the image can be changed during downscaling. FIGS. 19A and 19B illustrate a case where a horizontally long region of interest is changed to a vertically long region of interest, but on the contrary, a vertically long region of interest may be changed to a horizontally long region of interest. This change instruction is performed by the user via the number-of-pixels setting region 104 of the user interface screen 100 illustrated in FIG. 11. Note that, as illustrated in FIG. 19B, a case where the region of interest is positioned outside a range that can be captured by the photoelectric conversion unit 31a in the aspect ratio for which the change instruction is received due to the restriction of a shape of the photoelectric conversion unit 31a is considered. In this case, the calculation unit 41a recalculates the scaling magnification during downscaling to satisfy the aspect ratio for which the change instruction is received as much as possible, and the logic unit 31b generates the inspection target image by performing downscaling at the recalculated scaling magnification.

Figure 20A:
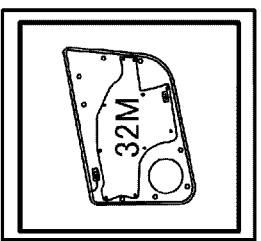
FIGS. 20A to 20F are diagrams for describing an example of a case where the number of pixels is increased or decreased during downscaling.
Figure 20B:
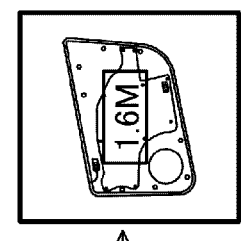
Figure 20C:
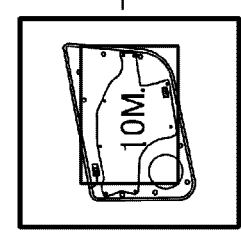

As illustrated in FIGS. 20A to 20F, the number of pixels can be increased or decreased during downscaling based on setting by the user. FIGS. 20A, 20B, and 20C illustrate a case where the number of pixels is changed without changing a spatial resolution (scaling magnification). In FIGS. 20A and 20B, since the number of pixels is changed within the range that can be captured by the photoelectric conversion unit 31a, the calculation unit 41a calculates the scaling magnification reflecting the setting by the user, and the logic unit 31b generates the inspection target image by performing downscaling at the calculated scaling magnification. On the other hand, in FIG. 20C, when the setting by the user is reflected, since the range exceeds the range that can be captured by the photoelectric conversion unit 31a, the calculation unit 41a calculates the scaling magnification to limit a change in the number of pixels without using the setting by the user. During calculation, the scaling magnification is made as close as possible to the setting by the user.

The logic unit 31b generates the inspection target image by performing downscaling at the calculated scaling magnification.

Figure 20D:
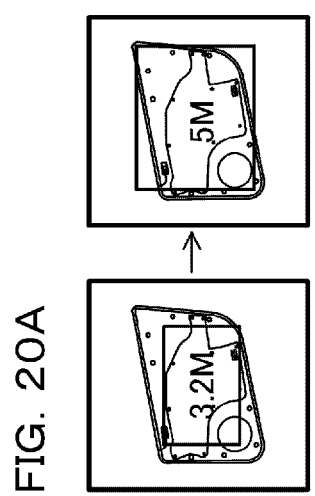
Figure 20E:
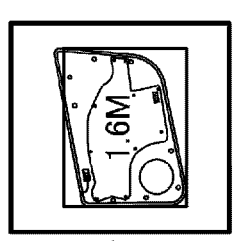
Figure 20F:
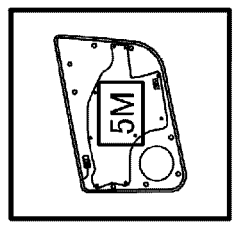

FIGS. 20D, 20E, and 20F illustrate a case where the number of pixels is changed without changing an imaging field of view. In FIGS. 20D and 20E, since the number of pixels is changed to a minimum resolution or more, the calculation unit 41a calculates the scaling magnification reflecting the setting by the user, and the logic unit 31b generates the inspection target image by performing downscaling at the calculated scaling magnification. On the other hand, since FIG. 20F illustrates the change to the number of pixels less than the minimum resolution, the calculation unit 41a calculates the scaling magnification to limit the change in the number of pixels without using the setting by the user, and the logic unit 31b generates the inspection target image by performing the downscaling with the calculated scaling magnification. That is, the calculation unit 41a is configured to be able to limit the change from the first number of pixels to the second number of pixels based on the setting by the user.

In addition, the interface unit 40c is configured to be able to receive a second zoom instruction to change the output region to a relatively smaller region and a second pan-tilt instruction to further adjust the output region in the X direction and the Y direction after the number-of-pixels change instruction by the user. Similar to the second zoom instruction, the second zoom instruction can be received by an instruction of the user. In addition, similar to the first pan-tilt instruction, the second pan-tilt instruction can be received by an instruction of the user.

In a case where the interface unit 40c receives the second zoom instruction and the second pan-tilt instruction, the calculation unit 41c calculates a scaling magnification necessary for setting the captured image corresponding to the output region changed by at least one of the second zoom instruction and the second pan-tilt instruction to have the second number of pixels within the field of view range of the photoelectric conversion unit 31a. The logic unit 31b generates the inspection target image with the second number of pixels by downscaling the captured image at the scaling magnification calculated by the calculation unit 41c.

Figure 21:
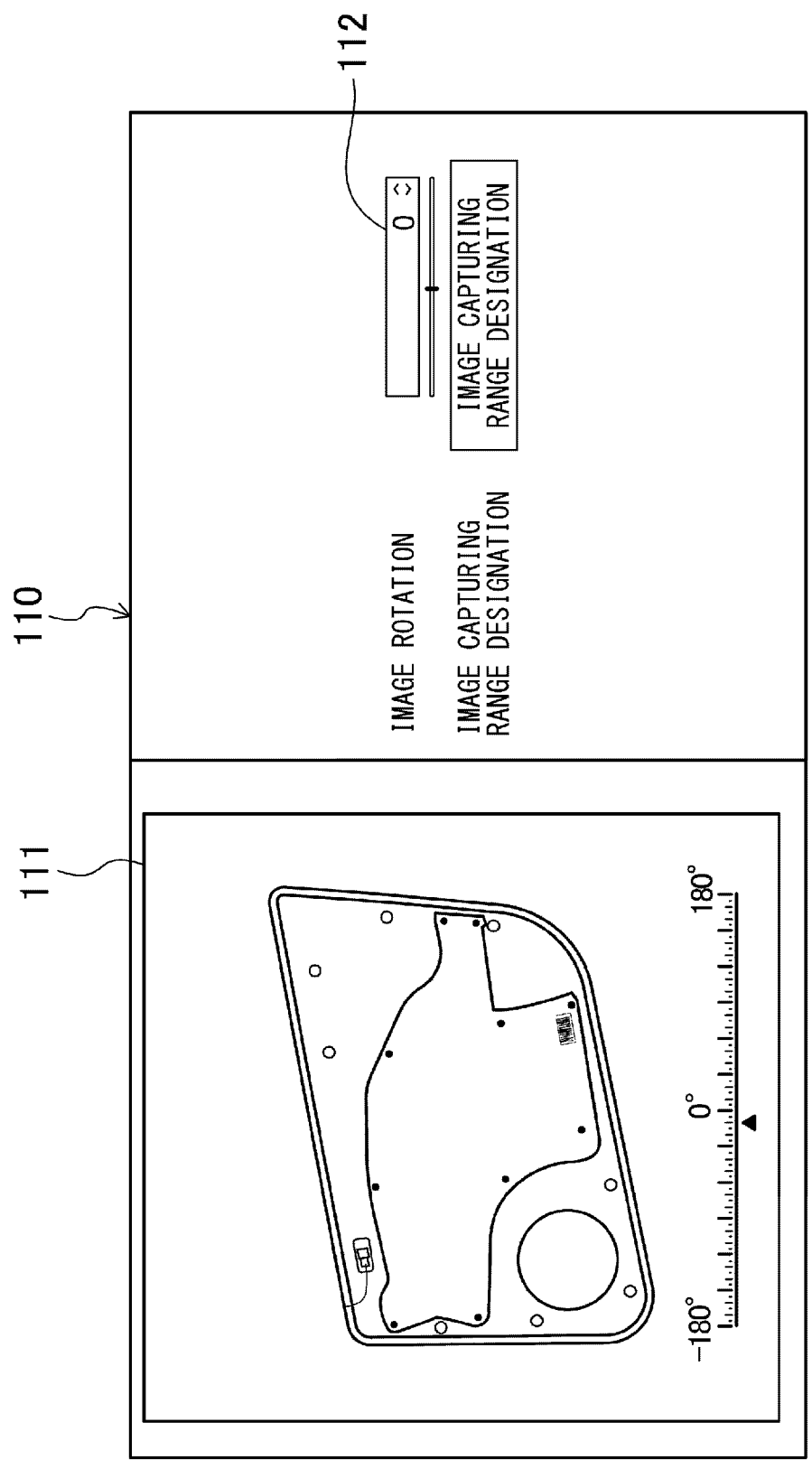
FIG. 21 is a diagram for describing an example of a case where an inspection target image after rotation is generated.

FIG. 21 is a diagram for describing an example of a case where the inspection target image after rotation is generated, and illustrates a user interface screen 110 for rotation setting. An image display region 111 where the inspection target image corresponding to the output region of the photoelectric conversion unit 31a is displayed, and a rotation angle setting region 112 are provided on the user interface screen 110 for rotation setting. In the rotation angle setting region 112, a rotation direction of the image and an rotation angle can be set, and these setting items can be set by the user operating the keyboard 7 or the mouse 8.

When the rotation direction and the rotation angle are set in the rotation angle setting region 112, the calculation unit 41a rotates the inspection target image by the set angle in the set direction in a state where the number of pixels and the shape of the inspection target image are set. That is, the calculation unit 41a applies rotation conversion processing of any angle to the inspection target image. As a result, since the inspection target image after rotation can be generated and displayed in the image display region 111, for example, when the installation direction of the industrial camera 1 is inclined, an inclination thereof can be corrected on software.

Figure 22:
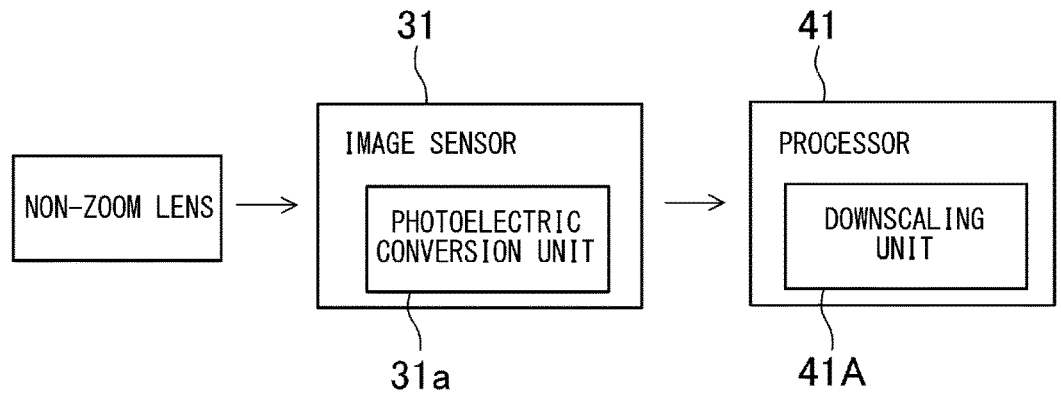
FIG. 22 is a diagram illustrating an example of a case where downscaling is realized by a processor.

FIG. 22 is a diagram illustrating an example of a case where downscaling is realized by the processor 41. As illustrated in this drawing, the lens unit is a non-zoom lens that cannot be optically zoomed. The image sensor 31 outputs the image captured by the photoelectric conversion unit 31a to the processor 41 without downscaling the image. A downscaling unit 41A is provided in the processor 41, and the downscaling unit 41A generates an inspection target image by executing downscaling as described above. The other processing is the same as the case where the image sensor 31 executes downscaling.

(Processing of Color Captured Image)

Since the color captured image can be generated by the image sensor 31, the interface unit 40c can receive the designation of the output region that is the region to be output as the color inspection target image in the field of view range of the photoelectric conversion unit 31a.

Figure 23:
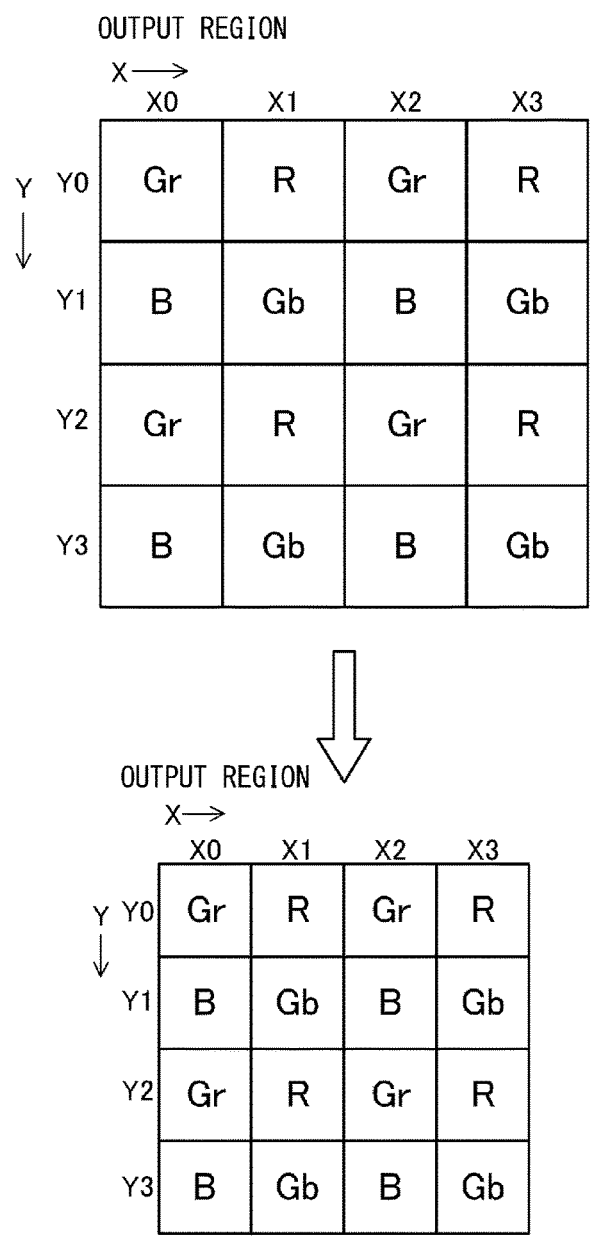
FIG. 23 is a conceptual diagram of a case where a color captured image is downscaled.

Since the image sensor 31 includes the color filter 31c, it is possible to generate the color captured image in which colors are formed in a predetermined array pattern. Specifically, the array pattern of the color captured images output by the photoelectric conversion unit 31a is a Bayer array as illustrated in FIG. 23. In the Bayer array, in addition to red components (R pixels) and blue components (B pixels), first green component (Gr pixels) and second green components (Gb pixels) are arrayed in a predetermined array pattern. The array pattern is not limited to the Bayer array, and may be another array pattern.

In addition, the photoelectric conversion unit 31a is configured to be able to generate color inspection target images with different numbers of pixels. In a case where the color captured image is generated by the photoelectric conversion unit 31a, the processor 41 executes arithmetic processing and image processing described above on the color inspection target image. In the present example, since the color filter 31c is provided, the color captured image can be generated without using a three-chip camera and without turning off RGB in time series.

After the color captured image corresponding to the output region of the field of view range of the photoelectric conversion unit 31a is acquired, the logic unit 31b individually downscales the colors of the color captured image based on the array pattern, and disposes pixel values of the colors after downscaling such that the array pattern of the colors coincides with the array pattern of the color captured image. As a result, it is possible to generate the color inspection target image with a smaller number of pixels than the number of pixels of the color captured image.

For example, as illustrated in FIG. 23, the logic unit 31b individually downscales the red component, the first green component adjacent to the red component in a row direction, the blue component, and the second green component adjacent to the blue component in the row direction included in the Bayer array of the color captured image. The logic unit 31b generates the color inspection target image by disposing the pixel values of the colors of the blue component, the first green component, the red component, and the second green component after downscaling such that the array pattern of the colors coincides with the array pattern of the Bayer array of the color captured image.

That is, when the user designates, as the output region, the region to be output as the color inspection target image, the colors of the color captured image corresponding to the output region are individually downscaled based on the predetermined array pattern. The pixel values of the colors after downscaling are disposed such that the array pattern of the colors coincides with the array pattern of the color captured image. As a result, it is possible to generate the color inspection target image with any number of pixels smaller than the number of pixels of the color captured image, and in image processing by a processor or an FPGA at a subsequent stage, additional processing due to incoincidence between the array patterns is unnecessary.

Describing a specific example, the logic unit 31b is configured to generate the color inspection target image by downscaling the colors of the color captured image in a first direction that is one of the X and Y directions and then downscaling the image obtained by downscaling in the first direction in a second direction that is the other of the X and Y directions. More specifically, as illustrated in FIG. 24, the logic unit 31b generates the color inspection target image by downscaling the colors of the color captured image in the first direction and then downscaling the image obtained by the downscaling in the first direction in the second direction. In FIG. 24, pixel interpolation and downscaling are performed on the Gr pixels in a horizontal direction (X direction) that is the first direction, and then pixel interpolation and downscaling the Gr pixels in a vertical direction (Y direction) that is the second direction. In addition, similar to the Gr pixels, pixel interpolation and downscaling are performed on each of the R pixels, the B pixels, and the Gb pixels in the horizontal direction, and then pixel interpolation and downscaling are performed on each of the R pixels, the B pixels, and the Gb pixels in the vertical direction.

Figure 25A:
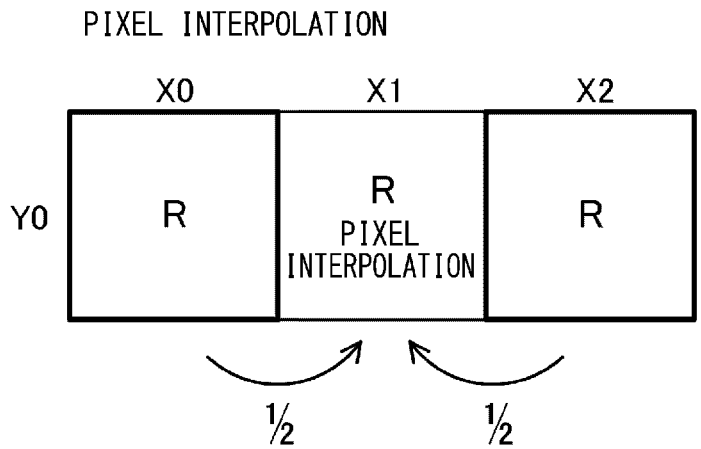
FIGS. 25A-B are diagrams illustrating an example of interpolation processing and downscaling of each pixel constituting the color captured image.
Figure 25B:
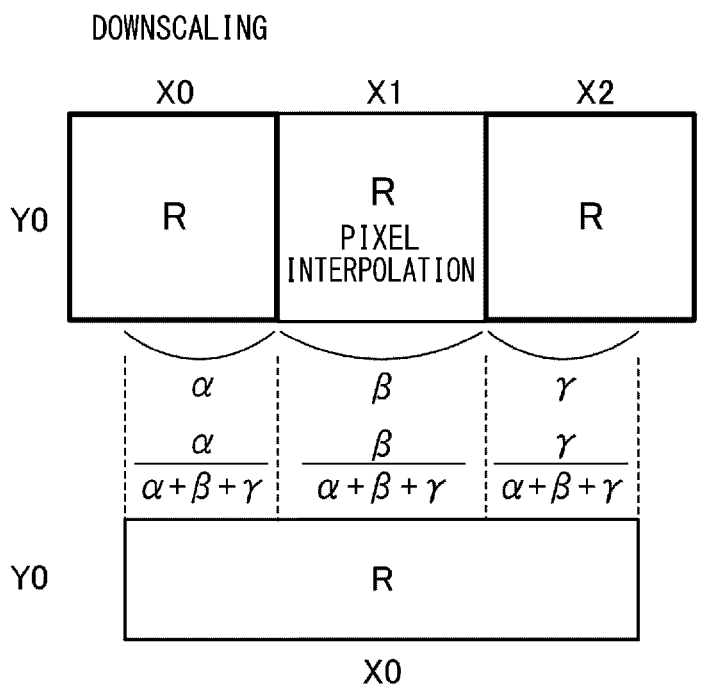

As illustrated in the case of the horizontal direction in FIG. 25, when pixel interpolation is performed, an addition average of two adjacent pixel values of the same color is calculated. In addition, during downscaling, a weighted average corresponding to a size at a sub-pixel level of each pixel of the captured image before downscaling, which is included in one pixel of the inspection target image obtained by downscaling, is calculated. In FIG. 25, $\alpha$, $\beta$, and $\gamma$ indicate sub-pixel sizes in a case where a size of an input pixel is 1. In addition, since each of $\alpha$ and $\gamma$ can be set to a value less than 1, the scaling magnification can be calculated with accuracy after the decimal point. In addition, similar processing is executed for other R pixel groups in the image. Although the R pixels are illustrated in FIG. 25, the same applies to the pixels of the other colors.

In the vertical direction, similar processing is executed in the vertical direction by using the pixel after downscaling in the horizontal direction. That is, the logic unit 31b calculates the pixel values of the pixels of the inspection target image based on the plurality of pixels of the same color present in a range in the vicinity of a position of the color captured image before downscaling corresponding to the pixels of the inspection target image after downscaling. The logic unit 31b determines the range in the vicinity of the color captured image based on the scaling magnification of downscaling.

Figure 26:
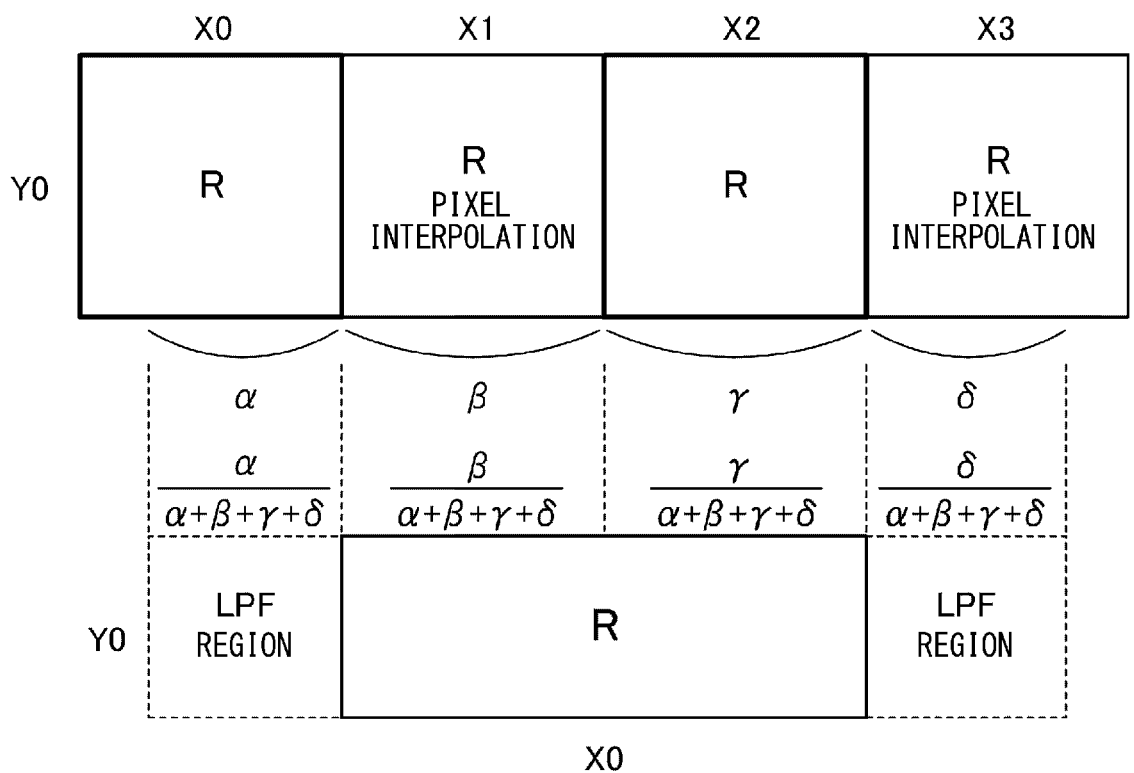
FIG. 26 is a diagram for describing a case where a low-pass filter is applied.

As illustrated in FIG. 26, a low-pass filter can also be applied when the color captured image is processed. In this case, downscaling is performed on the assumption that one pixel of the inspection target image after downscaling is enlarged by a designated low-pass filter region (LPF region). The low-pass filter region is uniformly applied to both sides of one pixel after downscaling. The low-pass filter region (sub-pixel size) per one side is calculated by multiplying a reduction degree by downscaling by a low-pass filter set value by ½. In addition, the low-pass filter set value is a value equal to or more than 0 and is less than a value obtained by {3×(reduction degree−1)}/reduction degree. In FIG. 26, $\alpha$, $\beta$, $\gamma$, and $\delta$ indicate sub-pixel sizes in a case where the size of the input pixel is 1. In addition, similar processing is executed for other R pixel groups in the image. Although the R pixels are illustrated in FIG. 26, the same applies to the pixels of the other colors.

In addition, when the interface unit 40c receives an instruction to change the number of pixels, the processor 41 causes the array pattern of the colors of the color inspection target image before and after the change in the number of pixels to coincide with each other. As a result, the image processing of the color inspection target image after the change can be executed without changing the setting related to the array pattern of each color in the image processing of the color inspection target image before the change.

In a case where the interface unit 40c receives an instruction to change at least one of the position, size, and shape of the output region, the logic unit 31b generates the color inspection target image corresponding to the output region after the change in which the array pattern of the colors coincides with the color inspection target image generated before the change of the output region.

In addition, the logic unit 31b downscales the color captured image such that a transfer speed at which the color inspection target image is transferred to the processor 41 is relatively faster than a transfer speed at which the color captured image is transferred to the processor 41. That is, as illustrated in FIG. 22, although downscaling can be performed outside the image sensor 31, in this case, since a data amount of the color captured image is large, it is considered that the transfer speed to the processor 41 becomes a problem. The color captured image is downscaled, and the color inspection target image is transferred to the processor 41 at a speed faster than the transfer speed when the color captured image is transferred to the processor 41. Thus, a processing speed can be increased, and image inspection for a high-speed moving object can be performed. In addition, the transfer speed from the logic unit 31b to the processor 41 can be changed according to the number of pixels of the inspection target image output from the image sensor 31.

(Flow During Setting)

As described above, the image inspection system 2 including the industrial camera 1 can execute various kinds of processing, and a processing procedure can be randomly set within a range without contradiction. Hereinafter, an example of the processing procedure will be described based on a flowchart.

Figure 27:
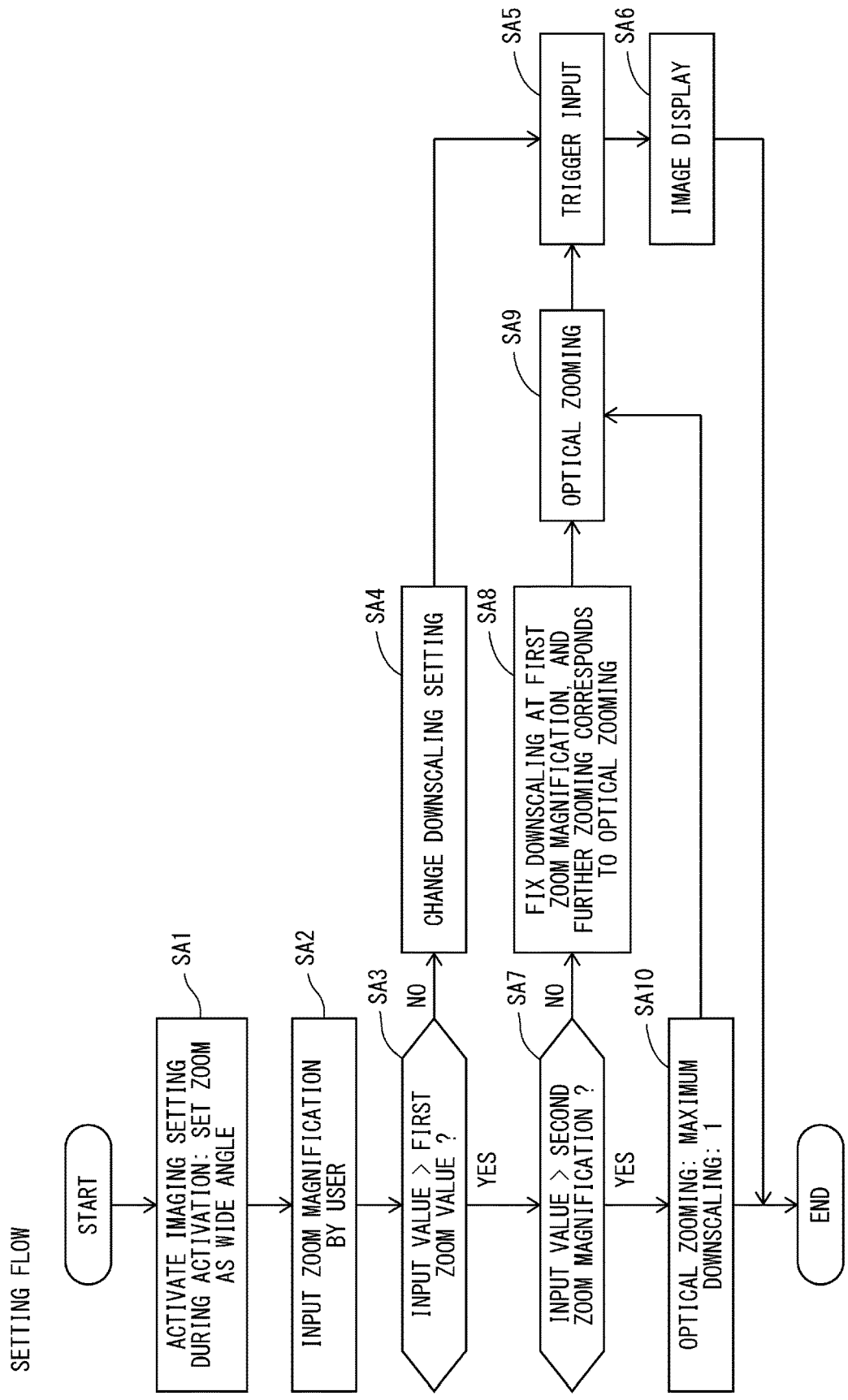
FIG. 27 is a flowchart illustrating an example of a processing procedure during a zoom magnification input.

FIG. 27 is a flowchart illustrating an example of a processing procedure during zoom magnification input. In step SA1 after the start, imaging setting is activated. When the imaging setting is activated, the second lens group 22 is moved to a wide-angle side. In step SA2, the interface unit 40c receives an input of the zoom magnification by the user. During the zoom magnification input, since the user interface screen 100 illustrated in FIG. 11 is used, the zoom adjustment region 101A can be operated and input. As another example, the zoom magnification may be input numerically.

In step SA3, it is determined whether or not an input value (zoom magnification) in step SA2 is more than a first zoom value (first zoom magnification). In a case where NO is determined, the processing proceeds to step SA4 to change the downscaling setting. When the trigger signal is input in step SA5, the processing proceeds to step SA6 to display the inspection target image.

In a case where YES is determined in step SA3, the processing proceeds to step SA7, and it is determined whether or not the input value (zoom magnification) in step SA2 is more than a second zoom value (second zoom magnification). In a case where NO is determined, the processing proceeds to step SA8 to fix downscaling at a predetermined zoom magnification, and further zooming corresponds to the optical zooming in step SA9. Thereafter, the processing proceeds to step SA5.

In a case where YES is determined in step SA7, the zoom magnification of the optical zooming is maximized and the scaling magnification of the downscaling is set to 1 in step SA10. The processing proceeds to step SA9.

Figure 28:
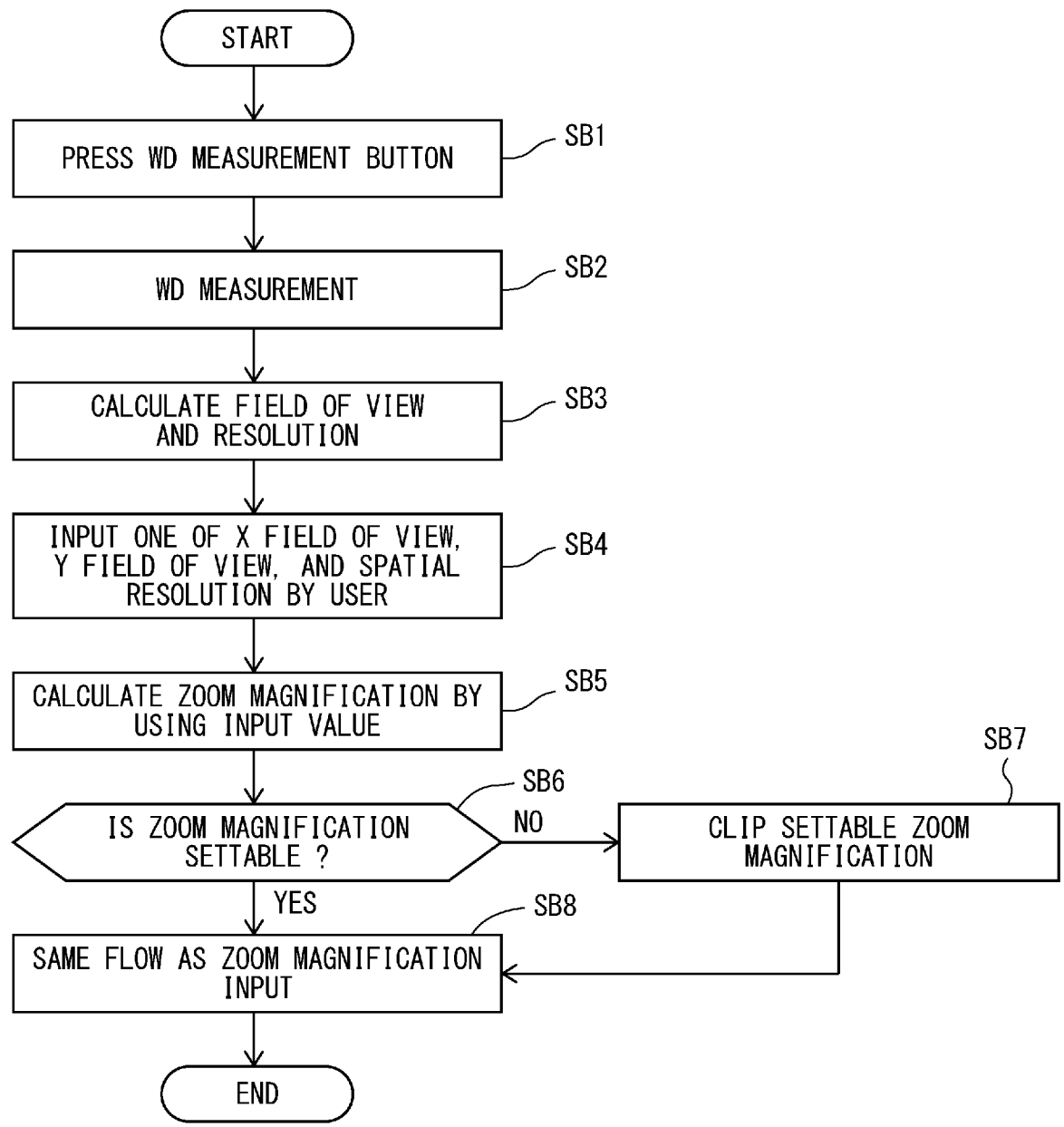
FIG. 28 is a flowchart illustrating an example of a processing procedure during designation of a field of view resolution.

FIG. 28 is a flowchart illustrating an example of a processing procedure when the field of view or the resolution is designated. In step SB1 after the start, a WD measurement button (not illustrated) on the user interface is pressed. In step SB2, WD measurement is performed. In step SB3, the field of view and the resolution are calculated based on internal data stored in advance in the industrial camera 1 and current focal position information. In step SB4, the user inputs one of an X field of view, a Y field of view, and a spatial resolution via the user interface. In step SB5, the zoom magnification is calculated by using the value input in step SB4. In step SB6, it is determined whether or not the zoom magnification calculated in step SB5 is a settable zoom magnification. In a case where NO is determined in step SB6, the processing proceeds to step SB7 to clip the zoom magnification to a settable zoom magnification as illustrated in FIG. 19B of FIG. 19 or FIGS. 20C and 20F of FIG. 20. In a case where YES is determined in step SB6, the processing proceeds to step SB8 to execute a procedure similar to the flow illustrated in FIG. 27.

Figure 29:
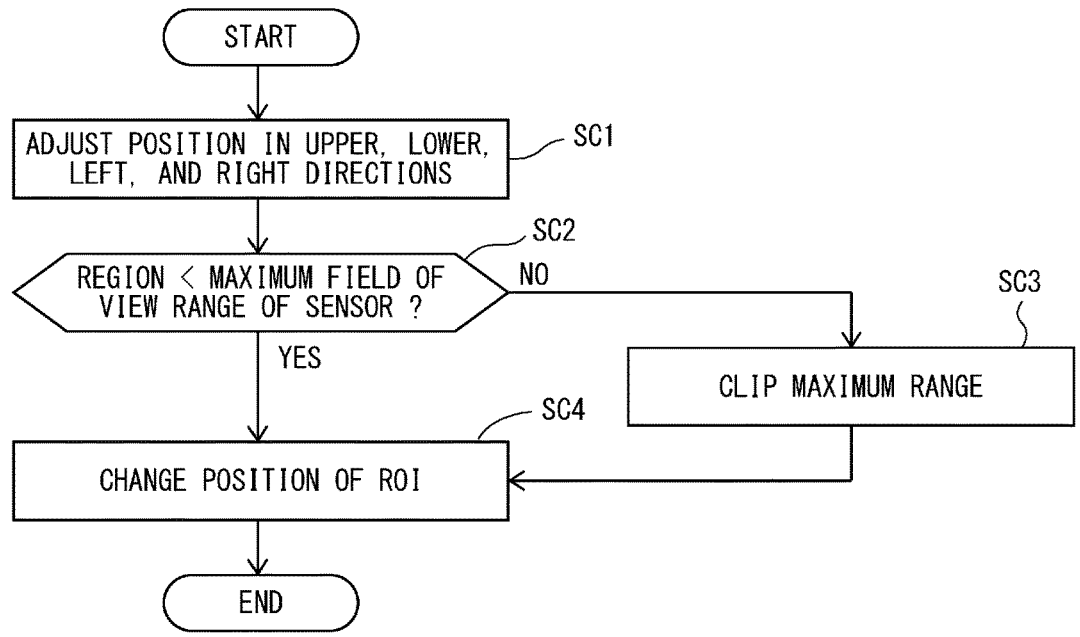
FIG. 29 is a flowchart illustrating an example of a processing procedure of pan-tilting.

FIG. 29 is a flowchart illustrating an example of a processing procedure of pan-tilting. In step SC1 after the start, the user operates the field of view position adjustment region 103 on the user interface screen 100 illustrated in FIG. 11 to adjust positions in the upper, lower, left, and right directions. In step SC2, it is determined whether or not the region of which the position is adjusted in step SC1 is narrower than a maximum field of view range of the image sensor 31. In a case where NO is determined in step SC2, a maximum range is clipped in step SC3. Thereafter, the processing proceeds to step SC4, and the position of the region of interest is changed. In a case where YES is determined in step SC2, the processing also proceeds to step SC4.

Figure 30:
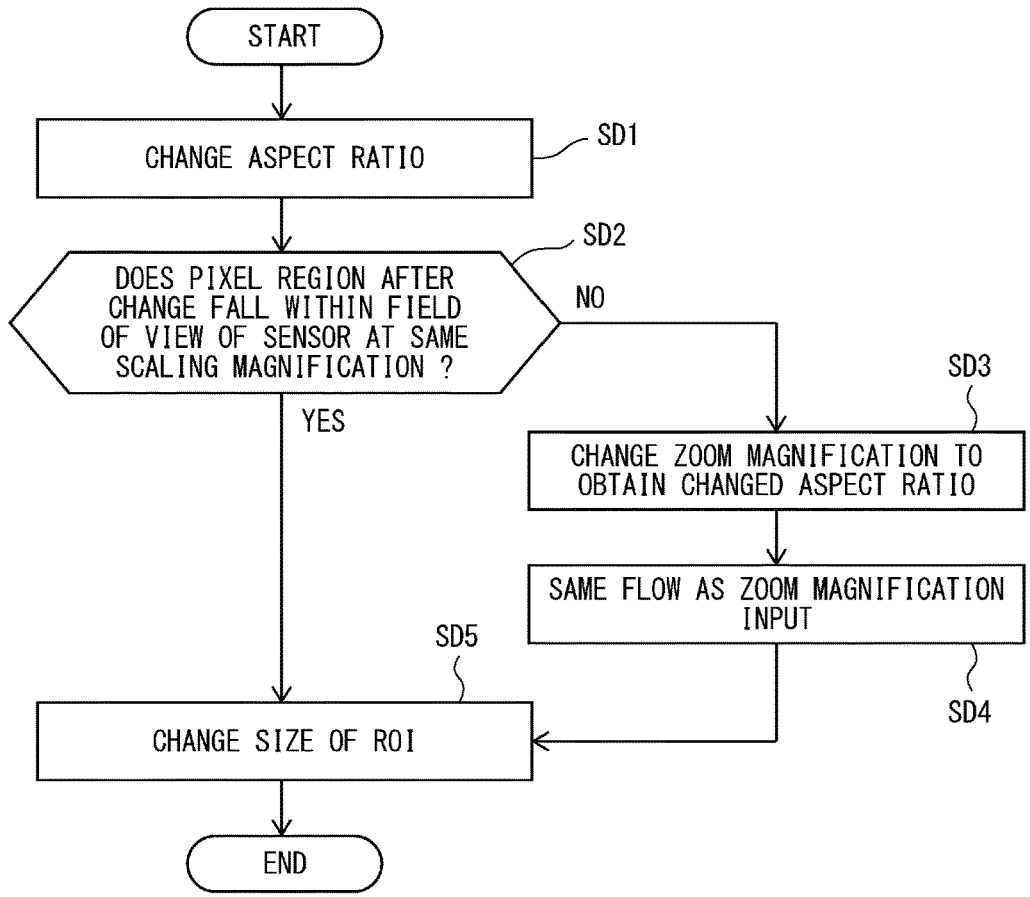
FIG. 30 is a flowchart illustrating an example of a processing procedure of changing an aspect ratio.

FIG. 30 is a flowchart illustrating an example of a processing procedure of changing the aspect ratio. In step SD1 after the start, the user operates the number-of-pixels setting region 104 of the user interface screen 100 illustrated in FIG. 11 to change the aspect ratio to a desired aspect ratio. In step SD2, it is determined whether or not the pixel region after the change falls within the field of view range of the image sensor 31 at the same scaling magnification. In a case where NO is determined, the processing proceeds to step SD3, and the zoom magnification is changed such that the aspect ratio changed in step SD1 is obtained. In step SD4, a procedure similar to the flow illustrated in FIG. 27 is executed. Thereafter, the processing proceeds to step SD5 to change the size of the region of interest. In a case where YES is determined in step SD2, the processing also proceeds to step SD5.

(Generation Condition Calculation Function of Inspection Target Image)

The image inspection system 2 has a generation condition calculation function of calculating a generation condition of an inspection target image during operation based on a reference image captured in advance. That is, the storage unit 39 illustrated in FIG. 7 is configured to be able to store the reference image obtained by capturing the inspection object in advance. The reference image is an inspection target image obtained by capturing the inspection object with the industrial camera 1, and includes the inspection object. The storage unit 39 can store a plurality of reference images. The storage unit 39 is configured to be able to store an optical condition file in which optical conditions when the reference image is generated are defined in association with the reference image. The optical condition file includes a zoom magnification, and the zoom magnification includes the zoom magnification of the optical zooming and the downscaling magnification. In addition, the storage unit 39 is configured to be able to store a date and the like in association with the reference image as information for specifying a time when the reference image is generated.

The calculation unit 41a executes specification processing of specifying a positional relationship between the inspection object included in the inspection target image generated by the industrial camera 1 during operation and the inspection object included in the reference image stored in the storage unit 39. After the execution of the specification processing, the calculation unit 41a calculates the generation condition of the inspection target image during operation such that the inspection object included in the inspection target image generated by the industrial camera 1 during operation is at substantially the same position as the inspection object included in the reference image. This generation condition includes positional information of an output region in which the inspection object can be output at substantially the same position as the reference image within the field of view range of the photoelectric conversion unit 31a. The industrial camera 1 is controlled based on the generation condition during operation, and generates an inspection target image corresponding to the output region of the positional information included in the generation condition.

In addition to the positional information of the output region, the generation condition of the inspection target image includes information regarding a rotation direction and an angle for rotating the inspection target image to have the same posture as the inspection object included in the reference image. In addition, the generation condition of the inspection target image includes a zoom magnification calculated such that the inspection object included in the reference image and the inspection object in the inspection target image have substantially the same size. In a case where the zoom magnification is included in the generation condition, the calculation unit 41a sets the inspection objects included in the reference image and the inspection target image to have substantially the same size by zooming the lens unit 20 according to the calculated zoom magnification.

The generation condition of the inspection target image includes a condition related to brightness of the image. The condition related to the brightness of the image is calculated as an imaging condition in which brightness of the inspection target image becomes substantially the same brightness by analyzing brightness of the reference image based on the analysis result.

In a case where a plurality of reference images are stored in the storage unit 39, the interface unit 40c receives selection of a desired reference image by the user from among the plurality of reference images stored in the storage unit 39. An initial condition of the optical condition of the industrial camera 1 is set to the optical condition of the optical condition file related to the selected reference image.

Figure 34:
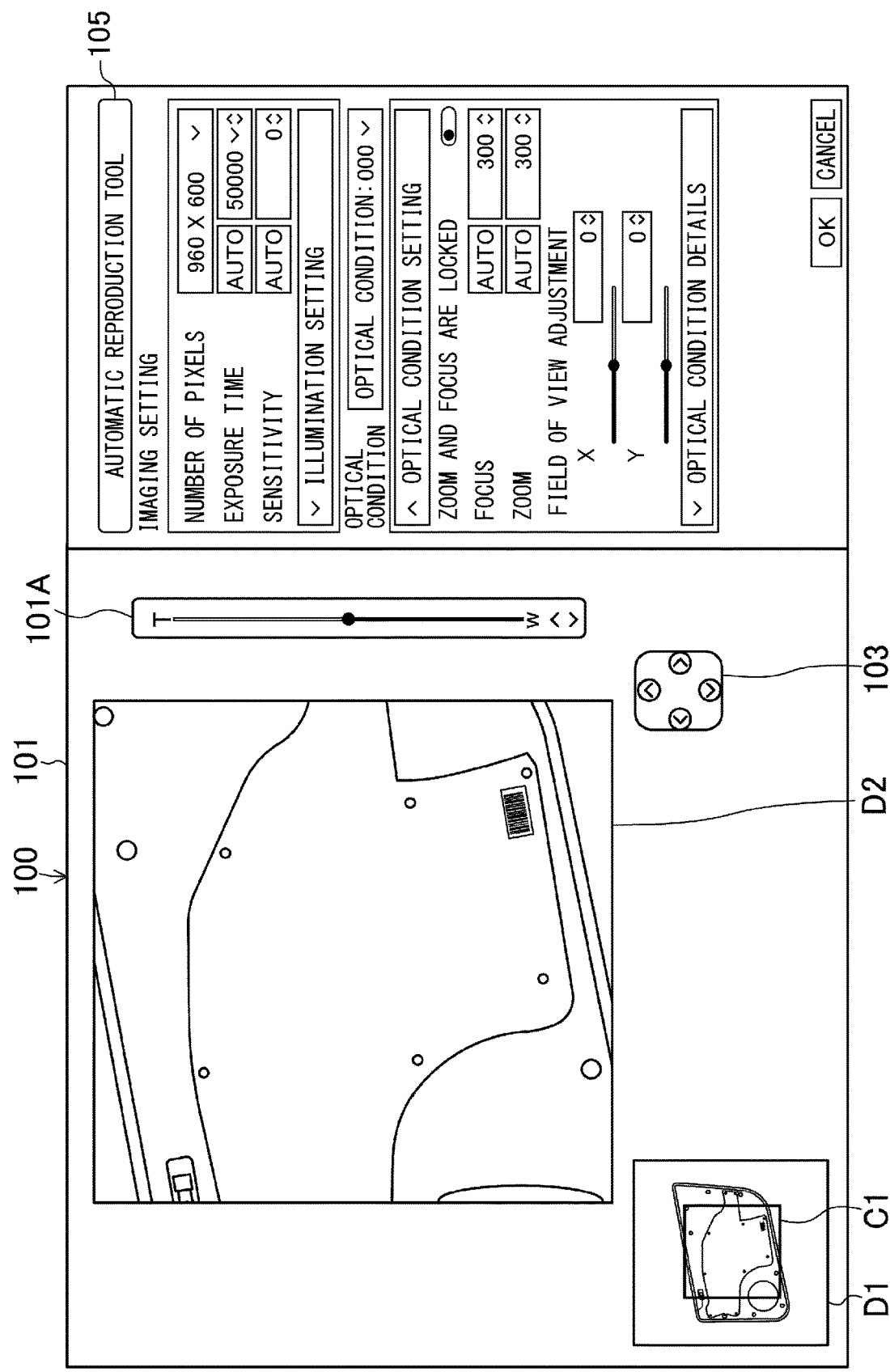
FIG. 34 is a diagram illustrating an example of a user interface screen displayed when a generation condition calculation function of the inspection target image is started.
Figure 35:
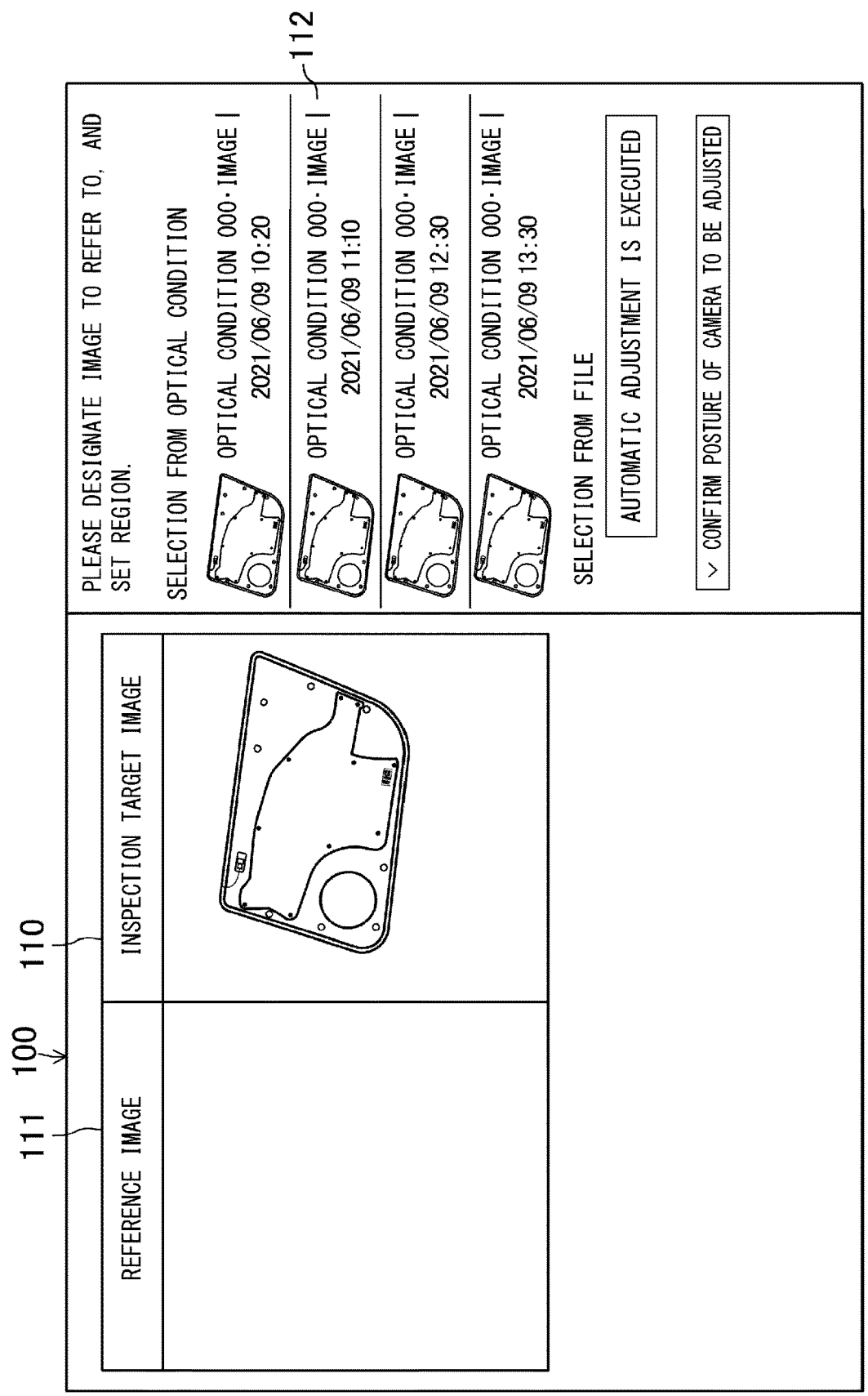
FIG. 35 is a diagram illustrating an example of a user interface screen displaying the inspection target image.

Hereinafter, a specific example of the generation condition calculation function of the inspection target image will be described with reference to a flowchart and an example of the user interface. In step SE1 after the start of the flowchart illustrated in FIG. 31, the industrial camera 1 captures the inspection object to generate the inspection target image. For example, as illustrated in FIG. 34, a button 105 named "automatic reproduction tool" is provided on the user interface screen 100 for setting. The button 105 is a button operated when the generation condition calculation function of the inspection target image is started, and when it is detected that the button 105 is operated, the calculation unit 41a starts the flowchart illustrated in FIG. 31, and generates an inspection target image display region 110 in which the inspection target image is displayed on the user interface screen 100 and a reference image display region 111 in which the reference image is displayed as illustrated in FIG. 35. A selection region 112 of the reference image is provided on the user interface screen 100. In the selection region 112, a plurality of reference images captured in advance are displayed in a thumbnail format, and optical conditions during capturing and an imaging date and time are also displayed in a state of being associated with the reference image. When the reference image is selected in the selection region 112, the selected reference image is displayed in the reference image display region 111 as illustrated in FIG. 36.

Figure 31:
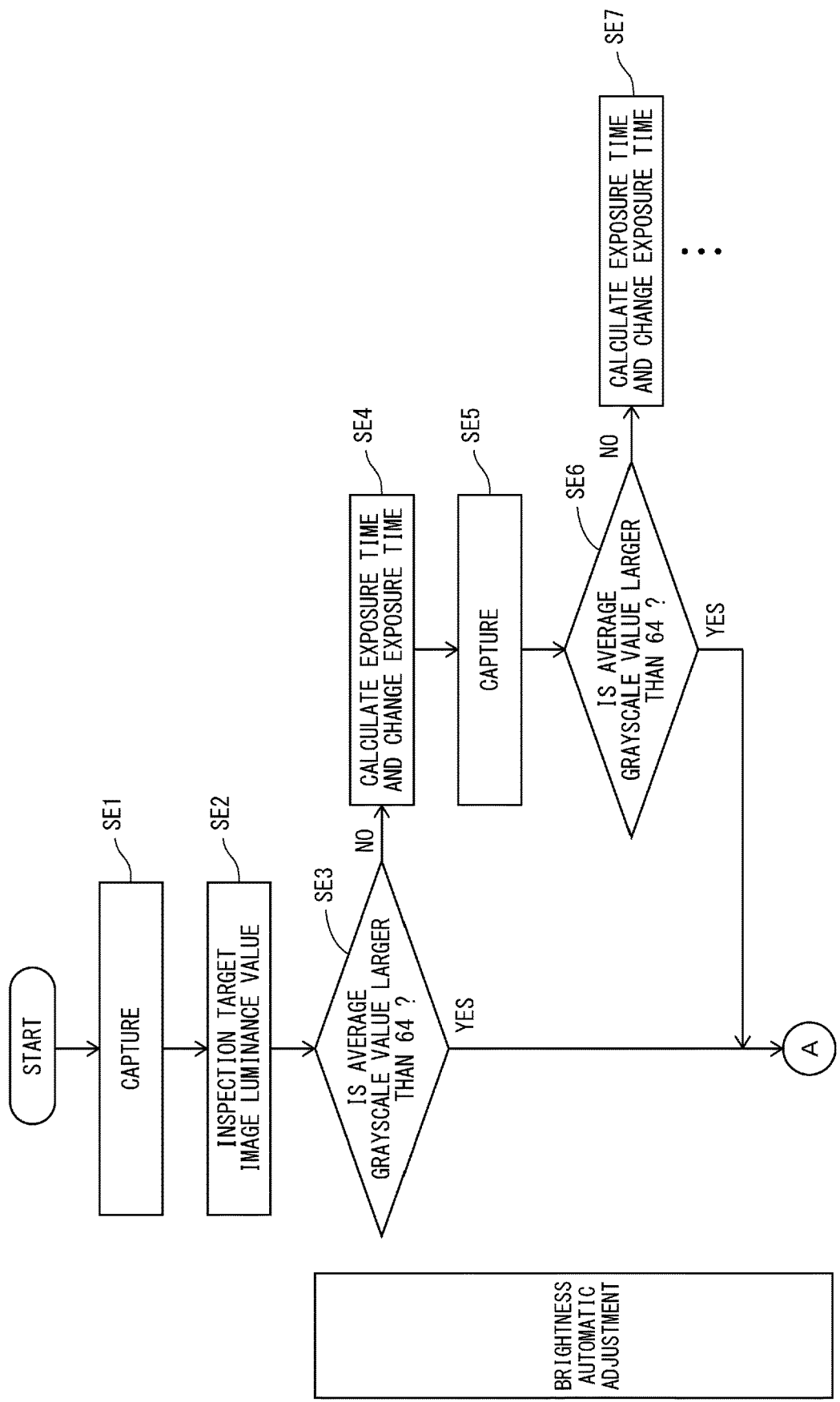
FIG. 31 is a flowchart illustrating an example of a brightness automatic adjustment procedure when a generation condition of the inspection target image is calculated.

In step SE2 of the flowchart illustrated in FIG. 31, the calculation unit 41a acquires a luminance value of the inspection target image generated by the industrial camera 1. In step SE3, the calculation unit 41a calculates an average grayscale value based on the luminance value acquired in step SE2, and determines whether or not the calculated average grayscale value is larger than a predetermined value (for example, 64). When the calculated average grayscale value is less than or equal to 64, the processing proceeds to step SE4, and the calculation unit 41a calculates an exposure time and changes the exposure time. In step SE5, the industrial camera 1 captures the inspection object by using the changed exposure time to generate the inspection target image. In step SE6, the calculation unit 41a acquires the luminance value of the inspection target image generated by the industrial camera 1, and determines whether or not the average grayscale value is larger than the predetermined value. When the calculated average grayscale value is less than or equal to 64, the processing proceeds to step SE7, and the calculation unit 41a calculates an exposure time and changes the exposure time. Processing of changing the capturing to the exposure time is repeated several times until the average grayscale value becomes larger than 64. That is, the calculation unit 41a adjusts the exposure time of the industrial camera 1 based on the luminance value of the reference image such that the brightness becomes a level at which a corresponding point search to be described later can be performed. The value "64" is an example, and may be any value as long as the value corresponds to the brightness at the level at which the corresponding point search can be performed.

Figure 32:
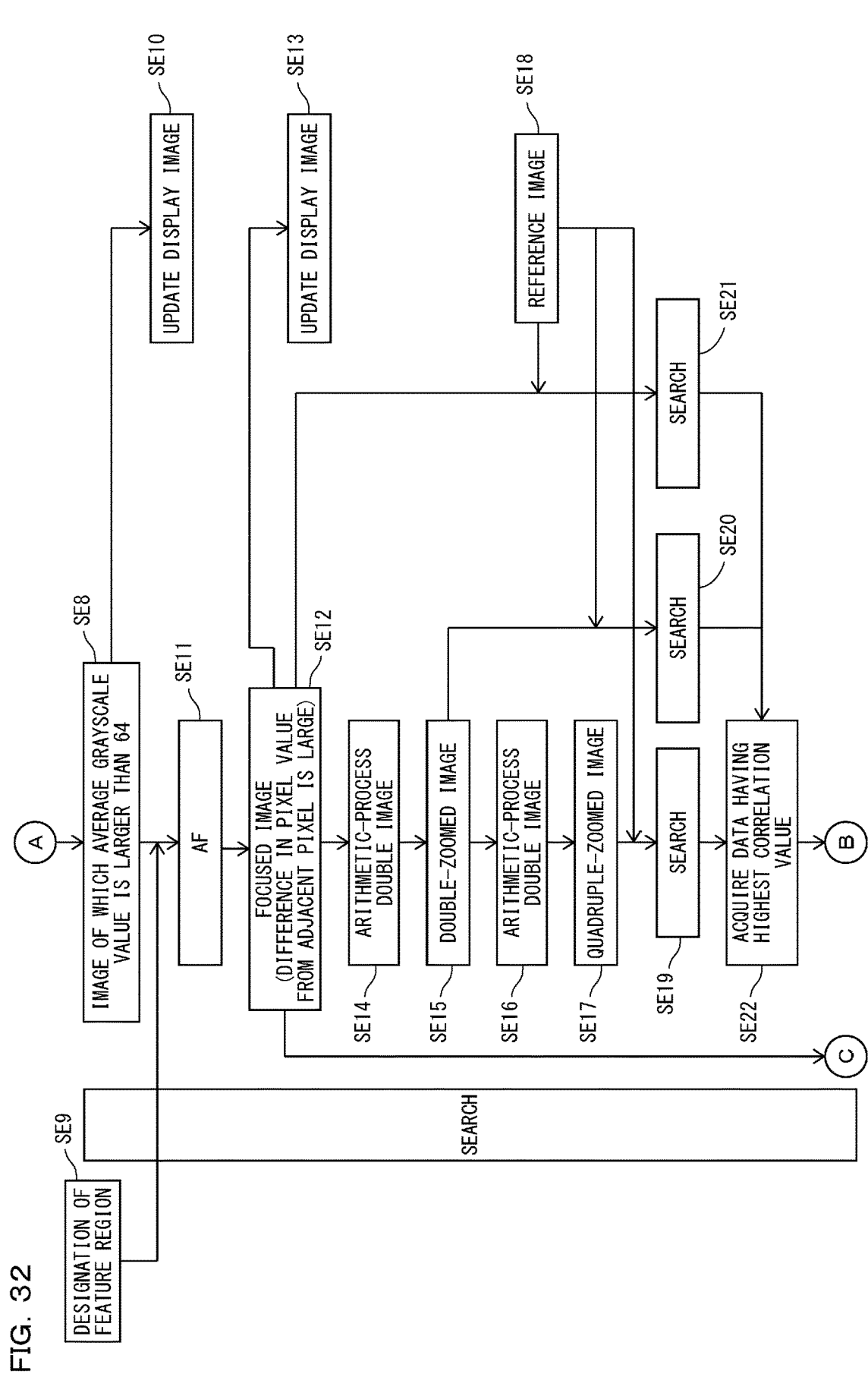
FIG. 32 is a flowchart illustrating an example of a search procedure when the generation condition of the inspection target image is calculated.

Thereafter, the processing proceeds to step SE8 of the flowchart illustrated in FIG. 32, and an inspection target image in which the average grayscale value is larger than 64 is prepared. In addition, in step SE9, designation of a feature region for the corresponding point search is received. A corresponding point is a point for specifying a positional relationship between the inspection object included in the inspection target image and the inspection object included in the reference image on the inspection target image or the reference image.

Figure 36:
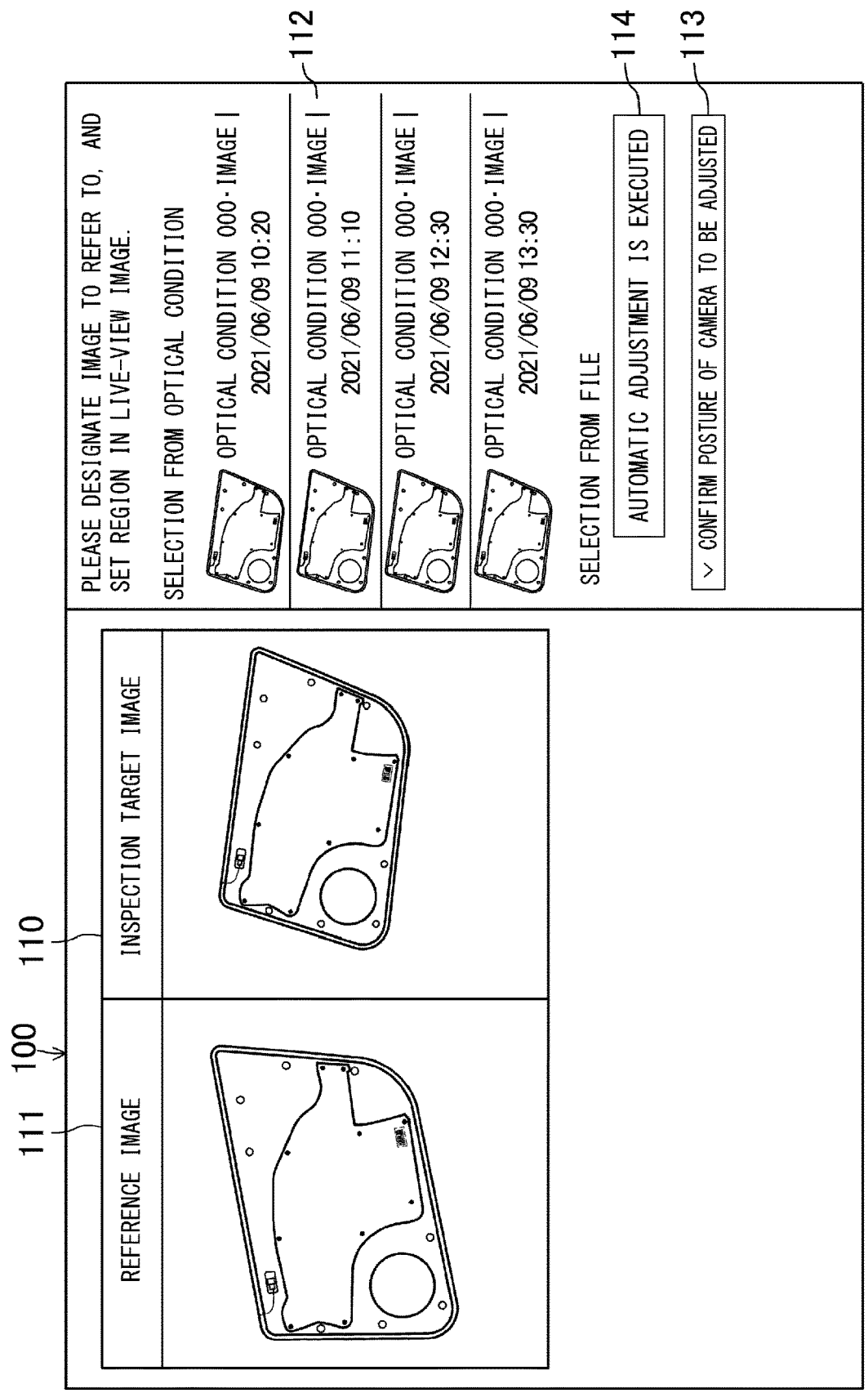
FIG. 36 is a diagram illustrating an example of a user interface screen displaying a reference image in addition to the inspection target image.

Specifically, as illustrated in FIG. 36, the user performs a drag operation or the like with the mouse 8, for example, and specifies the mouse to surround a region in which the inspection object is present on the inspection target image. Similarly, the region in which the inspection object is present can be designated on the reference image. The region designated in this manner is a feature region for the corresponding point search, and is received by the interface unit 40c. In addition, in step SE10, a display image is updated.

Figure 37:
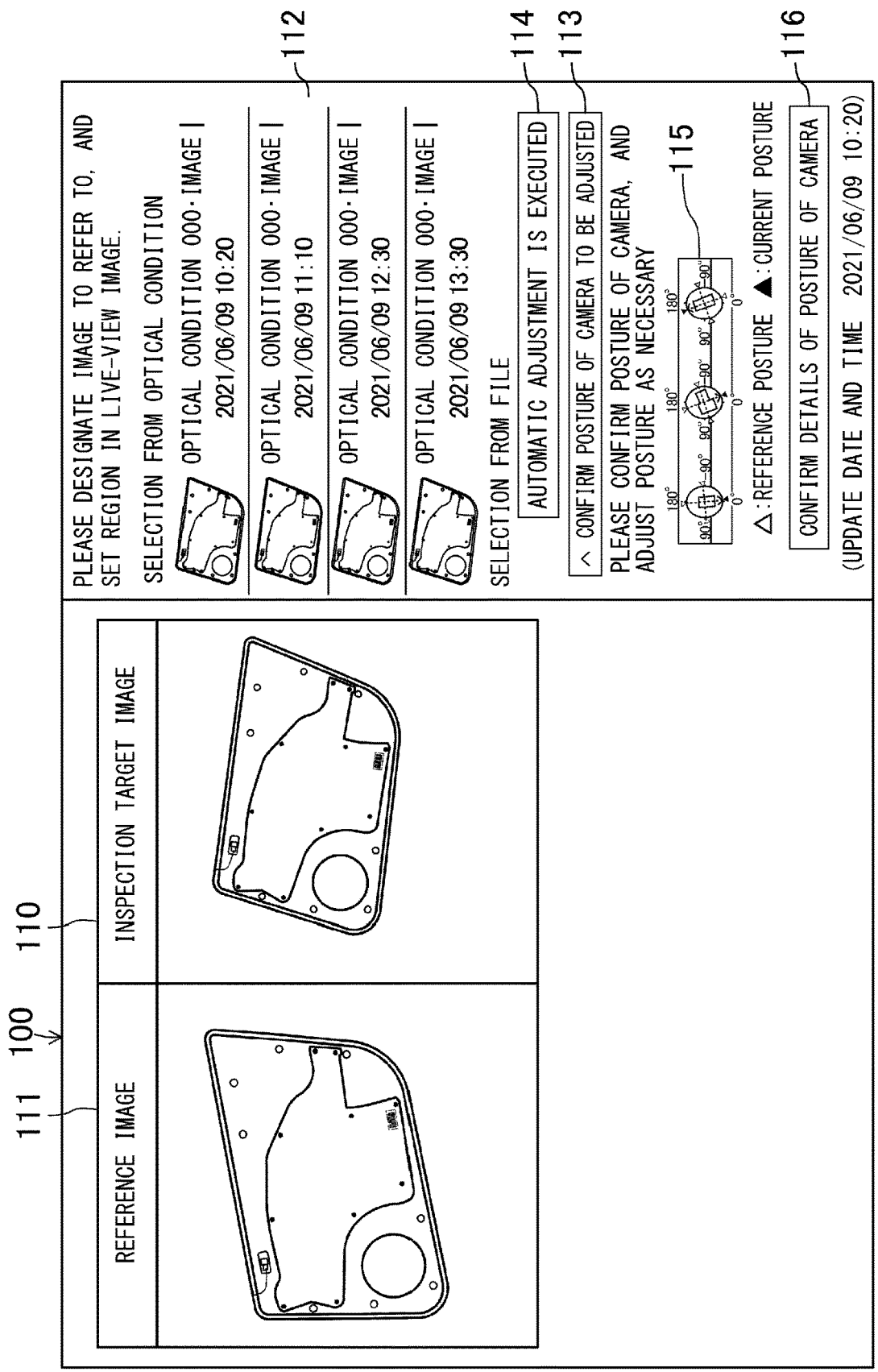
FIG. 37 is a diagram illustrating an example of a user interface screen displaying a posture of a camera.

An operation unit 113 for displaying information regarding the posture of the industrial camera 1 when the reference image is captured is provided on the user interface screen 100 illustrated in FIG. 36. When it is detected that the operation unit 113 is operated, the calculation unit 41a acquires the information regarding the posture of the industrial camera 1 when the reference image is captured, and displays the information in a posture display region 115 as illustrated in FIG. 37. That is, since the information regarding the posture of the industrial camera 1 can be acquired by the acceleration sensor 32, the information regarding the posture of the industrial camera 1 is acquired together when the reference image is acquired, and thus, the reference image and the information regarding the posture of the industrial camera 1 can be stored in the storage unit 39 in association with each other. When the selected reference image is read from the storage unit 39, the calculation unit 41a also reads the information regarding the posture of the industrial camera 1.

In addition, the calculation unit 41a also acquires, from the acceleration sensor 32, the information on the posture of the industrial camera 1 when the inspection target image is acquired (at present). In the posture display region 115, the posture of the industrial camera 1 when the reference image is captured and the posture of the industrial camera 1 when the inspection target image is acquired are displayed. A white triangle in the posture display region 115 indicates the posture of the industrial camera 1 when the reference image is captured, and a black triangle indicates the posture of the industrial camera 1 when the inspection target image is acquired.

Figure 38:
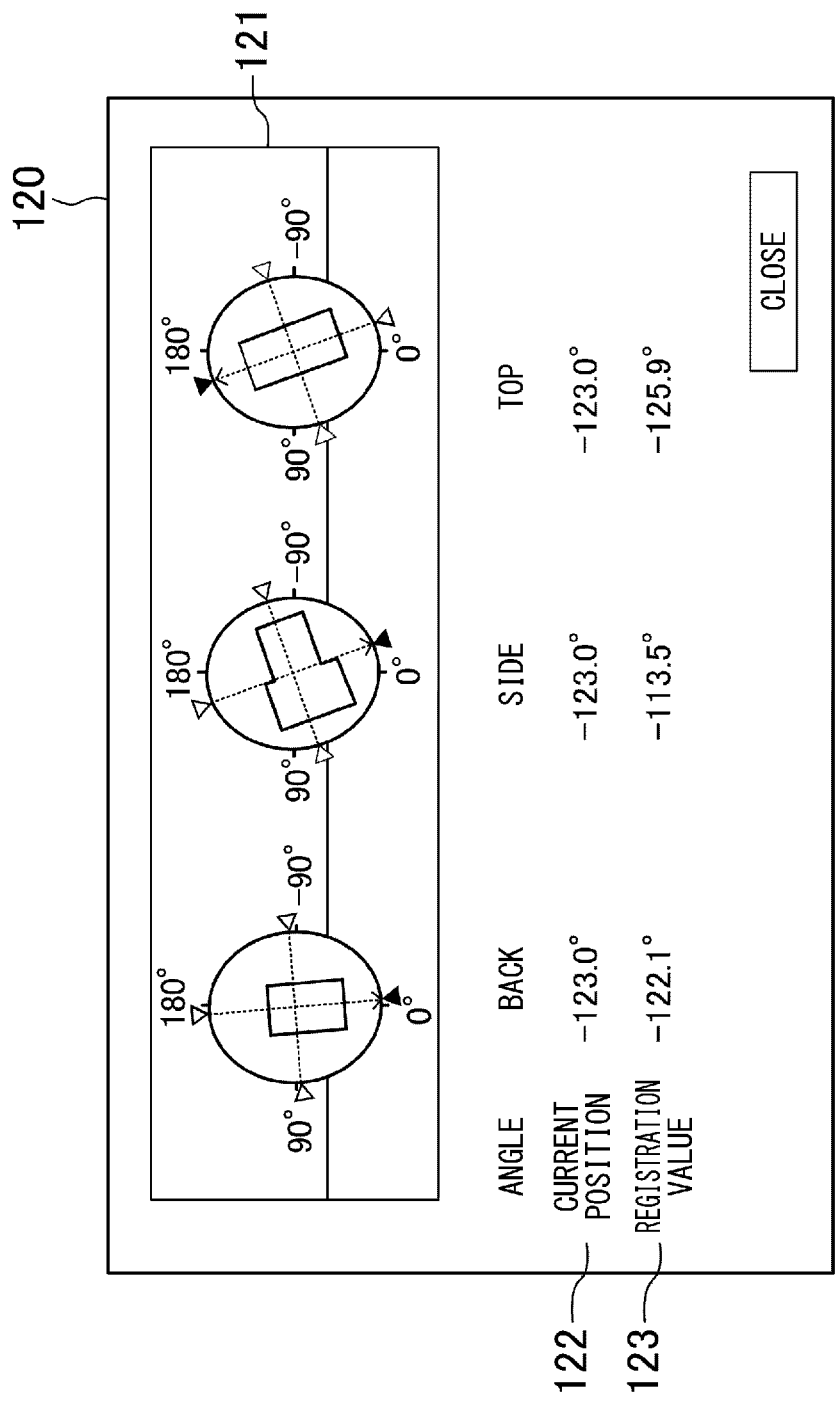
FIG. 38 is a diagram illustrating an example of a window for displaying the posture of the camera in detail.

A detail display button 116 is provided on the user interface screen 100 illustrated in FIG. 37. When it is detected that the detail display button 116 is operated, the calculation unit 41a displays a detail display window 120 as illustrated in FIG. 38 on the monitor 9. A schematic view display region 121 in which the posture of the industrial camera 1 when the reference image is captured and the posture of the industrial camera 1 when the inspection target image is acquired are displayed in a comparable manner by a schematic view similar to the posture display region 115, a first value display region 122 in which the posture of the industrial camera 1 when the inspection target image is acquired is displayed as a numerical value, and a second display region 123 in which the posture of the industrial camera 1 when the reference image is acquired is displayed as a numerical value are provided in the detail display window 120. The detail display window 120 displays a schematic view and an inclination when the industrial camera 1 is viewed from the back, a schematic view and an inclination when the industrial camera 1 is viewed from the side, and a schematic view and an inclination when the industrial camera 1 is viewed from the top. As a result, after the reference image is designated via the interface unit 40c, the information regarding the posture of the industrial camera 1 when the reference image is captured can be displayed, and a current posture of the industrial camera 1 and the posture of the industrial camera 1 when the reference image is captured can be compared and displayed on the monitor 9.

After the postures of the industrial camera 1 are compared and displayed as described above, the calculation unit 41a calculates the generation condition of the inspection target image, and generates the inspection target image in which the industrial camera 1 corresponds to the output region of the positional information. Specifically, in step SE11 of the flowchart illustrated in FIG. 32, capturing is performed by focusing on a central portion of the field of view range by autofocusing. That is, the focus adjustment of the industrial camera 1 is executed before the corresponding point search to be described later is executed. In step SE12, it is determined whether or not a focused image is acquired. Specifically, it is determined whether or not a difference in pixel value from an adjacent pixel is large. The processing proceeds to step SE13 to update the display image. In step SE14, a double image is arithmetic-processed. When the double image is arithmetic-processed, in a case where the feature region is not designated in step SE9, a center of the image is used as a reference, and in a case where the feature region is designated, a center of the designated feature region is used as a reference.

In step SE15, a double-zoomed image is acquired. In step SE16, the double image is arithmetic-processed, and in step SE17, a quadruple-zoomed image is acquired. In step SE18, the calculation unit 41a reads out and acquires the reference image from the storage unit 39. In step SE19, the corresponding point search for specifying the positional relationship between the inspection object included in the inspection target image and the inspection object included in the reference image is executed in the feature region.

In addition, in step SE20, the corresponding point search is executed in the feature region of the double-zoomed image. In addition, in step SE21, the corresponding point search is executed in the feature region of the image before zooming. In step SE22, a result of each corresponding point search in steps SE19 to 21 is acquired, and data having a highest correlation value is specified and acquired.

Figure 33:
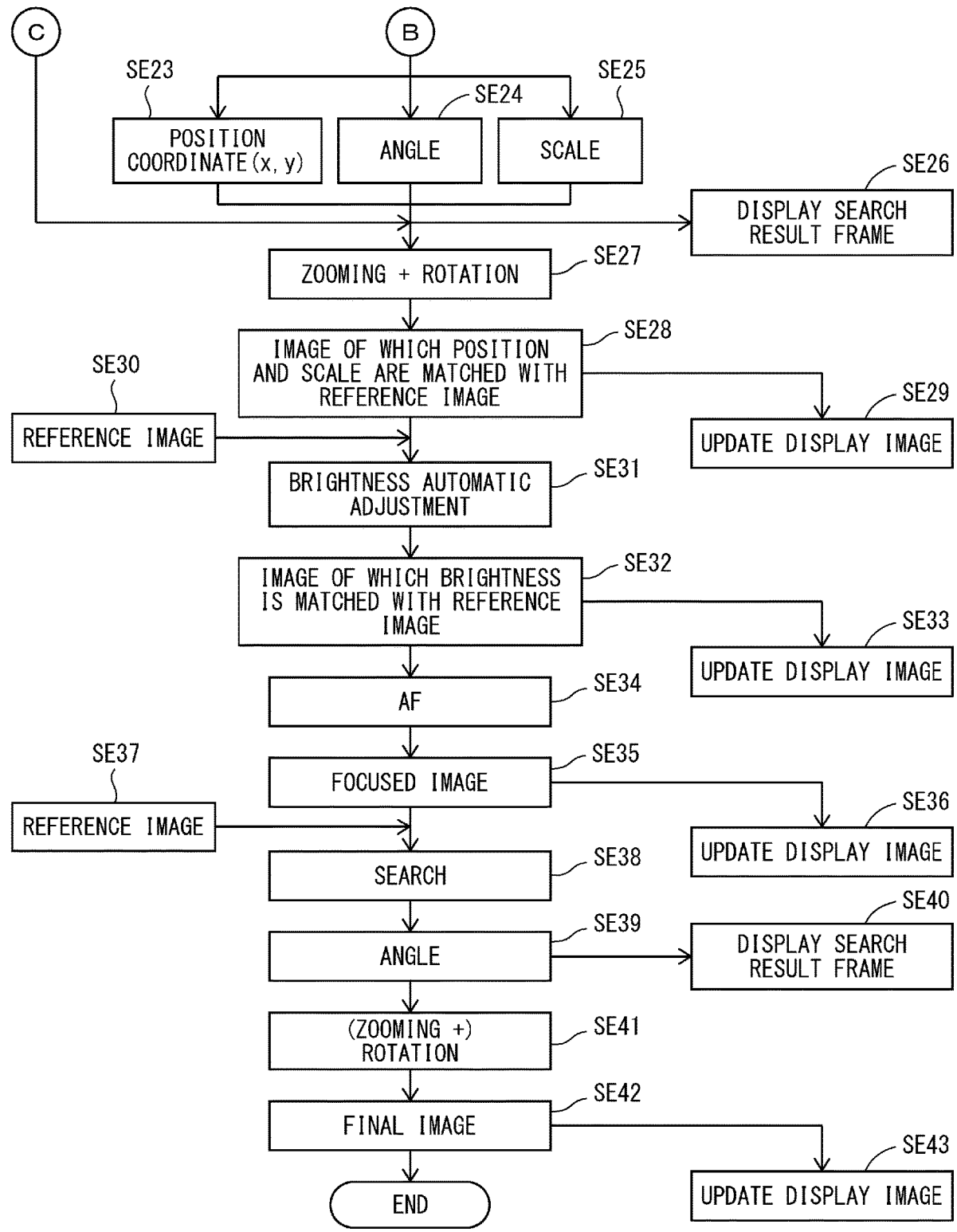
FIG. 33 is a flowchart illustrating an example of a final image acquisition procedure when the generation condition of the inspection target image is calculated.

Thereafter, the processing proceeds to steps SE23, SE24, and SE25 in FIG. 33, and position coordinates (x, y), an angle, and a scale are acquired, respectively. That is, a region of the reference image is acquired from the inspection target image. In step SE26, a frame indicating the result of the corresponding point search is displayed.

Figure 39:
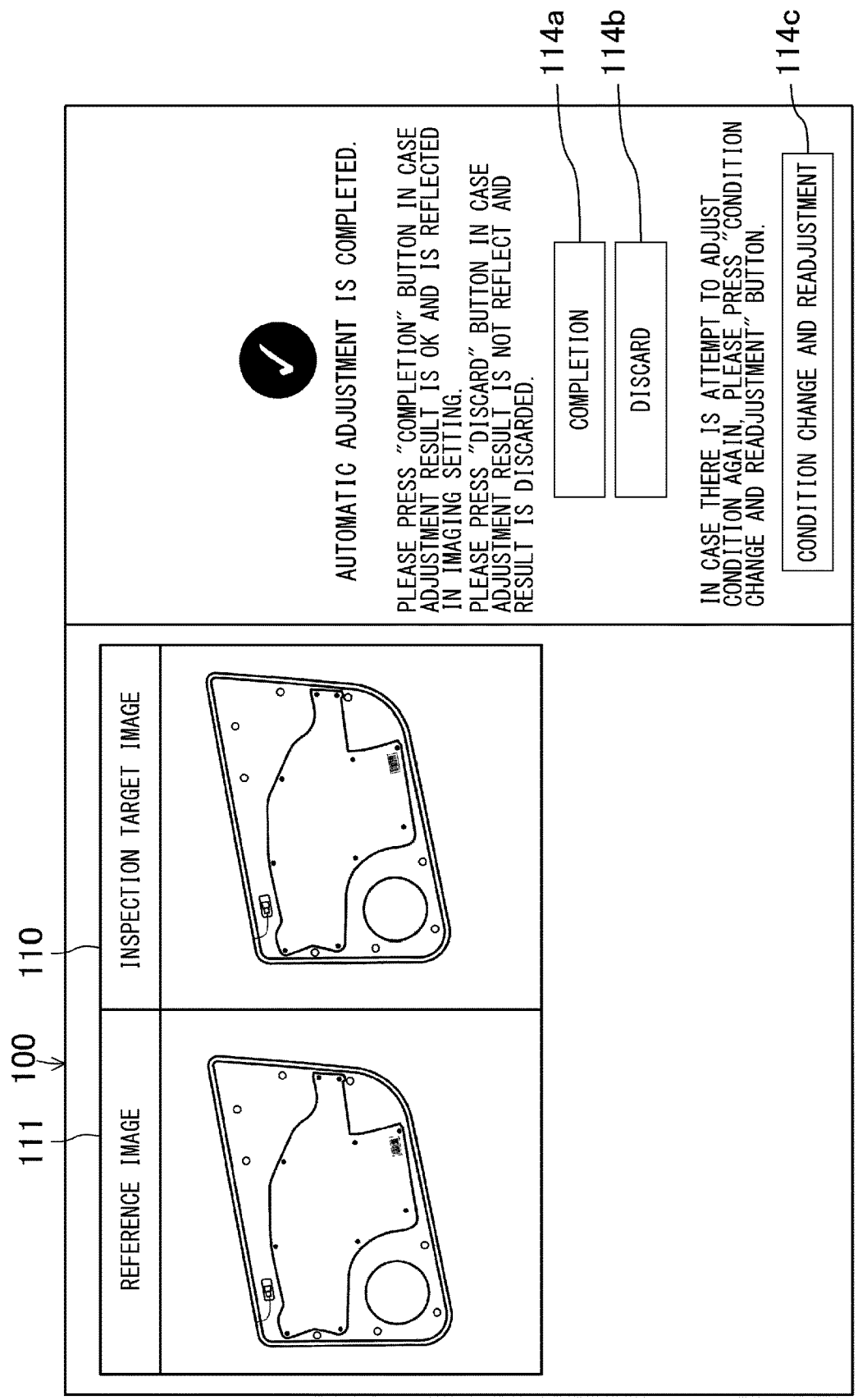
FIG. 39 is a diagram illustrating an example of a user interface screen after rotation conversion processing.

In step SE27, the inspection target image is zoomed and rotated such that sizes and orientations of the inspection objects of the inspection target image and the reference image coincide with each other. At this time, one or both of the optical zooming by the zoom optical system and the above-described "sensor zooming" can be applied. In particular, since the sensor zooming can be performed at any position within the field of view range of the imaging unit, the workpiece is not shifted from the optical axis unlike the optical zooming. Thus, it is possible to reduce time and effort of adjusting an attachment position of the industrial camera 1. Specifically, the user operates an execution button 114 illustrated in FIGS. 36 and 37. When it is detected that the execution button 114 is operated, the calculation unit 41a executes step SE27, and generates the inspection target image after the rotation and enlargement by applying rotation conversion processing and enlargement processing of an angle having the same posture as the inspection object included in the reference image to the inspection target image. FIG. 39 illustrates the user interface screen 100 after the rotation conversion processing and the enlargement processing. Note that, as necessary, only enlargement may be executed or only rotation may be executed. As a result, in step SE28, an image in which the position and scale of the inspection target image are matched with the inspection object of the reference image is generated. In step SE29, the inspection target image generated by updating the display image is shown to the user.

As illustrated in FIG. 39, a completion button 114a, a discard button 114b, and a re-adjustment button 114c are provided on the user interface screen 100. When there is no problem in the inspection target image after the rotation conversion processing, the user operates the completion button 114a to proceed to a next step. On the other hand, when there is any problem in the inspection target image after the rotation conversion processing, the user operates the discard button 114 to discard the inspection target image after the rotation conversion processing. In addition, in a case where it is desired to re-adjust the inspection target image after the rotation conversion processing, the user can operate the re-adjustment button 114c to re-adjust various conditions.

In step SE30 of the flowchart illustrated in FIG. 33, the reference image is acquired, and in step SE31, the brightness is adjusted such that the brightness of the inspection target image coincides with the brightness of the reference image. When the brightness is adjusted, for example, the image is updated once in a predetermined short time (for example, 0.5 seconds) during autofocusing. The image update is unnecessary when autofocusing is completed within a predetermined short time.

In step SE32, an inspection target image of which the brightness matches the reference image is acquired. In step SE33, the display image is updated. In step SE34, autofocusing is executed such that the inspection target image and the reference image are in focus. In step SE35, the focused inspection target image is acquired. In step SE36, the display image is updated. In step SE37, the reference image is acquired, and in step SE38, the corresponding point search for finely adjusting the inspection target image and the reference image is executed. In step SE39, the angle is acquired, and in step SE40, the frame indicating the result of the corresponding point search is displayed.

In step SE41, the inspection target image is zoomed and rotated such that the sizes and the orientations of the inspection objects of the inspection target image and the reference image coincide with each other. Thereafter, the final image is acquired in step SE42, and the display image is updated in step SE43.

Figure 40:
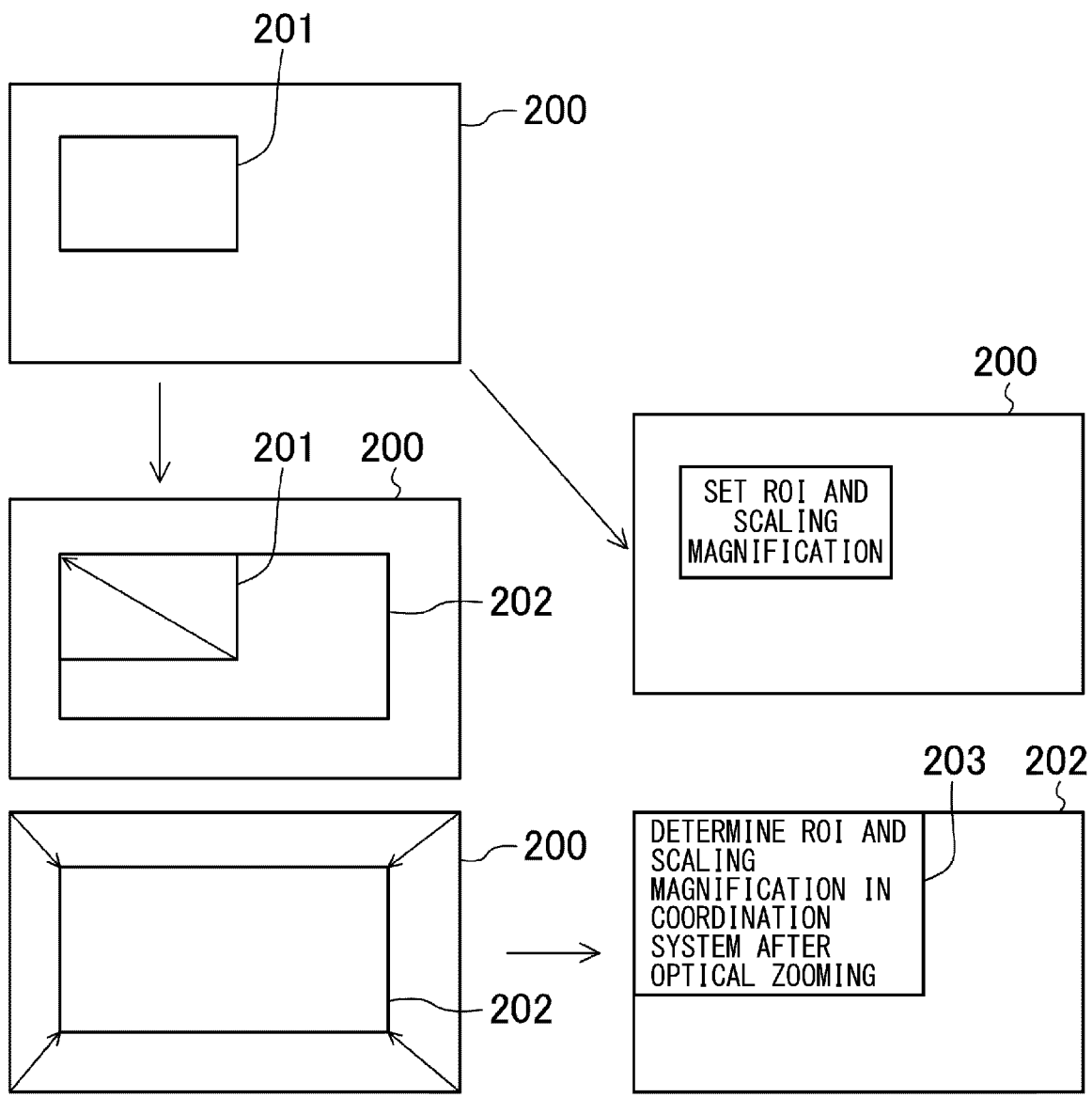
FIG. 40 is a diagram for describing a relationship between a feature region for corresponding point search and zooming.

FIG. 40 is a diagram for describing a relationship between the feature region for the corresponding point search and zooming. In FIG. 40, a frame denoted by reference numeral 200 indicates a maximum field of view of the industrial camera 1. In the example illustrated in an uppermost left part of FIG. 40, the scaling magnification during downscaling is the maximum, and the enlargement by the optical zooming is not performed. A frame 201 indicates the feature region for the corresponding point search. Here, when the scaling magnification is calculated, the scaling magnification can be calculated by the sizes of the feature region for corresponding point search and the output region. For example, in a case where the number of pixels of a maximum field of view is 20 M and the number of pixels of the output region has 5 M, a maximum scaling magnification can be 20 M/5 M=4 times.

When the scaling magnification is less than a minimum scaling magnification (=1.0), the enlargement by the optical zooming is required, and for example, downscaling can be performed by enlargement to a range indicated by reference numeral 202. On the other hand, when the scaling magnification is equal to or larger than the minimum scaling magnification (=1.0), the scaling magnification is set to the maximum, and the enlargement by the optical zooming is not performed. In addition, it is possible to determine a region having a start point at a point farthest from the center of the optical axis of the industrial camera 1, the minimum scaling magnification or more, and a symmetry with respect to the center of the optical axis (a lowermost left part in FIG. 40). The optical zoom magnification is calculated, and the region of interest (the frame indicated by reference numeral 203) and the scaling magnification are determined in a coordinate system after zooming at the calculated optical zoom magnification (a lower right part in FIG. 40).

Figure 41:
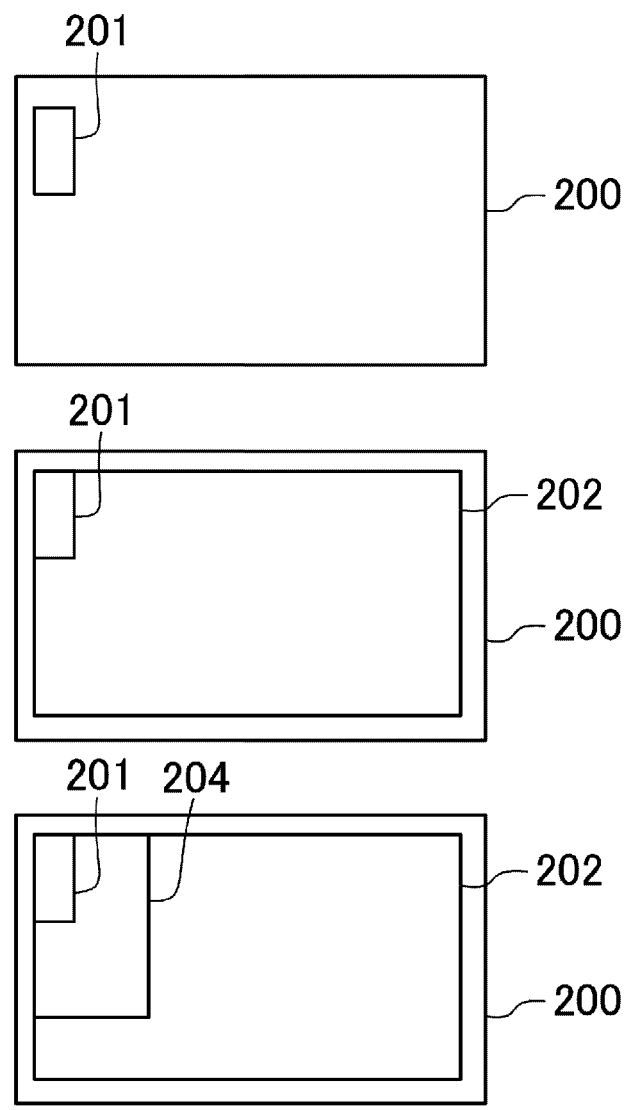
FIG. 41 is a diagram corresponding to FIG. 40 in a case where the feature region is too small.

FIG. 41 illustrates a case where the feature region for the corresponding point search is too small. When zooming is performed around the center of the optical axis, a region is determined as illustrated in a central diagram of FIG. 41. The frame 202 indicates a case where a size corresponding to the frame 200 during optical zooming such that the number of pixels becomes 20 M is less than the minimum scaling magnification. For example, a case where the number of pixels in the output region is 5 M and the number of pixels in the feature region is 1 M can be exemplified.

As illustrated in a lower part of FIG. 41, a frame 204 corresponding to 5 M is set to be enlarged to the frame 202 by optical zooming and include the feature region 201. The region in the frame 204 can be output as it is.

The above-described embodiment is merely an example in all respects, and should not be construed in a limiting manner. Further, all modifications and changes falling within an equivalent scope of the claims are within the scope of the invention.

As described above, the industrial camera according to the invention can be used in a case where the inspection target image for inspecting various inspection objects is generated.

What is claimed is:

1. An image processing device that generates an inspection target image obtained by capturing an inspection object, comprising:
    an imaging unit that captures the inspection object to generate the inspection target image;
    a storage unit that stores a reference image obtained by capturing the inspection object in advance; and
    a calculation unit that specifies a positional relationship between the inspection object included in the inspection target image generated by the imaging unit during operation and the inspection object included in the reference image, and calculates a generation condition of the inspection target image during operation such that the inspection object included in the inspection target image generated by the imaging unit during operation and the inspection object included in the reference image are at substantially the same position,
    wherein the generation condition includes positional information of an output region in which the inspection object is able to be output at substantially the same position as the reference image within a field of view range of the imaging unit, and
    the imaging unit generates an inspection target image corresponding to the output region of the positional information during operation.

2. The image processing device according to claim 1, further comprising
    an interface unit that receives selection of the reference image stored in the storage unit,
    wherein the storage unit is configured to store the inspection target image generated by the imaging unit as the reference image, and is configured to store an optical condition file in which an optical condition when the reference image is generated is defined in association with the reference image, and
    an initial condition of an optical condition of the imaging unit is set to the optical condition of the optical condition file associated with the selected reference image.

3. The image processing device according to claim 2, wherein the interface unit is configured to receive designation of a feature region, on the inspection target image or the reference image, for corresponding point search for specifying a positional relationship between the inspection object included in the inspection target image and the inspection object included in the reference image.

4. The image processing device according to claim 2, wherein
    after the reference image is designated via the interface unit, a posture of the imaging unit when the reference image is captured and a current posture of the imaging unit are compared and displayed, and
    after the postures of the imaging units are compared and displayed, the calculation unit calculates the generation condition of the inspection target image, and the imaging unit generates the inspection target image corresponding to the output region of the positional information.

5. The image processing device according to claim 3, wherein the calculation unit adjusts an exposure time of the imaging unit based on a luminance value of the reference image before the corresponding point search.

6. The image processing device according to claim 3, wherein focus adjustment of the imaging unit is executed before the corresponding point search.

7. The image processing device according to claim 1, wherein the information regarding a rotation direction and an angle for rotating the inspection target image to have the same posture as the inspection object included in the reference image is included in the generation condition of the inspection target image in addition to the positional information of the output region.

8. The image processing device according to claim 7, wherein the calculation unit generates an inspection target image after rotation by applying rotation conversion processing of the angle on the inspection target image.

9. The image processing device according to claim 1, wherein
    the generation condition of the inspection target image includes a zoom magnification calculated such that the inspection object included in the reference image and the inspection object in the inspection target image have substantially the same size, and
    the calculation unit sets the inspection object included in the inspection target image to have substantially the same size as the inspection object included in the reference image by zooming according to the calculated zoom magnification.

10. The image processing device according to claim 1, wherein
    the generation condition of the inspection target image includes a condition related to brightness of an image, and
    the condition related to the brightness of the image is calculated as an imaging condition in which the inspection target image have substantially the same brightness as the reference image based on a result of analysis of brightness of the reference image.

11. The image processing device according to claim 1, further comprising a display unit that displays information regarding the posture of the imaging unit when the reference image is captured, and compares and displays a current posture of the imaging unit and the posture of the imaging unit when the reference image is captured.

* * * * *